(12) United States Patent
Derichs

(10) Patent No.: US 11,989,378 B2
(45) Date of Patent: May 21, 2024

(54) PASSIVE PEN WITH VARIABLE CAPACITOR FOR PRESSURE INDICATION

(71) Applicant: SigmaSense, LLC., Wilmington, DE (US)

(72) Inventor: Kevin Joseph Derichs, Buda, TX (US)

(73) Assignee: SigmaSense, LLC., Austin, TX (US)

( * ) Notice: Subject to any disclaimer, the term of this patent is extended or adjusted under 35 U.S.C. 154(b) by 0 days.

(21) Appl. No.: 17/727,722

(22) Filed: Apr. 23, 2022

(65) Prior Publication Data

US 2022/0342505 A1   Oct. 27, 2022

Related U.S. Application Data

(60) Provisional application No. 63/178,775, filed on Apr. 23, 2021.

(51) Int. Cl.
*G06F 3/044* (2006.01)
*G06F 3/0354* (2013.01)
*G06F 3/041* (2006.01)

(52) U.S. Cl.
CPC ........ *G06F 3/0441* (2019.05); *G06F 3/03545* (2013.01); *G06F 3/04186* (2019.05);
(Continued)

(58) Field of Classification Search
CPC ............... G06F 3/0441; G06F 3/03545; G06F 3/04186; G06F 3/0445; G06F 3/0447;
(Continued)

(56) References Cited

U.S. PATENT DOCUMENTS 5,437,178 A   8/1995   Esin et al.
6,218,972 B1  4/2001   Groshong
(Continued)

FOREIGN PATENT DOCUMENTS

CN   103995626 A   8/2014
CN   104182105 A   12/2014
(Continued)

OTHER PUBLICATIONS

Baker; How delta-sigma ADCs work, Part 1; Analog Applications Journal; Oct. 1, 2011; 6 pgs.
(Continued)

*Primary Examiner* — Michael J Jansen, II
(74) *Attorney, Agent, or Firm* — Garlick & Markison; Patricia M. Healy

(57) ABSTRACT

A passive pen for interaction with a touch screen, wherein the passive pen includes a housing, a conductive section, a fixed conductive z-direction mounting section coupled to the conductive section, a moveable conductive z-direction mounting section, a variable capacitor positioned between the fixed conductive z-direction mounting section and the moveable conductive z-direction mounting section, and a conductive tip coupled to the moveable conductive z-direction mounting section. When the user is in contact with the conductive section, a capacitive connection is established between the conductive section and the user's body. The variable capacitor has a compressive property. Pressure on the conductive tip creates a z-direction force operable to move the moveable conductive z-direction mounting section in the z-direction. Movement of the moveable conductive z-direction mounting section compresses the variable capacitor against the fixed conductive z-direction mounting section. When the variable capacitor is compressed, capacitance of the variable capacitor changes.

13 Claims, 38 Drawing Sheets

(25 of 38 Drawing Sheet(s) Filed in Color)

(52) U.S. Cl.
CPC .......... *G06F 3/0445* (2019.05); *G06F 3/0447* (2019.05); *G06F 3/0446* (2019.05); *G06F 2203/04105* (2013.01); *G06F 2203/04108* (2013.01)

(58) Field of Classification Search
CPC ......... G06F 3/0446; G06F 2203/04105; G06F 2203/04108; G06F 3/016; G06F 3/041; G06F 2203/015; G06F 3/0412
See application file for complete search history.

(56) References Cited

U.S. PATENT DOCUMENTS

| | | | |
|---|---|---|---|
| 6,324,920 B1* | 12/2001 | DeSchrijver | G01L 1/16 73/862.046 |
| 6,665,013 B1 | 12/2003 | Fossum et al. | |
| 7,476,233 B1 | 1/2009 | Wiener et al. | |
| 7,528,755 B2 | 5/2009 | Hammerschmidt | |
| 8,031,094 B2 | 10/2011 | Hotelling | |
| 8,089,289 B1 | 1/2012 | Kremin et al. | |
| 8,279,180 B2 | 10/2012 | Hotelling et al. | |
| 8,537,110 B2* | 9/2013 | Kruglick | G06F 3/017 345/158 |
| 8,547,114 B2 | 10/2013 | Kremin | |
| 8,587,535 B2 | 11/2013 | Oda et al. | |
| 8,625,726 B2 | 1/2014 | Kuan | |
| 8,657,681 B2* | 2/2014 | Kim | A63F 13/57 463/31 |
| 8,766,930 B2* | 7/2014 | Souchkov | G06F 3/04166 345/173 |
| 8,966,400 B2* | 2/2015 | Yeap | G06F 3/038 715/848 |
| 8,982,097 B1 | 3/2015 | Kuzo et al. | |
| 9,001,066 B2* | 4/2015 | Mohindra | G06F 3/044 345/173 |
| 9,081,437 B2* | 7/2015 | Oda | G06F 3/0446 |
| 9,098,131 B2* | 8/2015 | Jeong | G06F 3/03545 |
| 9,166,621 B2* | 10/2015 | Kremin | H03M 11/02 |
| 9,183,989 B2* | 11/2015 | Obata | H01G 5/0136 |
| 9,195,351 B1* | 11/2015 | Rosenberg | G06F 1/1626 |
| 9,201,547 B2 | 12/2015 | Elias | |
| 9,594,440 B2* | 3/2017 | Park | G06F 3/0418 |
| 9,639,179 B2* | 5/2017 | Armstrong-Muntner | G06F 3/0445 |
| 9,740,312 B2* | 8/2017 | Barel | G06F 3/0338 |
| 9,846,499 B2* | 12/2017 | Chen | G06F 3/0412 |
| 9,864,472 B2* | 1/2018 | Yang | G06F 3/044 |
| 9,874,951 B2* | 1/2018 | Stern | G06F 3/0445 |
| 10,007,335 B2* | 6/2018 | Lee | G06F 3/167 |
| 10,241,590 B2* | 3/2019 | Marshall | H03K 17/98 |
| 10,296,089 B2* | 5/2019 | Peretz | G06F 3/016 |
| 10,401,985 B2* | 9/2019 | Hara | G06F 3/0441 |
| 2003/0052657 A1 | 3/2003 | Koernle et al. | |
| 2005/0235758 A1 | 10/2005 | Kowal et al. | |
| 2007/0257890 A1* | 11/2007 | Hotelling | G06F 3/0446 345/173 |
| 2009/0066550 A1* | 3/2009 | Hammerschmidt | G01C 19/56 73/504.12 |
| 2010/0321334 A1* | 12/2010 | Oda | G06F 3/04166 345/174 |
| 2011/0018814 A1* | 1/2011 | Kruglick | G06F 3/017 345/173 |
| 2011/0063154 A1 | 3/2011 | Hotelling et al. | |
| 2011/0298745 A1 | 12/2011 | Souchkov | |
| 2011/0302536 A1* | 12/2011 | Yeap | G06F 3/038 715/850 |
| 2012/0278031 A1* | 11/2012 | Oda | G06F 3/0416 702/150 |
| 2013/0070875 A1* | 3/2013 | Kuan | H04B 1/0021 375/340 |
| 2013/0196759 A1* | 8/2013 | Kim | A63F 13/533 463/31 |
| 2013/0278447 A1 | 10/2013 | Kremin | |
| 2013/0285971 A1* | 10/2013 | Elias | G06F 3/0418 345/174 |
| 2014/0009863 A1* | 1/2014 | Obata | H01G 5/0136 361/294 |
| 2014/0078070 A1* | 3/2014 | Armstrong-Muntner | G06F 3/0441 345/173 |
| 2014/0132529 A1* | 5/2014 | Jeong | G06F 3/0442 345/173 |
| 2014/0327644 A1 | 11/2014 | Mohindra | |
| 2015/0091847 A1 | 4/2015 | Chang | |
| 2015/0091856 A1* | 4/2015 | Park | G06F 3/0446 345/174 |
| 2015/0346889 A1 | 12/2015 | Chen | |
| 2016/0124530 A1* | 5/2016 | Stern | G06F 3/0441 345/179 |
| 2016/0188049 A1 | 6/2016 | Yang et al. | |
| 2017/0068345 A1* | 3/2017 | Barel | G06F 3/0441 |
| 2017/0168557 A1* | 6/2017 | Lee | G06F 3/167 |
| 2017/0308177 A1* | 10/2017 | Marshall | H03K 17/9622 |
| 2018/0046249 A1* | 2/2018 | Peretz | G06F 3/016 |
| 2018/0046272 A1* | 2/2018 | Hara | G06F 3/044 |
| 2018/0157354 A1 | 6/2018 | Blondin et al. | |
| 2018/0275824 A1 | 9/2018 | Li | |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |
| WO | 2013165466 A1 | 11/2013 |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

European Patent Office; Extended European Search Report; Application No. 19853507.2, dated Jun. 13, 2023; 7 pgs.

* cited by examiner communication system 10 communication device 12 communication device 12 communication device 12 touch screen 25

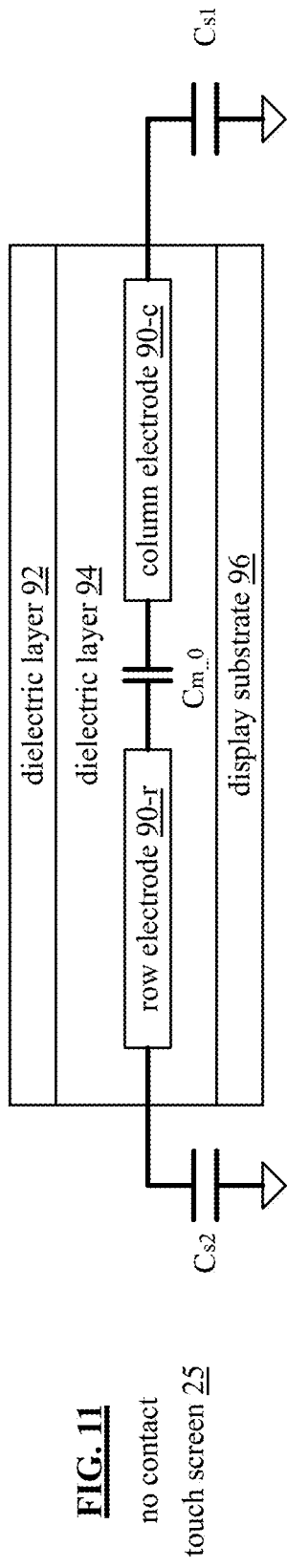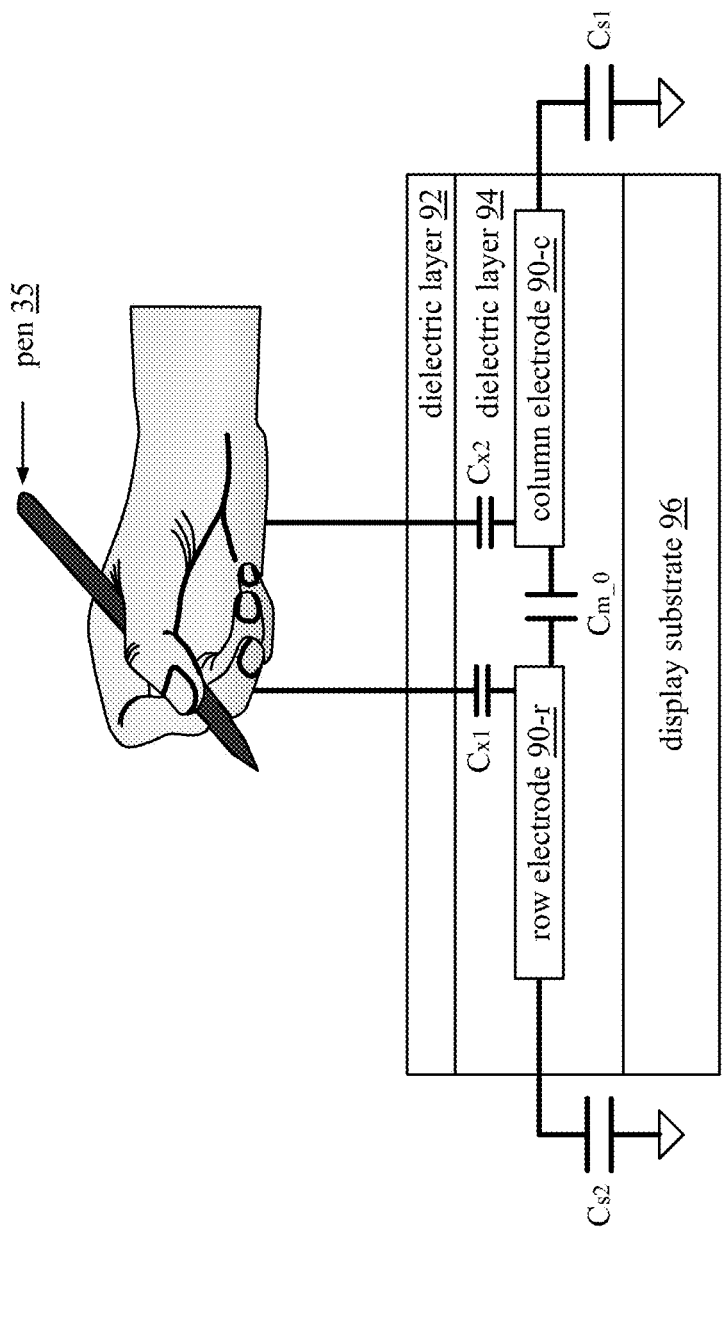
FIG. 11
no contact
touch screen 25
FIG. 12
hover
touch screen 25

FIG. 13
touch screen 25 drive-sense circuit (DSC)

drive-sense circuit (DSC)

drive-sense circuit (DSC)

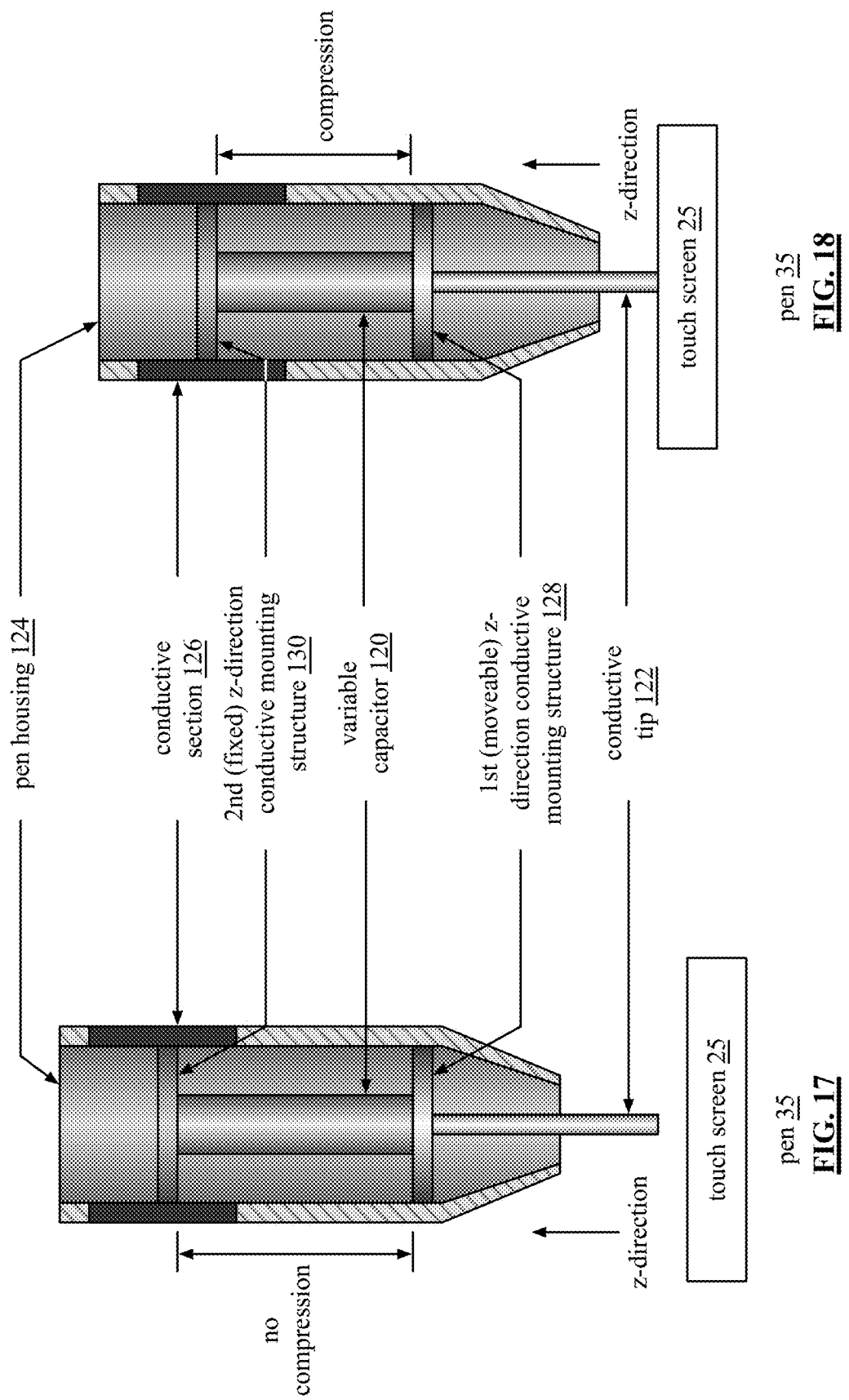

variable capacitor 120 insulator layer 132
conductive layer 134
compression variable capacitor 120 insulator layer 132
conductive layer 134
no compression variable capacitor 120 variable capacitor 120

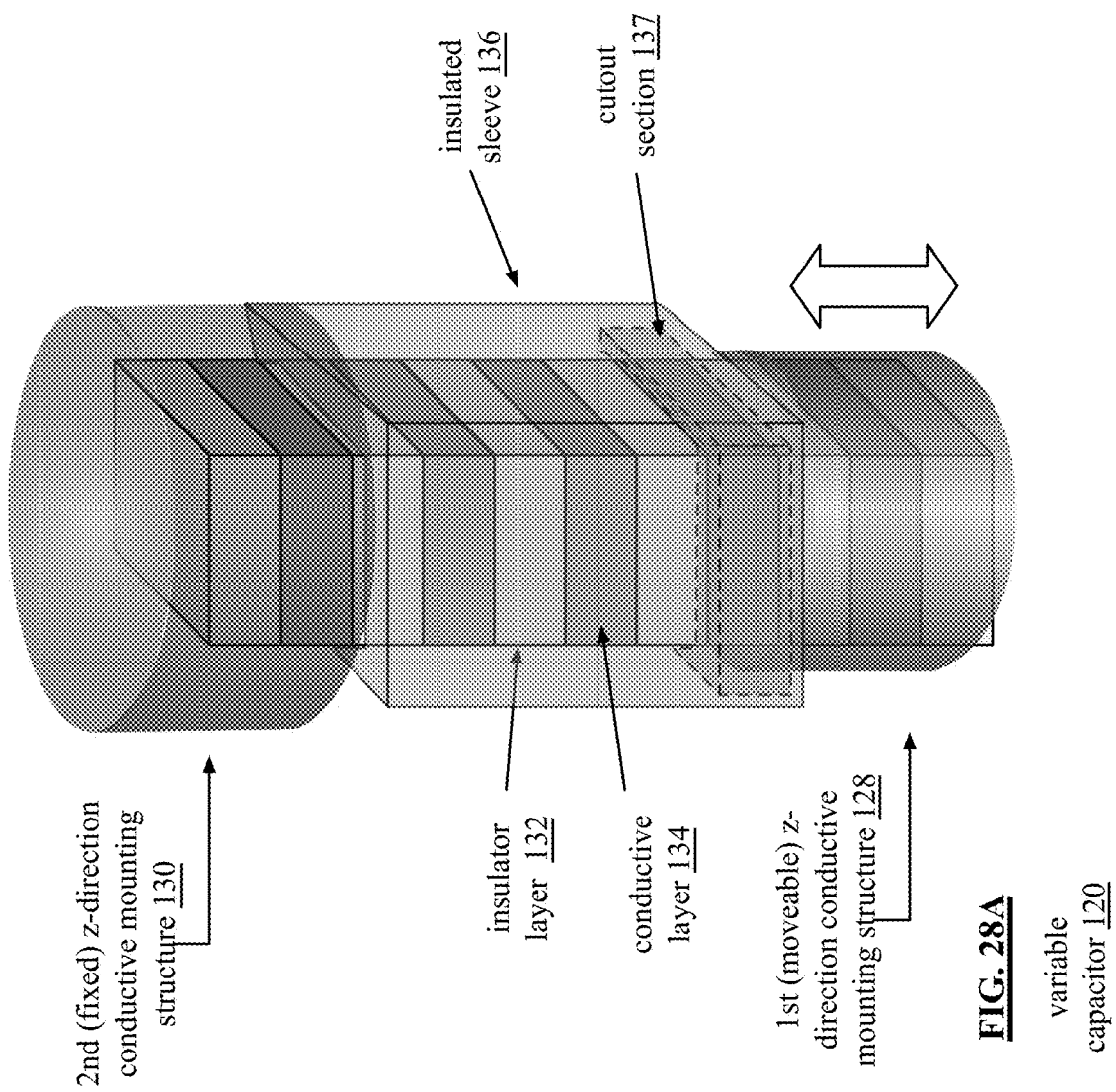

variable capacitor 120 parallel connection pen 35

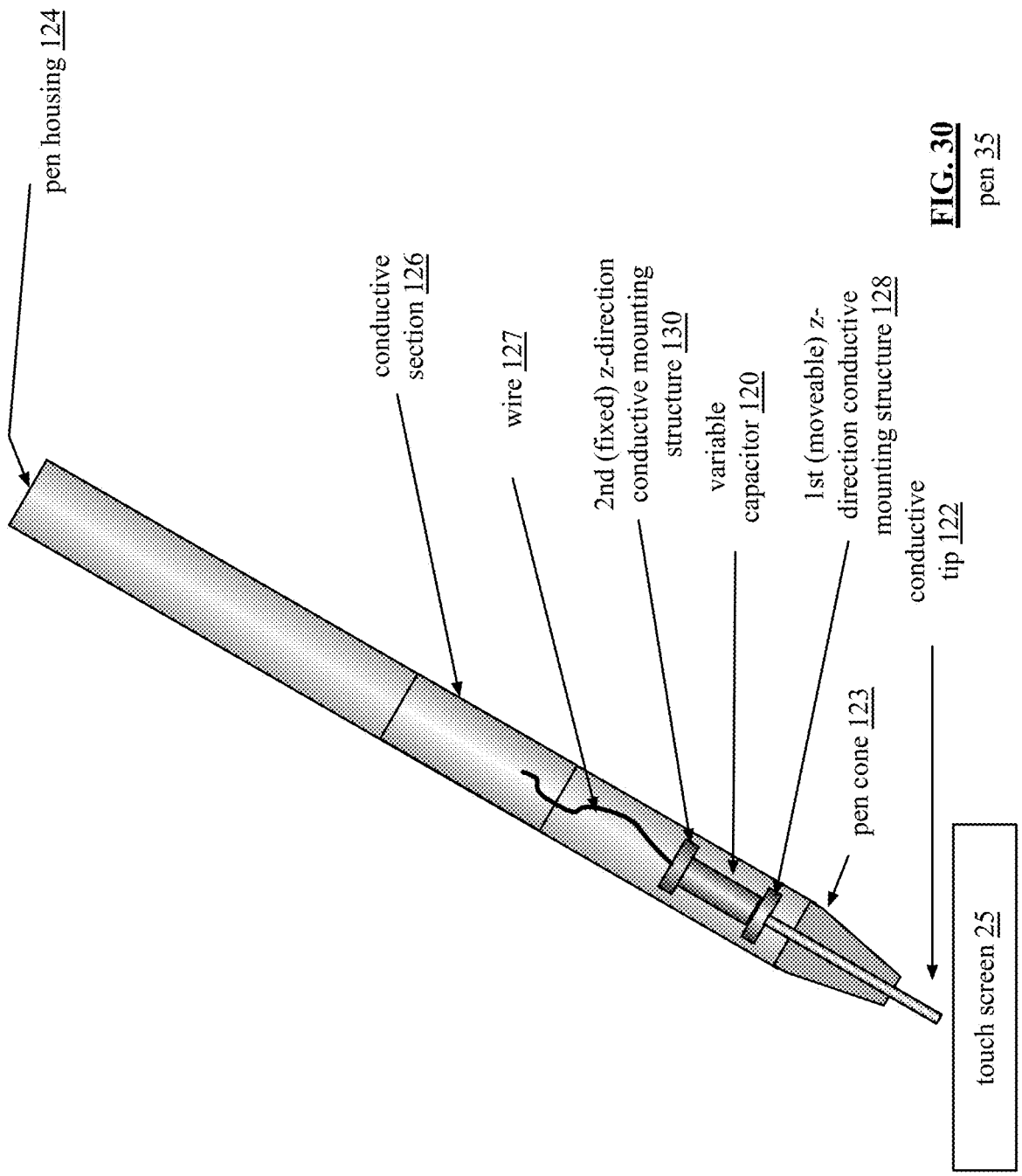

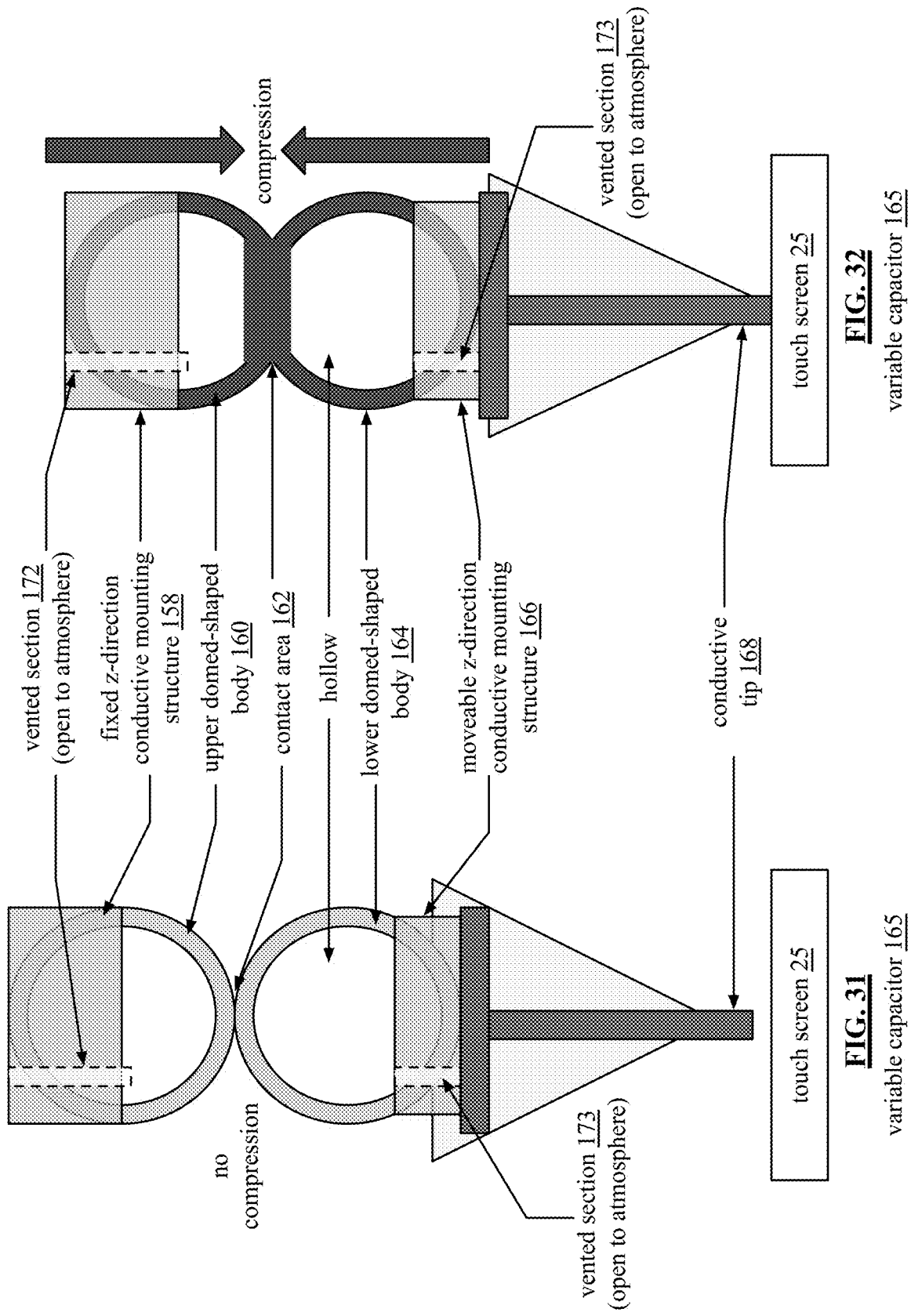

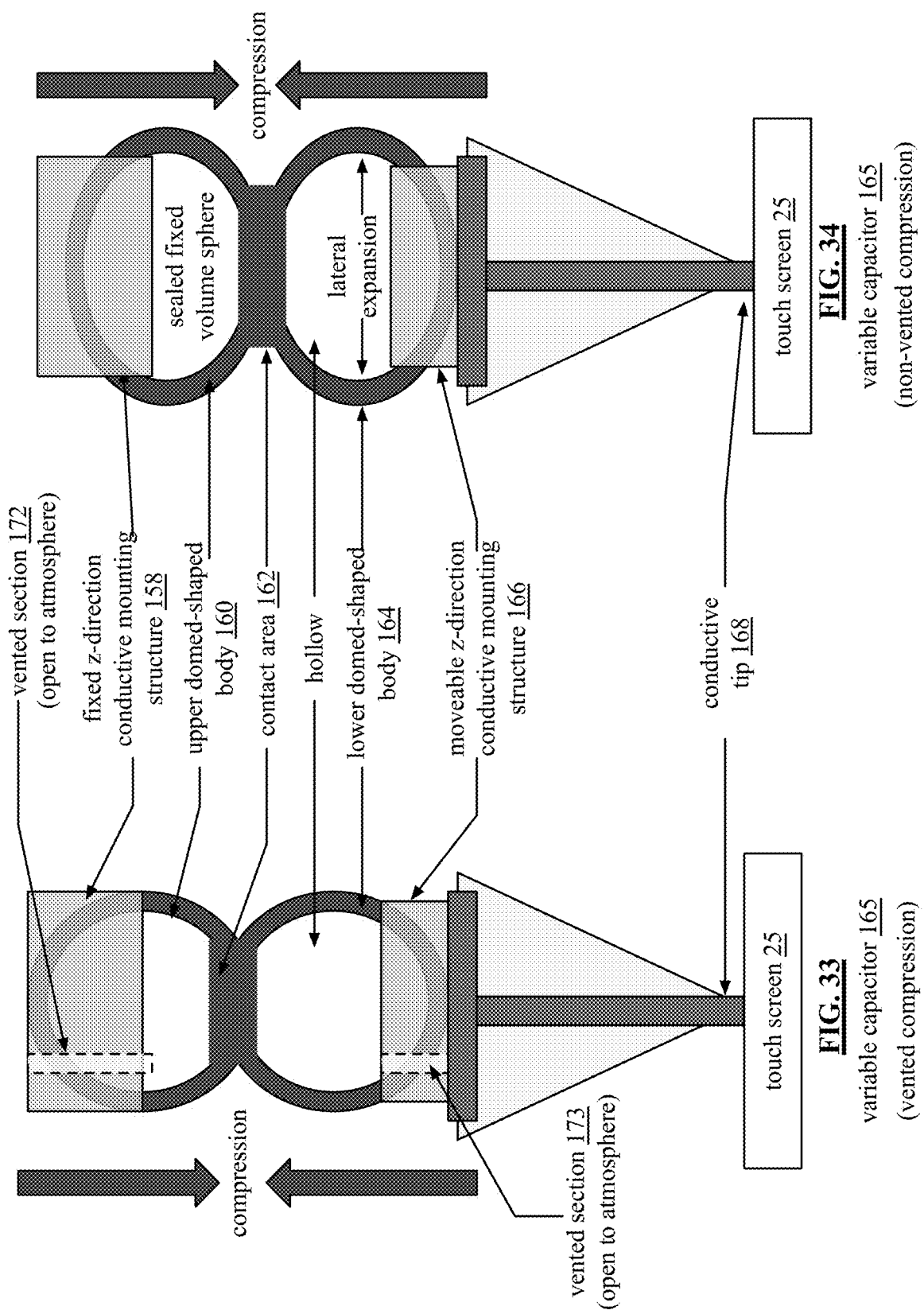

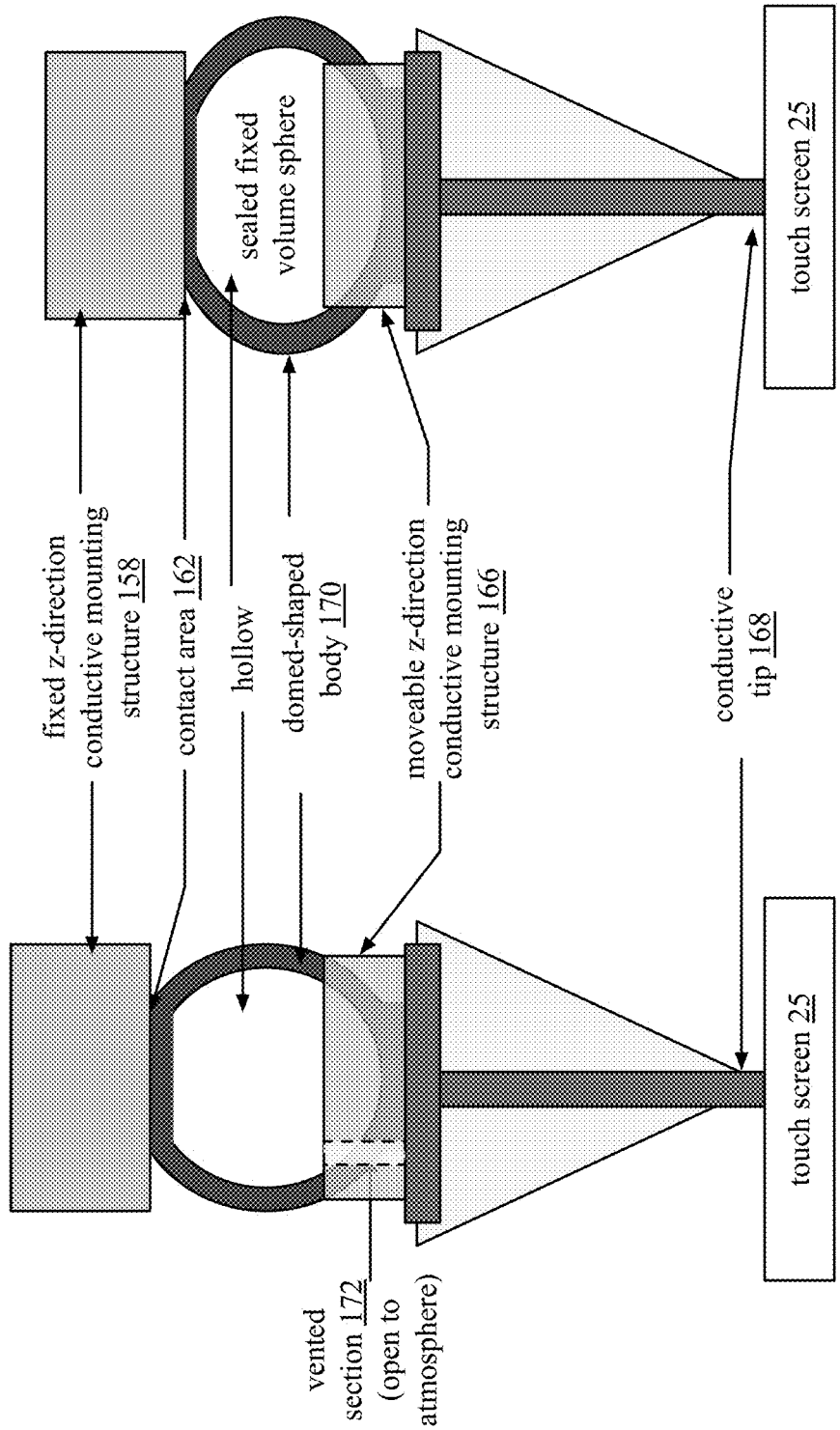

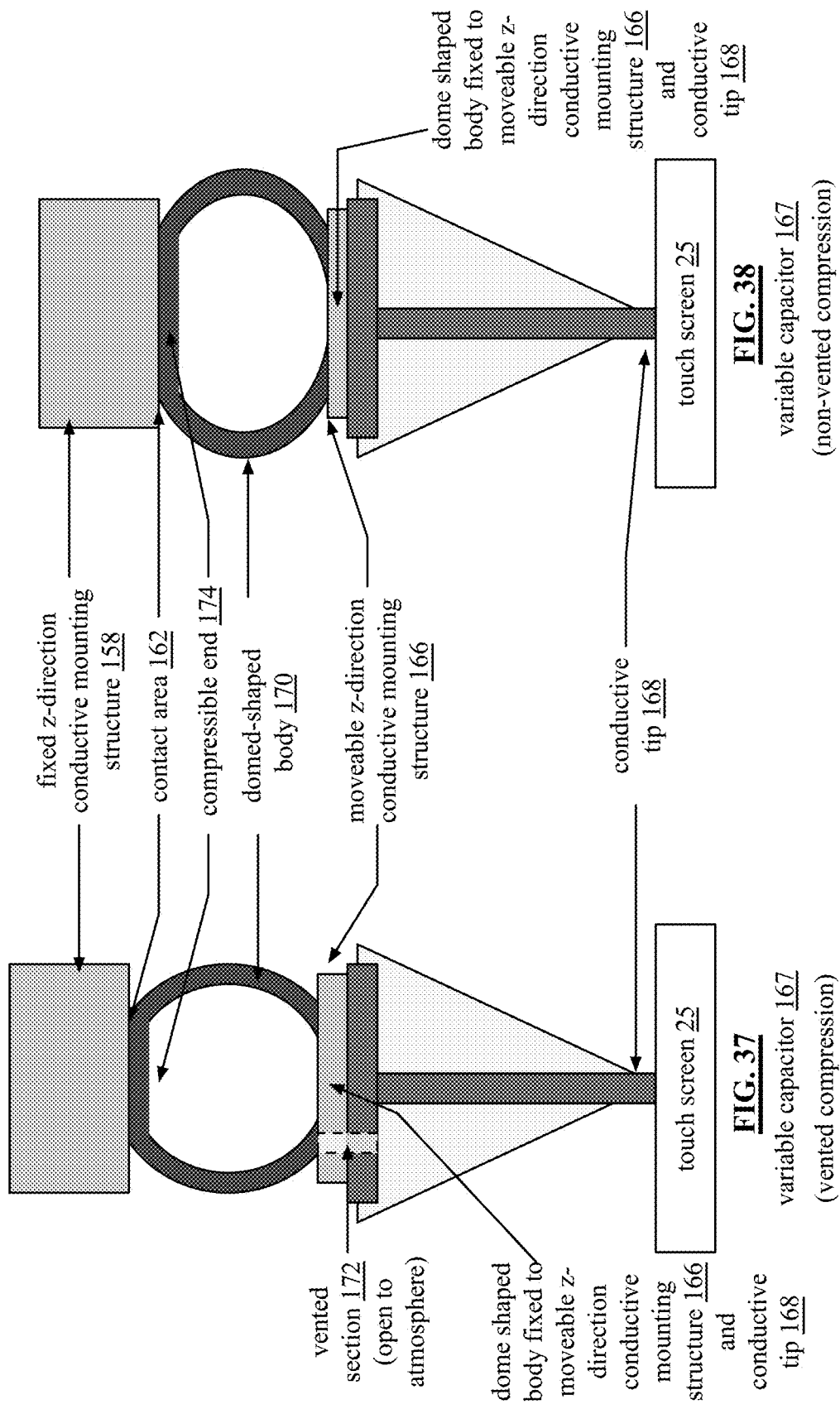

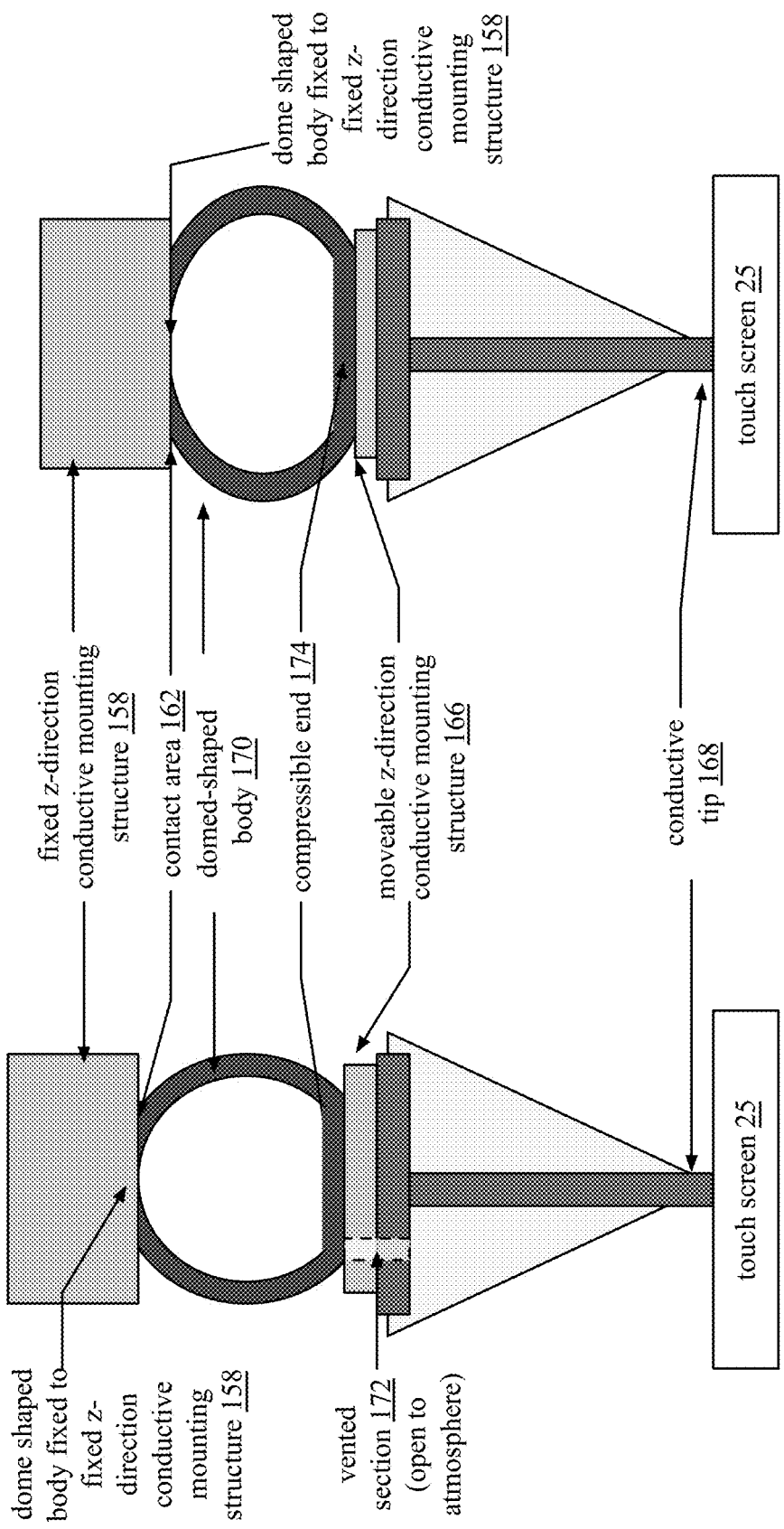

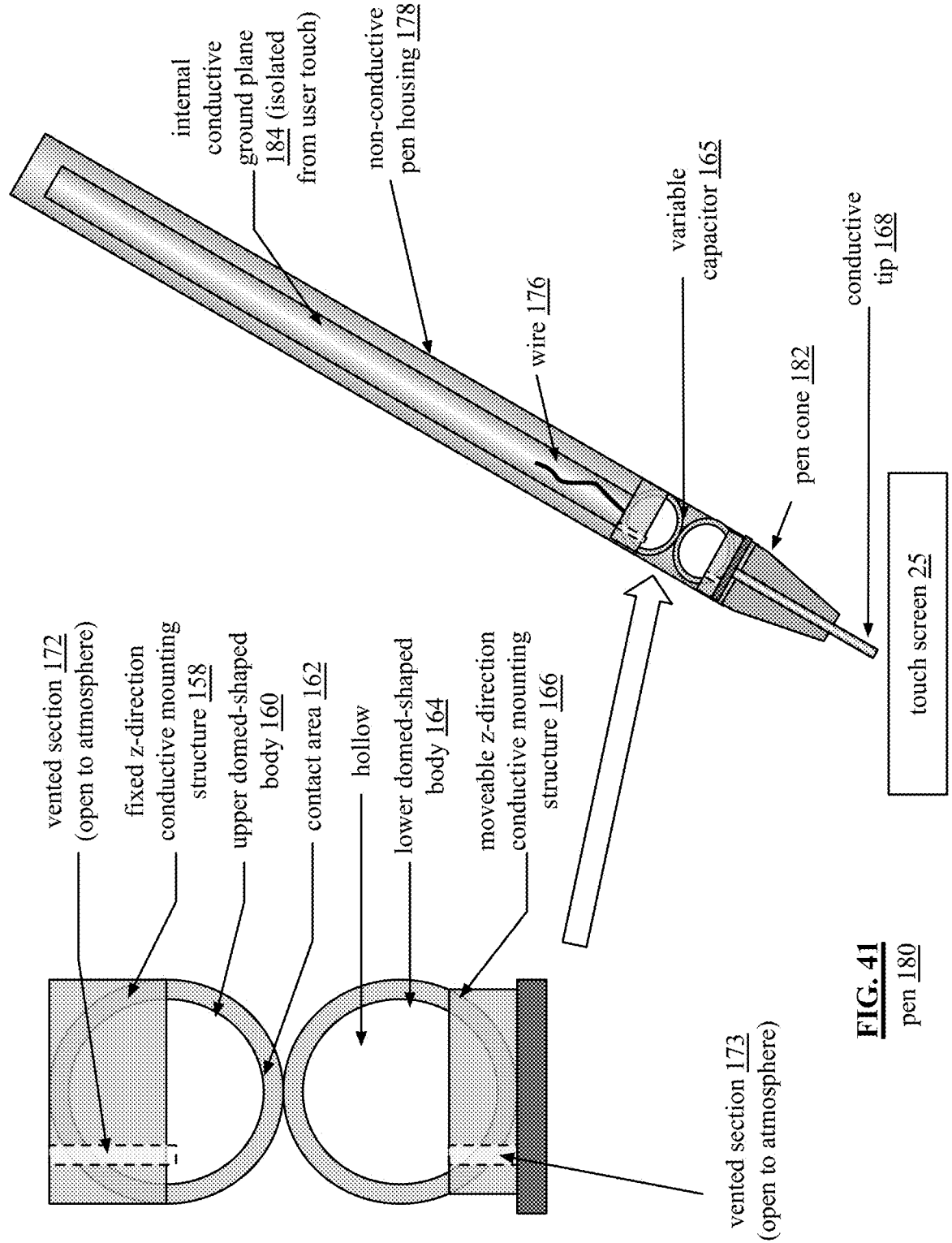

pen 180

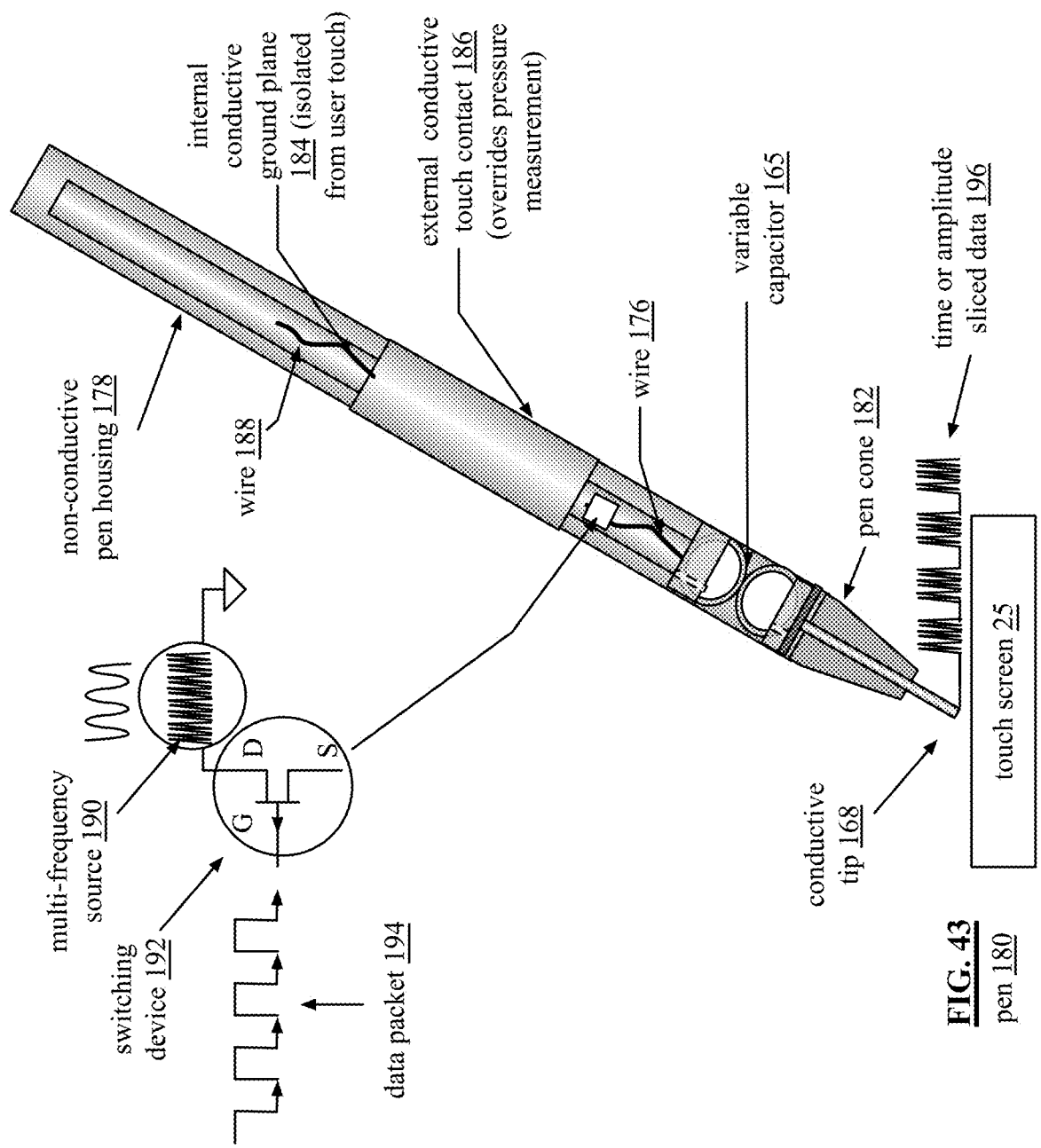

PASSIVE PEN WITH VARIABLE CAPACITOR FOR PRESSURE INDICATION

CROSS-REFERENCE TO RELATED APPLICATIONS

The present U.S. Utility patent application claims priority pursuant to 35 USC § 119(e) to U.S. Provisional Application Ser. No. 63/178,775, entitled "DIGITAL PEN WITH VARIABLE CAPACITOR FOR PRESSURE INDICATION", filed Apr. 23, 2021, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computing systems and more particularly to communication with a computing device.

Description of Related Art

Computers include user interfaces to receive data from a user and to output data to a user. A common user interface is a graphical user interface (GUI) that provides images, or icons, for various types of data input (e.g., select a file, edit a word, type a character, draw a picture, look at a photo, format a document, etc.). In an example, the user selects an icon by manipulating a mouse to align a cursor with an icon and then "selects" the icon. In another example, the user selects an icon by touching the screen with the user's finger or with a special pen.

For general use of a pen with computers from different manufacturers and/or having different touch screen technologies, a pen includes a ring-back topology as described in patent application PCT/US2012/067897. The ring-back topology includes an inverting charge integrator and an inverting amplifier. When the tip of a ring-back pen touches the screen, the tip receives a signal from the screen. The inverting charge integrator integrates and inverts the received signal. The inverting amplifier inverts the integrated and inverted signal to produce an output signal that resembles the received signal. The pen sends the output signal back to the screen. The output signal affects the signal transmitted by the screen, which the screen interprets as a touch.

A passive pen is made of conductive material and conducts electrical charge from a user's finger to a touch screen just like a finger would. XY location of a passive pen on a touch screen can be determined, but the localized Z-pressure applied on a passive pen tip will make an enlarged contact spot due to deflection of the tip. The deflection can be interpreted as relative pressure and not an absolute measurement. In active pens, absolute pressure measurements are interpreted by an onboard calculation that will retransmit the pressure value to a touch sensor.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 11 is a schematic block diagram of an example of capacitance of a touch screen with no contact;

FIG. 12 is a schematic block diagram of an example of capacitance of a touch screen with hover;

FIG. 13 is a schematic block diagram of an example of capacitance of a touch screen with contact;

FIG. 17 is a schematic block diagram of an example of a pen with a variable capacitor under no compression;

FIG. 18 is a schematic block diagram of an example of a pen with a variable capacitor under compression;

FIG. 28A is a schematic block diagram of an example of a variable capacitor with end caps for mounting structures and an insulated sleeve;

FIG. 30 is a schematic block diagram of an example of a pen with a variable capacitor having a wired connection to a conductive section;

FIG. 31 is a schematic block diagram of another example of a variable capacitor within a pen;

FIG. 32 is a schematic block diagram of another example of a variable capacitor within a pen;

FIG. 33 is a schematic block diagram of another example of a variable capacitor within a pen;

FIG. 34 is a schematic block diagram of another example of a variable capacitor within a pen;

FIG. 35 is a schematic block diagram of another example of a variable capacitor within a pen;

FIG. 36 is a schematic block diagram of another example of a variable capacitor within a pen;

FIG. 37 is a schematic block diagram of another example of a variable capacitor within a pen;

FIG. 38 is a schematic block diagram of another example of a variable capacitor within a pen;

FIG. 39 is a schematic block diagram of another example of a variable capacitor within a pen;

FIG. 40 is a schematic block diagram of another example of a variable capacitor within a pen;

FIG. 41 is a schematic block diagram of an example of operation of a pen with a variable capacitor;

FIG. 43 is a schematic block diagram of another example of operation of a pen with a variable capacitor.

DETAILED DESCRIPTION OF THE INVENTION

Figure 1:
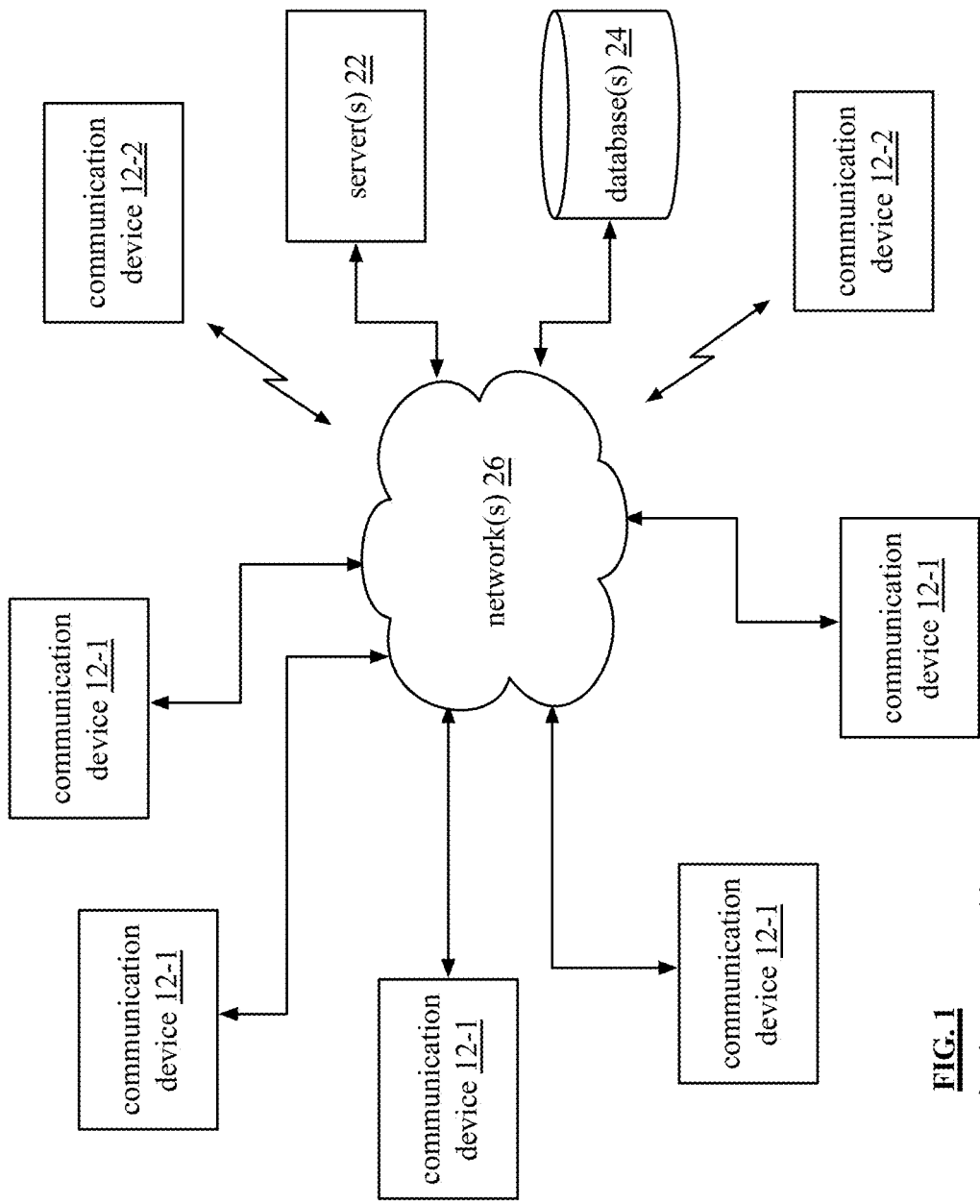
FIG. 1 is a schematic block diagram of an embodiment of a communication system.

FIG. 1 is a schematic block diagram of an embodiment of a communication system 10 that includes a plurality of wired communication devices 12-1, a plurality of wireless communication devices 12-2, one or more servers 22, one or more databases 24, and one or more networks 26. Embodiments of communication devices 12-1 and 12-2 are similar in construct and/or functionality with a difference being the communication devices 12-1 couple to the network(s) 26 via a wired network card and the wireless communication devices 12-2 coupled to the network(s) 26 via a wireless connection. In an embodiment, a communication device can have both a wired network card and a wireless network card such that it is both communication devices 12-1 and 12-2.

A communication device 12-1 and/or 12-2 is a computing device and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12-1 and/or 12-2 will be discussed in greater detail with reference to one or more of FIGS. 2-4.

A server 22 is a special type of computing device that is optimized for processing large amounts of data requests in parallel. A server 22 includes similar components to that of the communication devices 12-1 and/or 12-2 with more robust processing modules, more main memory, and/or more hard drive memory (e.g., solid state, hard drives, etc.). Further, a server 22 is typically accessed remotely; as such it does not generally include user input devices and/or user output devices. In addition, an embodiment of a server is a standalone separate computing device and/or may be a cloud computing device.

A database 24 is a special type of computing device that is optimized for large scale data storage and retrieval. A database 24 includes similar components to that of the communication devices 12-1 and/or 12-2 with more hard drive memory (e.g., solid state, hard drives, etc.) and potentially with more processing modules and/or main memory. Further, a database 24 is typically accessed remotely; as such it does not generally include user input devices and/or user output devices. In addition, an embodiment of a database 24 is a standalone separate computing device and/or may be a cloud computing device.

The network(s) 26 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The communication devices 12 communicate in a wired manner and/or wireless manner within the communication system 10. For example, the wired communication devices 12-1 and/or the wireless communication devices 12-2 include or connect to one or more touch screens with sensors and drive-sense circuits for communicating touch sense data within the communication system 10. The touch sense data communication is between devices and/or is within a device.

Figure 2:
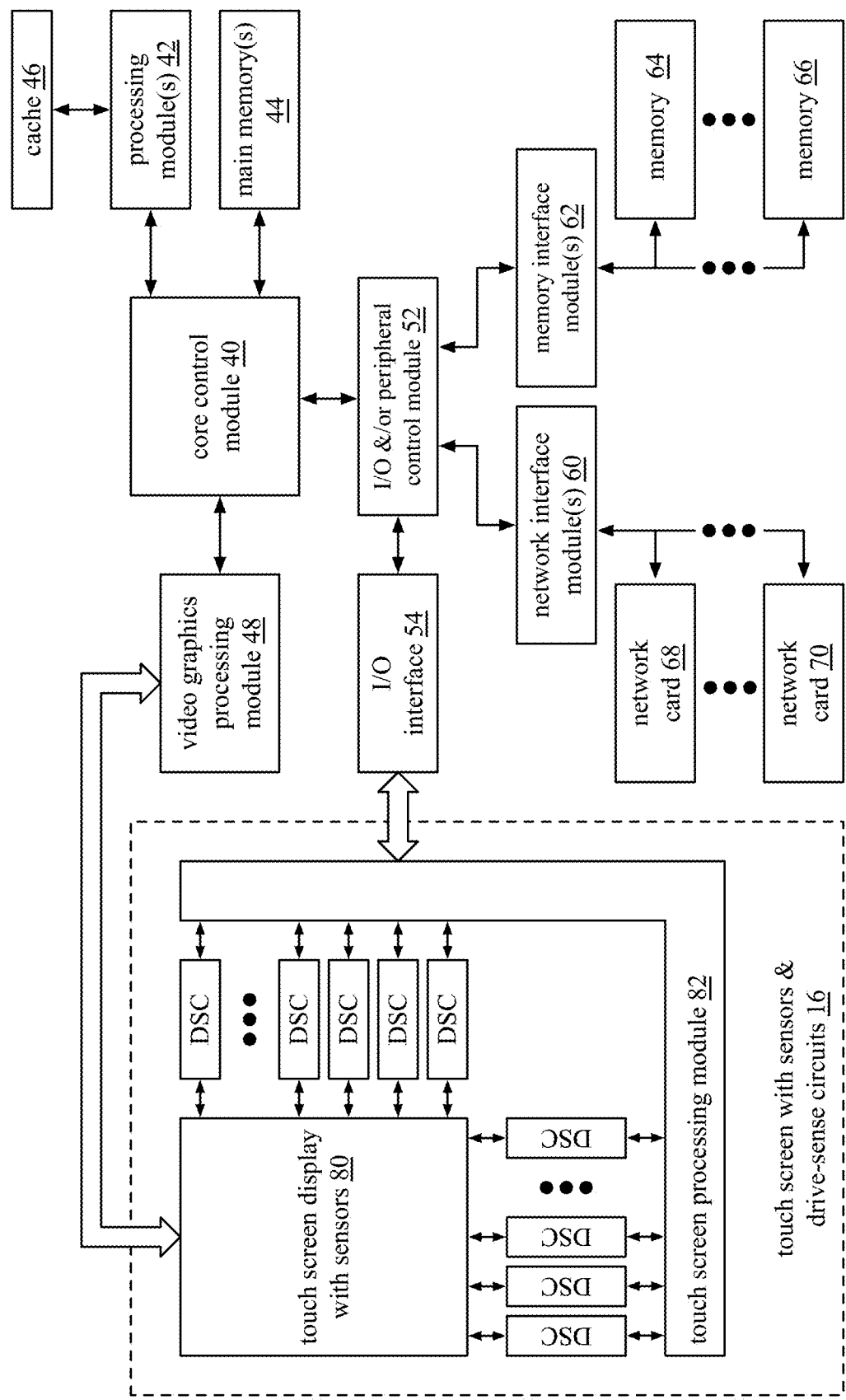
FIG. 2 is a schematic block diagram of an embodiment of a communication device.

FIG. 2 is a schematic block diagram of an embodiment of a communication device 12 (e.g., communication device 12-1 and/or 12-2 of FIG. 1). The communication device 12 includes a touch screen with sensors and drive-sense circuits 16 ("touch screen"), a core control module 40, one or more processing modules 42, one or more main memories 44, cache memory 46, a video graphics processing module 48, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen 16 includes a touch screen display with sensors 80 ("touch screen display"), a plurality of drive-sense circuits (DSC), and a touch screen processing module 82. In general, the sensors (e.g., electrodes, capacitor sensing cells, capacitor sensors, inductive sensor, etc.) detect a proximal touch of the screen. For example, when one or more fingers touch the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MIz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the touch screen display 80. The touch screen display 80 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the touch screen display 80, and provides the rendered data to the touch screen display 80.

Figure 3:
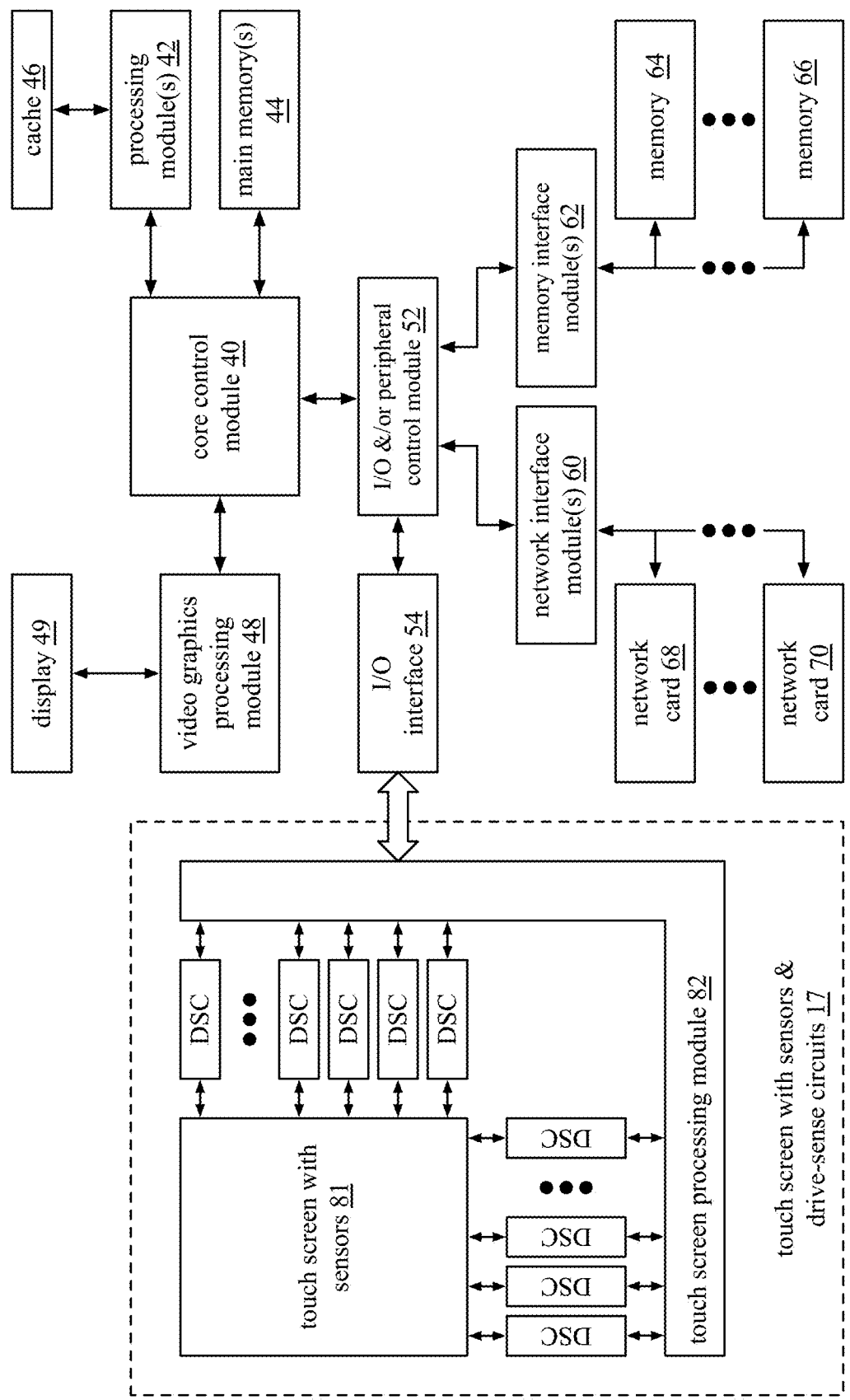
FIG. 3 is a schematic block diagram of another embodiment of a communication device.

FIG. 3 is a schematic block diagram of another embodiment of a communication device 12 that includes a touch screen with sensors and drive-sense circuits 17 ("touch screen"), a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, one or more memory interface modules 62, and a display 49.

The touch screen 17 includes a touch screen display with sensors 81 ("touch screen display"), a plurality of drive-sense circuits (DSC), and a touch screen processing module 82. The communication device 12 of FIG. 3 operates similarly to the communication device 12 of FIG. 2 except that the touch screen with sensors 81 is separate from the display 49.

Figure 4:
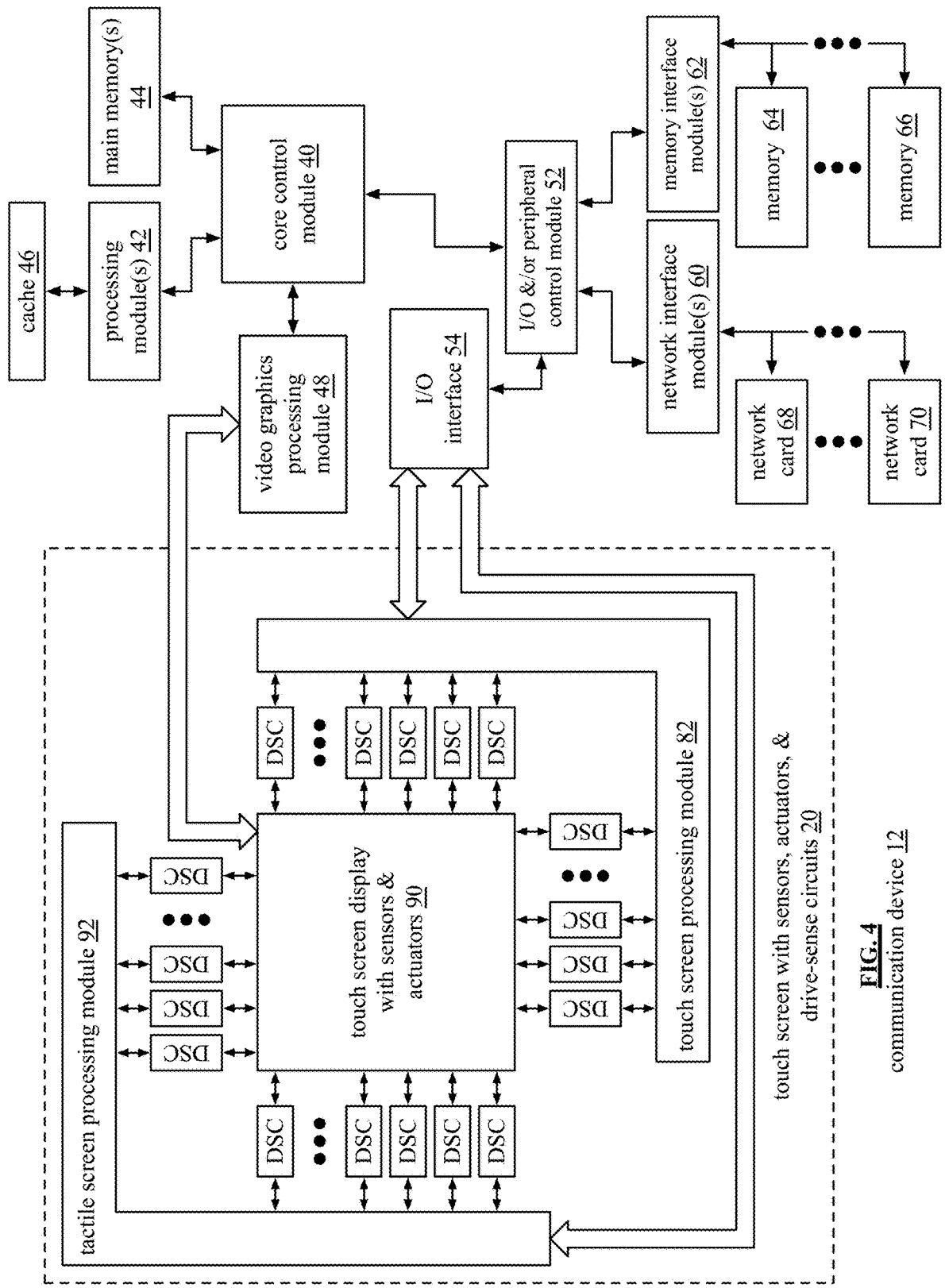
FIG. 4 is a schematic block diagram of another embodiment of a communication device.

FIG. 4 is a schematic block diagram of another embodiment of a communication device 12 that includes a core control module 40, one or more processing modules 42, one or more main memories 44, cache memory 46, a video graphics processing module 48, a touch screen with sensors, actuators, and drive-sense circuits 20 ("touch and tactile screen"), an Input-Output (I/O) peripheral control module 52, one or more input interface modules 56, one or more output interface modules 58, one or more network interface modules 60, and one or more memory interface modules 62. The touch and tactile screen 20 include a touch and tactile screen display having a plurality of sensors and a plurality of actuators 90 ("touch and tactile screen display"), a plurality of drive-sense circuits (DSC), a touch screen processing module 82, and a tactile screen processing module 92.

The communication device 12 operates similarly to communication device 12 of FIG. 2 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 5:
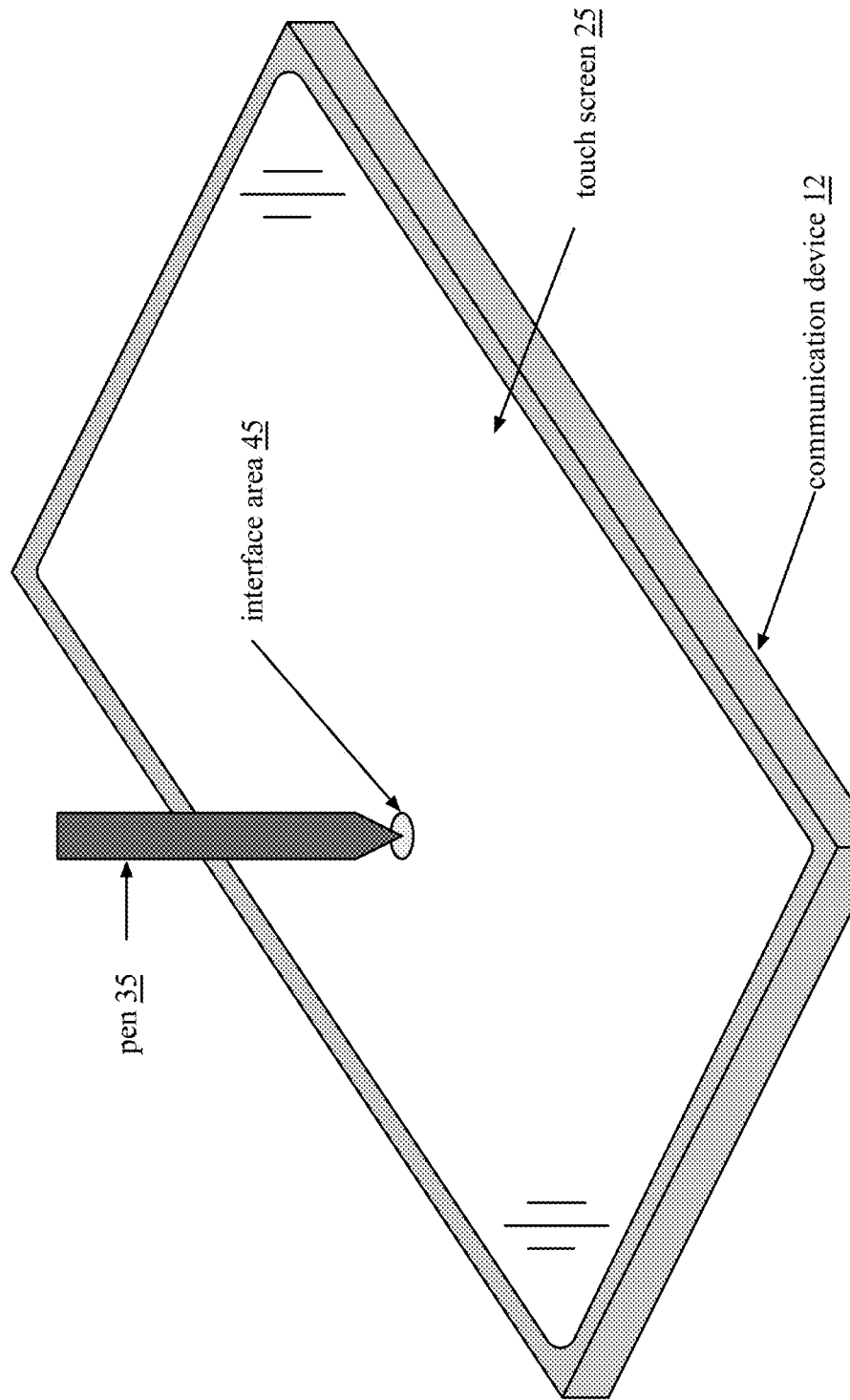
FIG. 5 is a schematic block diagram of an embodiment of a communication device and a pen.

FIG. 5 is a schematic block diagram of an embodiment of a communication device 12 and a pen 35. The communication device 12 includes a touch screen 25, which may further include a display to form a touch screen display. The communication device 12 operates similarly to any of the communication devices 12 of FIGS. 2-4. The touch screen 25 may be the touch screen of any of FIGS. 2-4. For example, the touch screen 25 is the touch screen with sensors, actuators, and drive-sense circuits 20 of FIG. 4. As another example, the touch screen 25 is the touch screen with sensors and drive-sense circuits 16 of FIG. 2.

The pen 35 may be passive or active. Active pens provide power gain to a circuit whereas passive pens do not provide power gain to a circuit and do not transmit stimulus signals. For example, a traditional passive (i.e., capacitive pen) is made of a conductive material, contains no battery, and interacts with a touch screen in the same manner as a user's finger.

The pen 35 interacts with the touch screen 25 to communicate data with the communication device 12. For example, the pen 35 touches, or nearly touches, the touch screen 25 at a pen interface area 45. When the pen is an active pen, within the pen interface area 45, the touch screen 25 transmits a signal, or multiple signals, which are received by the pen 35. In a ring back mode, the pen 35 mimics the signal it receives and sends it back to the touch screen 25. In a more advanced and novel mode, the pen 35 includes data with the ring back signal to provide additional information to the touch screen. For example, the data includes pen orientation data (e.g., angles of the pen in two or more axis), pressure data (e.g., how hard the user is pressing the pen on the screen), pen functionality (e.g., fine tip, coarse tip, clean line, fuzzy line, etc.), pen mode (e.g., draw, write, erase), pen features (e.g., color, button presses, etc.), pen data (e.g., battery life, user information, feature set, capabilities, etc.), etc.

In another advanced and novel mode, the touch screen 25 provides additional data to the pen 35. For example, the signal, or signals, transmitted by the touch screen 25 include embedded data. The embedded data for the pen 35 includes a variety of information. For example, the embedded data for the pen includes feedback for fine tuning the interaction between the pen and the touch screen 25 (e.g., frequency selection, power control, etc.). In another example, the embedded data for the pen 35 includes authentication data to ensure that user of the pen 35 on the computing device is authorized to do so.

When the pen 35 is a passive pen, the touch screen 25 (i.e., the touch screen processing module) must first identify that the pen 35 in close proximity to the touch screen 25 is a pen 35 (e.g., versus a finger, another passive object, a non-interactive object, a palm, etc.). The touch screen 25 detects, via one or more drive-sense circuits of the touch screen, changes in electrical characteristics of sensors of the touch screen. The touch screen determines the interface area 45 based on the location of affected sensors and is operable to associate the interface area 45 with a passive pen.

For example, the touch screen 25 analyzes the size and shape of the interface area 45 in comparison with known interface areas associated with known interactive objects (e.g., the pen). The pen 35 is a known interactive object (e.g., the touch screen 25 anticipates interaction with a passive pen and stores information related to passive pen detection). An interface area 45 associated with a passive pen is around the size of a pen tip (e.g., smaller than a finger). An impedance pattern of the interface area is also analyzed in comparison to known impedance patterns associated with the known interactive objects. For example, an impedance measurement in a certain range in a small pen tip sized area may indicate the passive pen whereas an impedance pattern having various impedance levels (e.g., some sections have higher impedance as compared to others) over a larger area may indicate a palm or a hand. When the size and shape of the interface area is a substantial match with the size and shape of the known interface area of the passive pen and the impedance pattern is indicative of the passive pen, the touch screen associates the interface area 45 with the passive pen 35 (e.g., the shape and size of the interface area 45 is relatively small like a pen tip and the impedance pattern includes a measurement indicative of passive pen tip contact).

Presence of a conductive or dielectric material alone near the touch screen causes a small mutual capacitance change of sensors within the pen interface area 45 of the touch screen 25 (e.g., dielectric materials generally increase mutual capacitance whereas conductive materials generally decrease mutual capacitance) that is detectable by one or more of the highly sensitive drive-sense circuits. When a user touches a conductive pen, and the pen is in close proximity to the touch screen's surface, the capacitance of the human body coupled to the pen causes a self capacitance and a mutual capacitance change of sensors (e.g., electrodes) of the pen interface area 45 of the touch screen 25 that is detectable by one or more drive-sense circuits of the touch screen. Mutual and self capacitance information can be used to convey different information (e.g., a mutual capacitance change without a self capacitance change along with the size of the interface area may indicate the presence of a pen that is not in use, a mutual and self capacitance change indicates a touch, etc.).

In another advanced and novel mode, a passive pen may include a variable capacitor for detecting pressure changes in a z-direction. In traditional passive pens, XY location of a passive pen on a touch screen can be determined, but the localized Z-pressure applied on a passive pen tip will make an enlarged contact spot due to deflection of the tip. The deflection can be interpreted as relative pressure and not an absolute measurement. In traditional active pens, absolute pressure measurements are interpreted by an onboard calculation that will retransmit the pressure value to a touch sensor.

When a passive pen includes a variable capacitor having a compressive property (e.g., a compressive material, a compressible shape, etc.) for pressure sensing, as a user applies pressure to a conductive pen tip of the passive pen on the touch screen, the variable capacitor is compressed by the conductive pen tip. Compression of the variable capacitor creates a capacitance change (e.g., capacitance of the pen increases with compression) that affects electrical characteristics of sensors of the touch screen within the pen interface area 45. Based on the change in electrical characteristics of the sensors and the knowledge that the object is a passive pen, the touch screen processing module interprets the change in electrical characteristics of the sensors as impedance values. When the impedance values are within a first range, the touch screen processing module interprets the impedance values as a touch. When the impedance values are within a second range, the touch screen processing module interprets the impedance values as a pressure measurement where the second range is lower (i.e., the capacitance is higher) than the first range. The pressure measurement determined is an absolute measurement.

In an example, measurement of the z pressure is decoded by the touch screen processing module as a scaled percentage of the difference between the minimum and maximum energy values from a touch on the touch screen 25. As a specific example, if a touch is represented by a value in the range between 0 to 255 (8-bit binary value) when the touch screen processing module is calibrated, with the minimum (0 or 0%) and maximum (255 or 100%) signal values, a pressure value is reported as a dynamic value within that range.

When the impedance values are within a third range, the touch screen processing module interprets the impedance values as a hover where the third range is higher (i.e., the capacitance is lower) than the first range. The touch screen processing module is operable to attribute the pressure measurement, touch, and/or hover and/or various actions as various inputs (e.g., when the pen capacitance is at a higher end of a pressure range, a user is pressing the pen to indicate a darker stroke, when the capacitance is within the touch range and a double tap occurs, the user is performing a selection function, etc.).

While the example of FIG. 5 shows one pen 35 interacting with the touch screen 25, multiple pens and/or fingers may simultaneously interact with the touch screen 25. For example, while pen 35 is interacting with the touch screen, a finger touches the touch screen 25 in a different area to convey different information to the communication device 12. As another example, a second pen interacts with the touch screen 25 while pen 35 is interacting with the touch screen.

Figure 6:
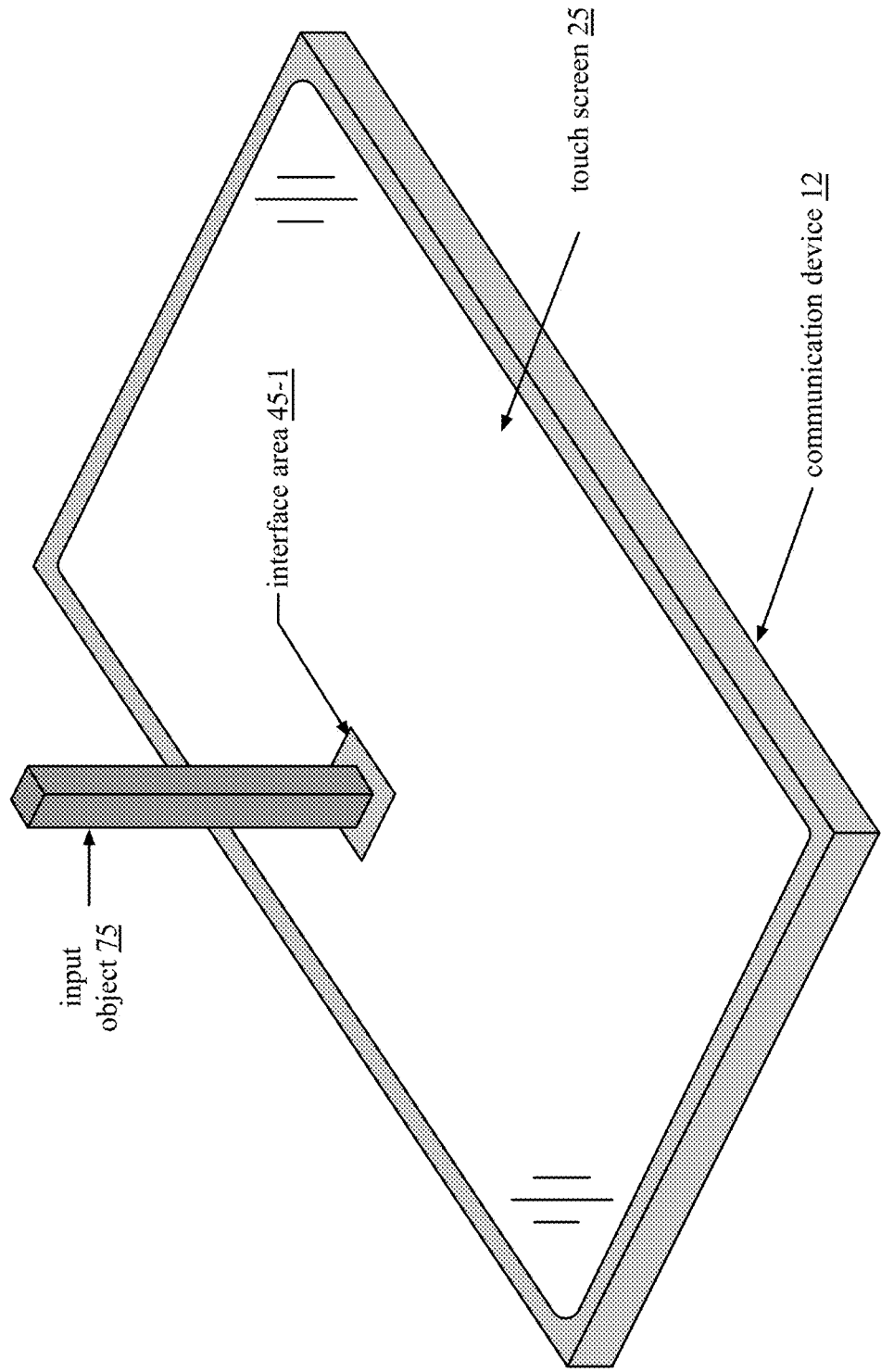
FIG. 6 is a schematic block diagram of an embodiment of a communication device and an input object.

FIG. 6 is a schematic block diagram of an embodiment of a communication device 12 having a touch screen 25, which may further include a display to form a touch screen display. The communication device 12 operates similarly to the computing device 12 of FIGS. 2-4. The touch screen 25 may be the touch screen of any of FIGS. 2-4. For example, the touch screen 25 is the touch screen with sensors, actuators, and drive-sense circuits 20 of FIG. 4. As another example, the touch screen 25 is the touch screen with sensors and drive-sense circuits 16 of FIG. 2.

In this example, an input object 75 (e.g., an art tool, a game piece, a mouse, an eraser, etc.) interacts with the touch screen 25 to communicate data with the computing device 12. For example, the input object 75 touches, or nearly touches, the touch screen 25 at an interface area 45-1. The input object 75 may a be passive or active object. When the input object 75 is a passive input object 75, the touch screen 25 (i.e., the touch screen processing module) must first identify that the object in close proximity to the touch screen is an input object 75 (e.g., versus a finger, a pen, a non-interactive object (e.g., a coffee mug), a palm, etc.).

The touch screen 25 detects, via one or more drive-sense circuits of the touch screen, changes in electrical characteristics of sensors of the touch screen. The touch screen determines an interface area 45-1 based on the location of affected sensors and is operable to associate the interface area with the input object 75. For example, the touch screen 25 analyzes the size and shape of the interface area 45-1 in comparison with known interface areas associated with known interactive objects. The input object 75 is a known interactive object (e.g., the touch screen 25 anticipates interaction with the input object 75 and stores information related to input object 75 detection). An interface area 45-1 associated with an input object 75 in this example resembles a small square (e.g., larger than a pen and a different shape than a finger).

An impedance pattern of the interface area 45-1 is also analyzed in comparison to known impedance patterns associated with the known interactive objects. For example, a consistently distributed impedance measurement in a certain range in the small square sized area may indicate the input object 75 whereas an impedance pattern having various impedance levels (e.g., some sections have higher impedance as compared to others) over a larger area may indicate a palm or a hand. When the size and shape of the interface area is a substantial match with the size and shape of the known interface area of the input object 75 and the impedance pattern is indicative of the input object 75, the touch screen associates the interface area 45-1 with the input object 75 (e.g., the shape and size of the interface area 45-1 is a small square similar to the contact area of the input object 75 and the impedance pattern includes measurements indicative of input object 75 contact).

The known interface area 45-1 may include a plurality of known interface areas indicative of the input object 75. For example, a user may place the input object 75 on its edge to perform a function which changes the interface area 45-1 of the input object 75. When the size and shape of the interface area is a substantial match with the size and shape of the known interface area of the input object 75 and the impedance pattern is indicative of the input object 75, the touch screen associates the interface area 45-1 with the input object 75 (e.g., the shape and size of the interface area 45-1 is a small straight line like the contact area of an edge of the input object 75 and the impedance pattern includes measurements indicative of input object 75 contact). The interface area 45-1 may be indicative of a particular function (e.g., the edge is used as an eraser function and the square is used as a marker function).

An input object 75 may include a conductive or a dielectric material for interaction with the touch screen 25. The material causes an impedance and/or frequency effect on sensors of the touch screen when the object is in close proximity to the touch screen 12. Dielectric materials generally increase mutual capacitance whereas conductive materials typically decrease mutual capacitance. The touch screen is operable to detect either or both effects.

Presence of a conductive or dielectric material alone near the touch screen 25 causes a small mutual capacitance change of sensors within the interface area 45-1 of the touch screen 25 (e.g., dielectric materials generally increase mutual capacitance whereas conductive materials generally decrease mutual capacitance) that is detectable by one or more of the highly sensitive drive-sense circuits. When a user touches a conductive input object 75, the capacitance of the human body causes a self capacitance and a mutual capacitance change of sensors of the interface area 45-1 of the touch screen 25 that are detectable by one or more drive-sense circuits. Mutual and self capacitance information can be used to convey different information (e.g., detection of an object that is not in use, location of an object in use on the touch screen, etc.).

(HD), an aspect ratio of a set of aspect ratios, and a screen size equal to or greater than thirty-two inches. The following table lists various combinations of resolution, aspect ratio, and screen size for the display, but it is not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

When the input object 75 is a passive input object, the input object 75 may include a variable capacitor for detecting pressure changes in a z-direction. For example, as a user applies pressure to moveable conductive section (e.g., a conductive tip) of the input object 75, a variable capacitor of the passive input object 75 is compressed by the moveable conductive section. Compression of the variable capacitor creates a capacitance change (e.g., capacitance of the input object increases with compression) that affects electrical characteristics of sensors of the touch screen. Within the interface area 45-1, the touch screen 25 recognizes an impedance change due the capacitance change of the input object 75 and attributes the capacitance to a pressure measurement. The touch screen may associate the pressure measurement with a user input (e.g., when the pressure is greater, a user is pressing the input object 75 to indicate a darker stroke, the user is performing a selection function, etc.).

While the example of FIG. 6 shows one input object 75 interacting with the touch screen 25, multiple input objects 75 and/or fingers may simultaneously interact with the touch screen 25. For example, while input object 75 is interacting with the touch screen, a finger touches the touch screen 25 in a different area to convey different information to the communication device 12. As another example, a second input object (or a pen) interacts with the touch screen 25 while input object 75 is interacting with the touch screen.

Figure 7:
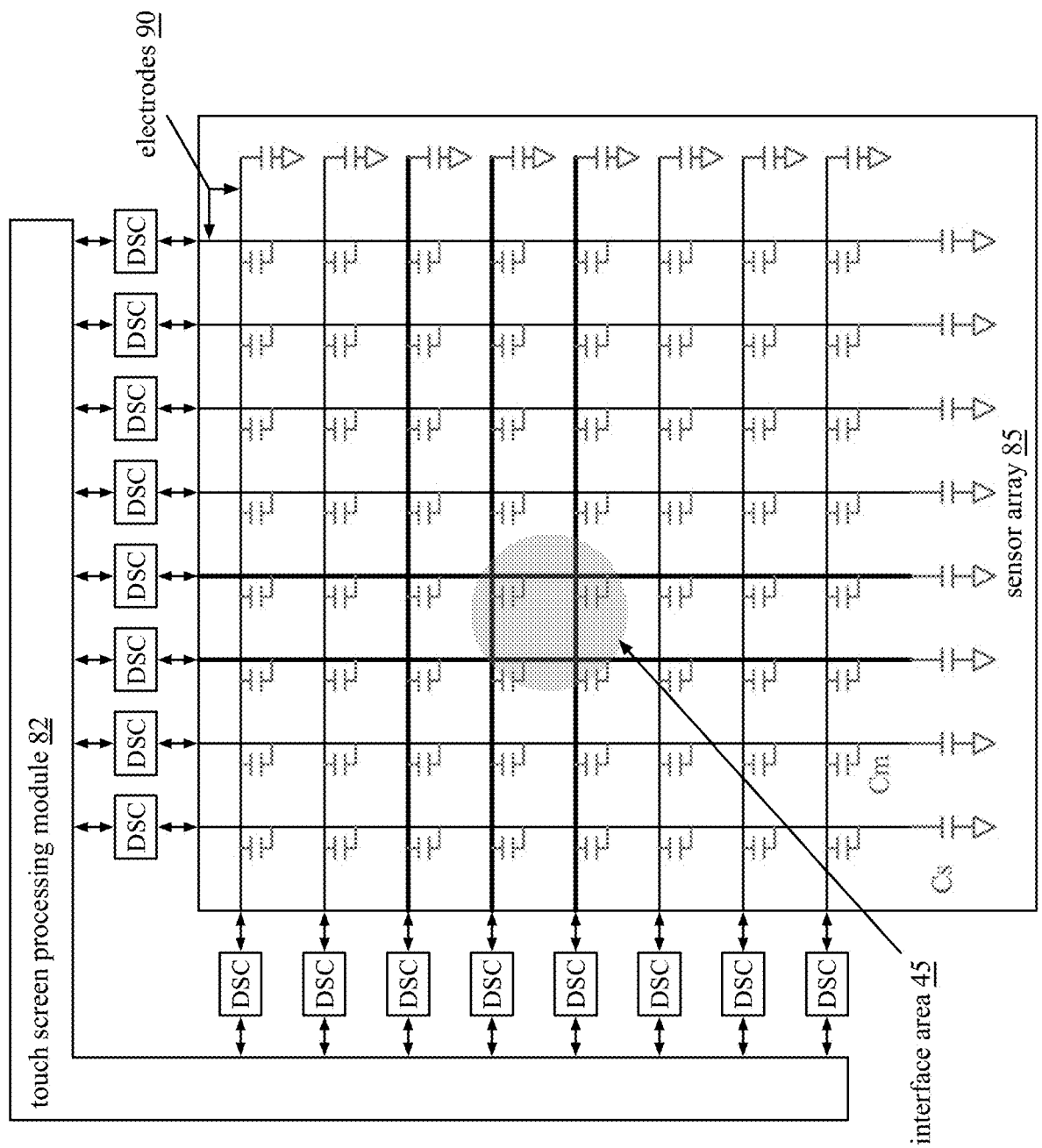
FIG. 7 is a schematic block diagram of an embodiment of a touch screen of a communication device.

FIG. 7 is a schematic block diagram of a touch screen 25 (e.g., touch screen with sensors and drive-sense circuits (DSC) 16 of FIG. 2) that includes a plurality of drive-sense circuits (DSC), a sensor array 85, and a touch screen processing module 82. The touch screen may further include a display making it a touch screen display. The touch screen 25 may be part of an interactive display, or other device that includes a touch screen display. An interactive display functions to provide users with an interactive experience (e.g., touch the screen to obtain information, be entertained, etc.).

The touch screen 25 may include a large display that has a resolution equal to or greater than full high definition The display is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (TPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The sensor array 85 includes a plurality of integrated electrodes 90 that provide the sensors for the touch sense part of the touch screen 25. The electrodes 90 are distributed throughout a display area or where touch sense functionality is desired. For example, a first group of the electrodes are arranged in rows and a second group of electrodes are arranged in columns. For example, the row electrodes are separated from the column electrodes by a dielectric material.

The electrodes 90 may be comprised of a transparent conductive material and are in-cell or on-cell with respect to layers of a display of the touch screen. For example, a conductive trace is placed in-cell or on-cell of a layer of the touch screen. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

Each electrode 90 has a self-capacitance (Cs) (shown in red), which corresponds to a parasitic capacitance created by the electrode with respect to other conductors in the display (e.g., ground, conductive layer(s), and/or one or more other electrodes). Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance. In addition to self-capacitance, a mutual capacitance (Cm) (shown in blue) exists between a row and column electrode.

In an example of operation, the touch screen 25 receives frames of video (e.g., frames of a video file, refresh rate for a word processing document, a series of images, etc.) from a processing module (e.g., the video graphics processing module 48 of FIGS. 2-4). The touch screen 25 renders the frames of video into visible images.

While the touch screen 25 is rendering the frames of video into visible images, the drive-sense circuits (DSC) provide sensor signals to the electrodes 90. When a touch or hover is in proximity to the touch screen 25, capacitance of the electrodes 90 in an interface area 45 of the touch and/or hover is changed. In essence, a finger touch creates a parallel capacitance with the parasitic self-capacitances. For example, during a touch, the self-capacitance of an electrode 90 is $C_s$ (self capacitance)+$C_{f1}$ (finger capacitance). As such, a touch increases the self-capacitance of the affected electrodes, which decreases the impedance for a given frequency (based on $\frac{1}{2\pi fC}$).

A finger capacitance is effectively in series with the mutual capacitance (Cm), which decreases capacitance of the mutual capacitance. As such, a touch decreases the mutual capacitance of the affected electrodes, which increases the impedance for a given frequency (based on based on $\frac{1}{2\pi fC}$).

The electrical field of the self and mutual capacitances of electrodes extends beyond the surface of the touch screen. A hover therefore affects the electrical field and causes capacitive coupling from a finger or input device to the touch screen. This capacitive coupling is detectable by the touch screen and based on the level of capacitance change, can be distinguished from a touch.

The DSCs detect the changes in impedance of the self-capacitance and mutual capacitance and provide the detected changes to the touch screen processing module 82. The touch screen processing module 82 processes the capacitance changes of the affected electrodes to determine one or more specific locations of interaction (e.g., the interface area 45).

The touch screen processing module 82 determines whether the changes are attributable to a particular passive device by analyzing the interface area and impedance pattern of the interface area. For example, the touch screen processing module 82 analyzes the size and shape of the interface area in comparison with known interface areas associated with known interactive objects (e.g., a pen). For example, an interface area associated with a passive pen is around the size of a pen tip (e.g., smaller than a finger).

An impedance pattern of the interface area is also analyzed in comparison to known impedance patterns associated with the known interactive objects. For example, an impedance measurement in a certain range in a small pen tip sized area may indicate a passive pen whereas an impedance pattern having various impedance levels (e.g., some sections have higher impedance as compared to others) over a larger area may indicate a palm or a hand. When the size and shape of the interface area is a substantial match with the size and shape of the known interface area of a passive device (e.g., a pen) and the impedance pattern is indicative of the passive device, the touch screen associates the interface area with the passive device (e.g., the shape and size of the interface area are relatively small like a pen tip and the impedance pattern includes a measurement indicative of passive pen tip contact).

Presence of a conductive or dielectric material alone near the touch screen causes a small mutual capacitance change of electrode(s) within the pen interface area 45 of the touch screen 25 (e.g., dielectric materials generally increase mutual capacitance whereas conductive materials generally decrease mutual capacitance) that is detectable by one or more of the highly sensitive drive-sense circuits. When a user touches a conductive pen, the capacitance of the human body coupled to the pen causes a self capacitance and a mutual capacitance change of sensors (e.g., electrodes) of the pen interface area 45 of the touch screen 25 that is detectable by one or more drive-sense circuits of the touch screen. Mutual and self capacitance information can be used to convey different information (e.g., a mutual capacitance change without a self capacitance change along with the size of the interface area may indicate the presence of a pen that is not in use, a mutual and self capacitance change indicates a touch, etc.).

When a passive pen includes a variable capacitor for pressure sensing, as a user applies pressure to a conductive pen tip of the passive pen, the variable capacitor is compressed by the conductive pen tip. Compression of the variable capacitor creates a capacitance change (e.g., capacitance of the pen increases with compression) that affects electrical characteristics of electrodes of the touch screen within the pen interface area 45.

Based on the change in electrical characteristics of the electrodes and the knowledge of the particular object (e.g., the touch screen is aware of a passive pen), the touch screen processing module 82 interprets the change in electrical characteristics of the electrodes caused by the pressure as impedance values.

When the impedance values are within a first range, the touch screen processing module interprets the impedance values as a touch. When the impedance values are within a second range, the touch screen processing module interprets the impedance values as a pressure measurement where the second range is lower (i.e., the capacitance is higher) than the first range. The pressure measurement determined is an absolute measurement. When the impedance values are within a third range, the touch screen processing module interprets the impedance values as a hover where the third range is higher (i.e., the capacitance is lower) than the first range. The touch screen processing module is operable to attribute the pressure measurement, touch, and/or hover and/or various actions as various inputs (e.g., when the pen capacitance is at a higher end of a pressure range, a user is pressing the pen to indicate a darker stroke, when the capacitance is within the touch range and a double tap occurs, the user is performing a selection function, etc.).

The touch screen processing module 82 may provide information to another processing module (e.g., processing module 42 of FIGS. 3-4). For example, the processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 8:
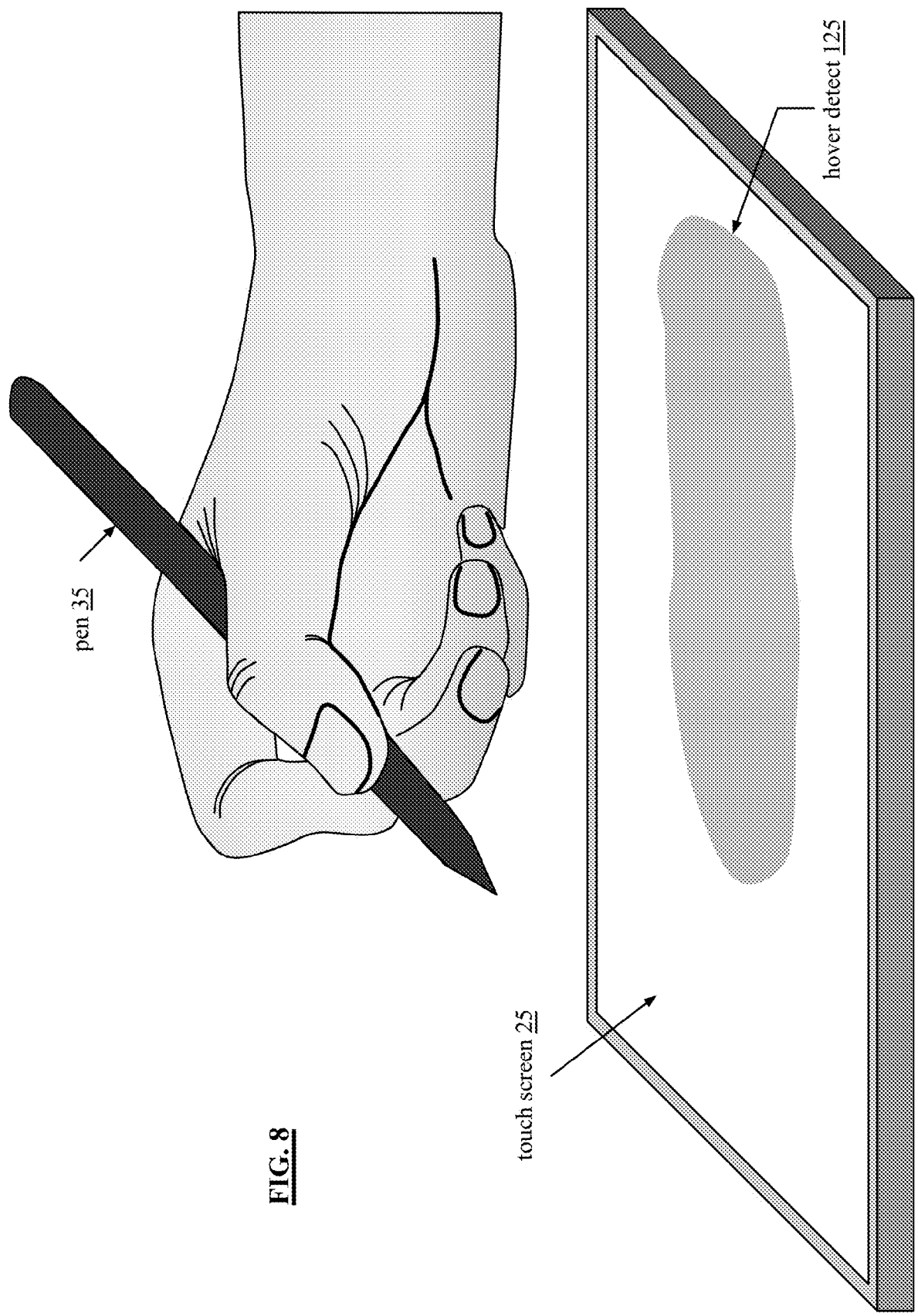
FIG. 8 is a diagram of an example of a pen approaching a touch screen of a communication device.

FIG. 8 is a diagram of an example of a pen 35 approaching a touch screen 25 of a communication device 12. The hand of the user and the conductive pen in contact with the hand have capacitances that affect electrical characteristics of electrodes of the touch screen 25. Based on the amount of capacitance change (e.g., the amount of change will be less in comparison to a touch) and an amount of electrodes affected (e.g., a hand affects more electrodes than a pen tip), the computing device 12 detects a hover indicative of a hand and pen as it approaches the touch screen 25.

Based on the shape and size of the hover detect area, the touch screen is operable to distinguish between an unintended hover detect area and an intended hover detect area. For example, the shape of the hand may be considered an unintended hover whereas the pen tip shape is determined to be an intended hover area such that hover functions can take place in the intended areas (e.g., the pen approaching the screen).

Figure 9:
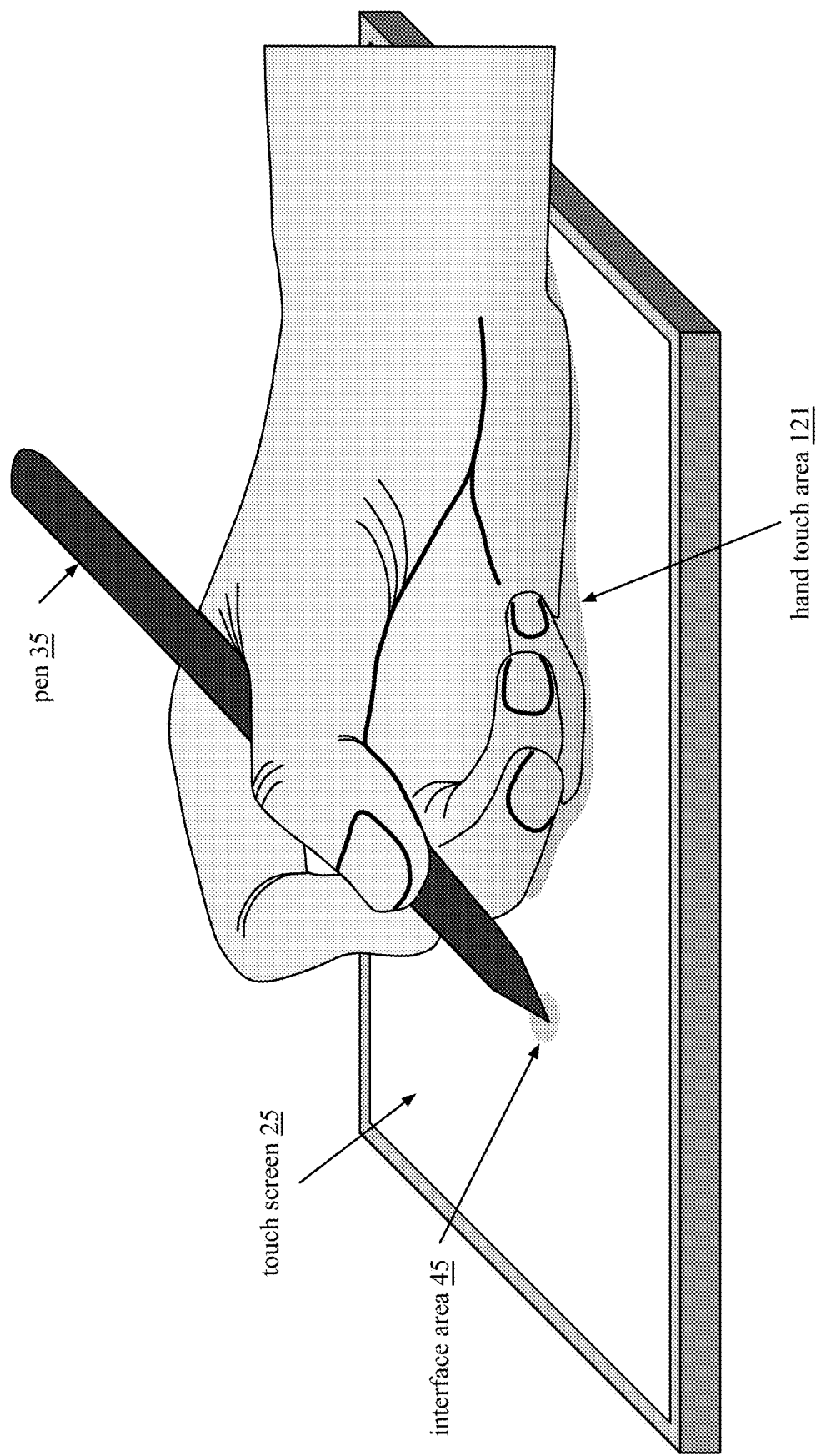
FIG. 9 is a diagram of an example of a pen touching a touch screen of a communication device.

FIG. 9 is a diagram of an example of a pen 35 touching a touch screen 25 of a communication device 12. In this example, the pen touches the touch screen 25 at an interface area 45 and the hand touches the screen in a hand touch area 121. The computing device 12 can distinguish between the pen touch and the hand touch based on the size and shape of the interface area 45 in comparison to the hand touch area 121. Also, an impedance pattern of the interface area 45 as compared to the impedance pattern of the hand touch area are distinguish between the two areas. For example, the wrist the finger area near the pen may be more on the screen than the rest of the hand resulting in different impedance change detection across the hand touch area 121. In the interface area 45, the impedance pattern includes a consistently distributed impedance change indicative of a pen tip contact.

When the pen 35 includes pressure sensing (e.g., it includes a pressure sensor or a variable capacitor), as pressure is applied to the pen tip, the interface area 45 will remain substantially the same size, but the capacitance of the pen will vary, which is indicative of a pen tip contact. In an example, measurement of the z pressure is decoded by the touch screen processing module as a scaled percentage of the difference between the minimum and maximum energy values from a touch on the touch screen 25. As a specific example, if a touch is represented by a value in the range between 0 to 255 (8-bit binary value) when the touch screen processing module is calibrated, with the minimum (0 or 0%) and maximum (255 or 100%) signal values, a pressure value is reported as a dynamic value within that range.

Based on an expected interface area 45 size and impedance pattern information within the interface area 45 as compared to the hand touch area 121, the touch screen processing module 82 is operable to disregard electrical characteristic changes of electrodes within the hand touch area 121.

Figure 10:
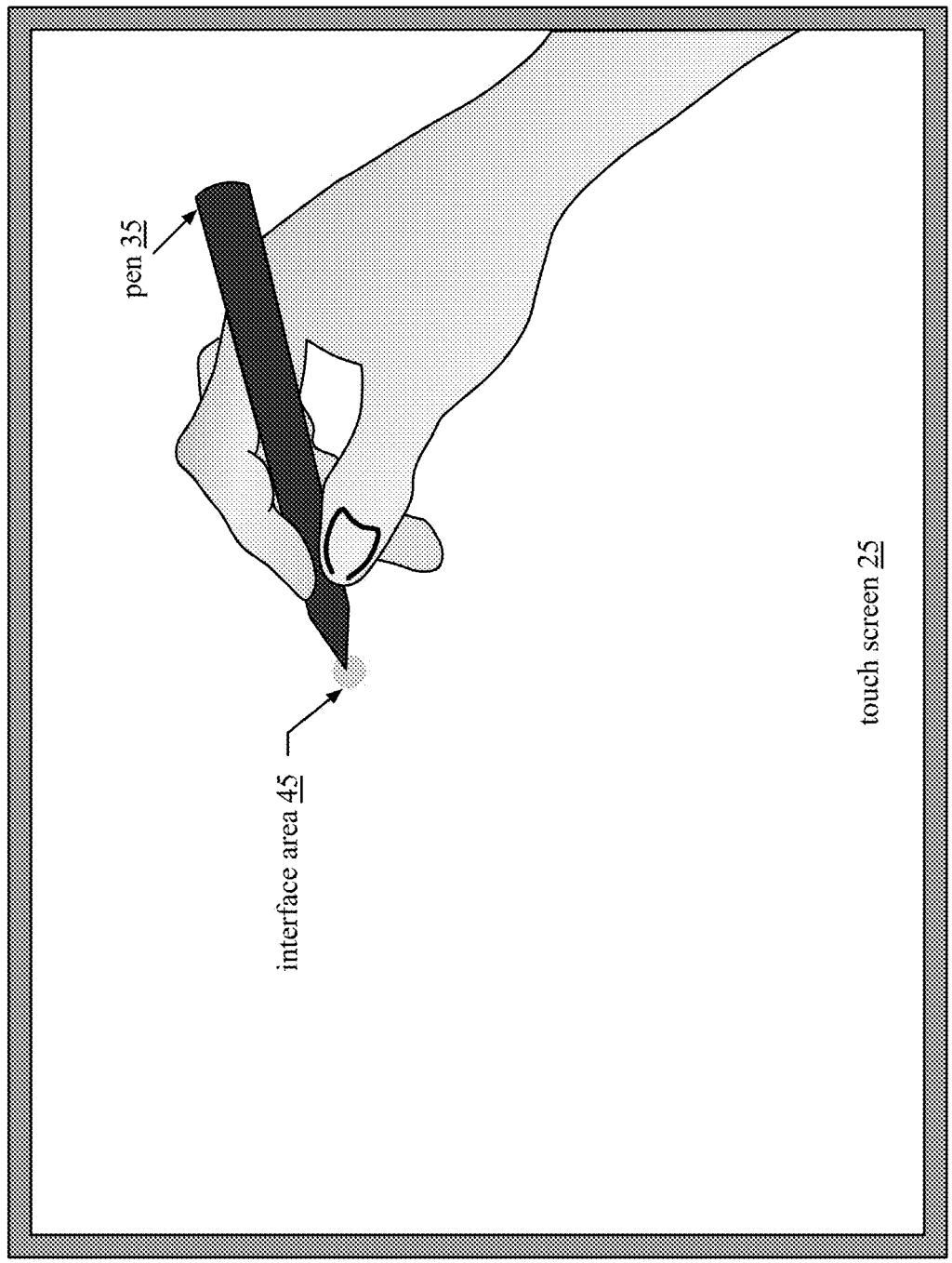
FIG. 10 is a diagram of another example of a pen touching a touch screen of a communication device.

FIG. 10 is a diagram of another example of a pen 35 touching a touch screen 25 of a communication device 12. FIG. 10 is similar to the example of FIG. 9 except that a different angle of view is shown. From this viewpoint, the area difference of the interface area 45 of the pen 35 and the hand touch area is clear. Further, this viewpoint illustrates that the pen 35 may be held at different angles with respect to the touch screen 25 surface. The angle of which the pen tip 35 interfaces with the touch screen 25 may affect the amount of area of the interface area 45. As such, a higher pressure measurement with less area affected may indicate one function (e.g., drawing with a fine stroke) whereas a lower pressure measurement with more area affected may indicated another function (e.g., drawing with a broader stroke).

FIG. 11 is a schematic block diagram of an example of capacitance of a touch screen 25 with no contact. As shown, the touch screen 25 includes a plurality of layers 92-96. Each illustrated layer may itself include one or more layers. For example, a dielectric layer 92 (e.g., the cover layer) includes a surface protective film, a glass protective film, and/or one or more pressure sensitive adhesive (PSA) layers. As another example, the second dielectric layer 94 includes a glass cover, a polyester (PET) film, a support plate (glass or plastic) to support, or embed, one or more of the electrodes 90-r and 90-c, a base plate (glass, plastic, or PET), an ITO layer, and one or more PSA layers.

As yet another example, the display substrate 96 includes one or more LCD layers, a back-light layer, one or more reflector layers, one or more polarizing layers, and/or one or more PSA layers. In this example, a row electrode 90-r and a column electrode 90-c are positioned proximal to a dielectric layer 94, which is between the cover dielectric layer 92 and the display substrate 96. The row electrode 90-r and column electrode 90-c are on the same layer. Each electrode 90 has a self-capacitance, which corresponds to a parasitic capacitance created by the electrode with respect to other conductors in the display (e.g., ground, conductive layer(s), and/or one or more other electrodes).

For example, the row electrode 90-r has a self capacitance $C_{s2}$, and the column electrode 90-c has a self capacitance $C_{s1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic self-capacitance.

A mutual capacitance ($C_{m\_0}$) exists between the row electrode 90-r and column electrode 90-c. When no touch and/or device is present (e.g., no contact), the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

FIG. 12 is a schematic block diagram of an example of capacitance of a touch screen with hover. The touch screen 25 of FIG. 12 is similar to the touch screen 25 of FIG. 11 except that a hand holding a pen 35 (or an input object) is hovering in close proximity to the touch screen 25. The hand holding the pen 35 capacitively couples to the touch screen 25 via capacitances $C_{x1}$ and $C_{x2}$. Because the human body has a ground connection, the capacitive coupling affects both the mutual capacitance $C_{m\_0}$ and the self capacitances $C_{s2}$ and $C_{s1}$ of the affected electrodes 90.

For example, the hovering hand may cause an increase in self-capacitance (e.g., the capacitance of the electrode with respect to a reference (e.g., ground, etc.)). Further, the hovering hand may cause a decrease in mutual capacitance (e.g., the capacitance between a row electrode and a column electrode). The amount of electrodes affected and the amount of impedance change detected can be used to distinguish the hover from other conditions such as a touch.

Figure 13:
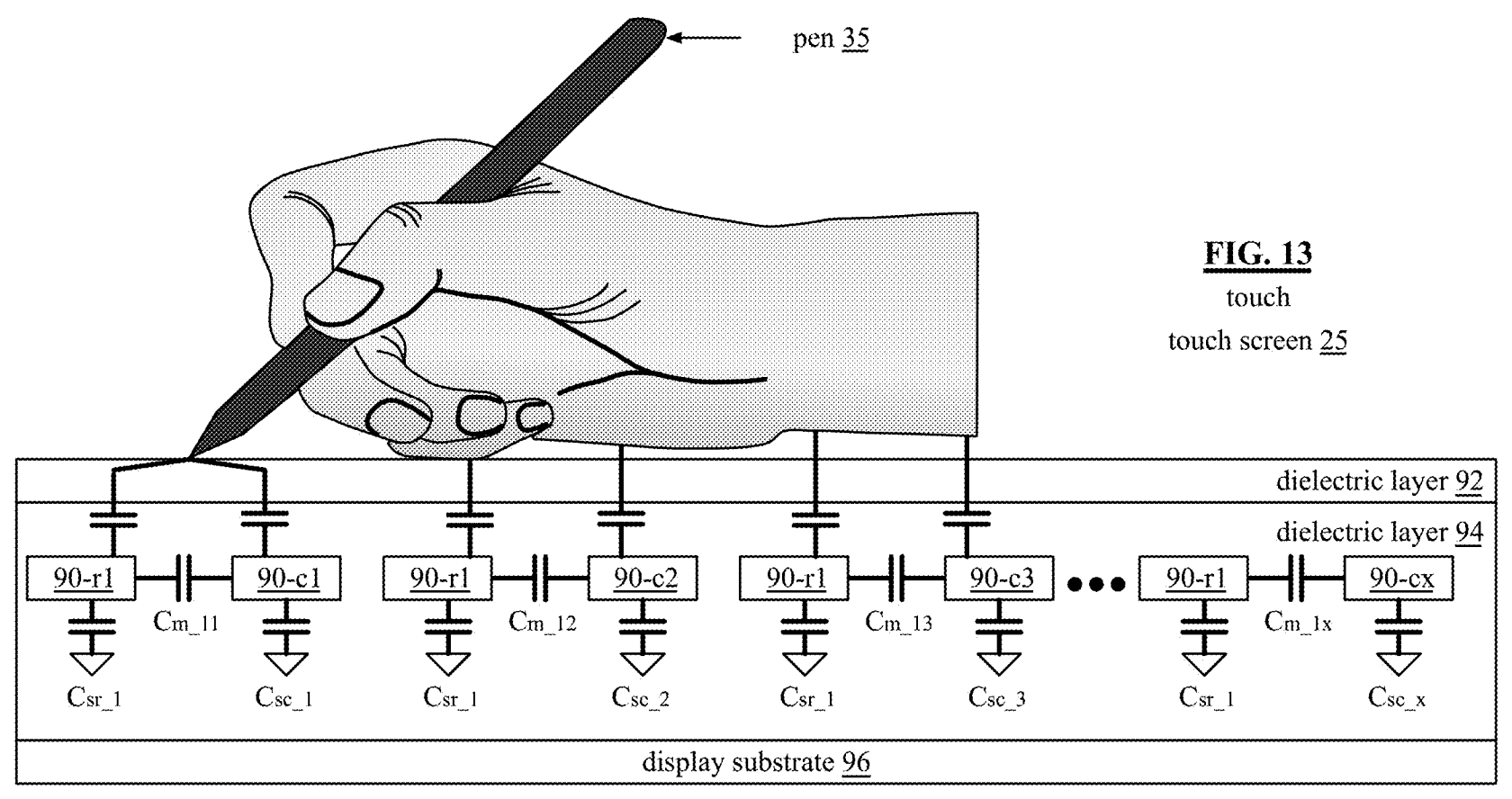

FIG. 13 is a schematic block diagram of an example of capacitance of a touch screen with contact. The touch screen 25 of FIG. 13 is similar to the touch screen 25 of FIG. 12 except that the hand holding a pen 35 (or an input object) and the pen 35 are touching the touch screen 25. The hand and pen are capacitively connected to the touch screen 25 and affect a plurality of electrodes. For example, the hand has a larger interface area and is affecting the row electrode 90-r1 as well as column electrodes 90-c2 and 90-c3. The pinky finger of the hand has a direct capacitive connection on the touch screen and the rest of the hand is capacitively coupled from hovering just over the touch screen. The pen has a smaller interface area and is affecting the row electrode 90-r1 and the column electrode 90-c1.

Because the human body has a ground connection, the capacitive connection affects the mutual capacitances and the self capacitances of the affected electrodes 90. The capacitance changes of the row electrode 90-r1 as well as column electrodes 90-c2 and 90-c3 will have different measurements due to the uneven contact with the touch screen 25. The smaller interface area of the pen 35 results in a smaller, consistently distributed capacitance effect on less electrodes in comparison to the greater, more inconsistently distributed capacitance effect in the larger interface area of the hand. A smaller capacitance effect on less electrodes near the larger capacitance effect on multiple electrodes can be distinguished as a touch whereas the larger capacitance effect on multiple electrodes can be ignored.

Figure 14:
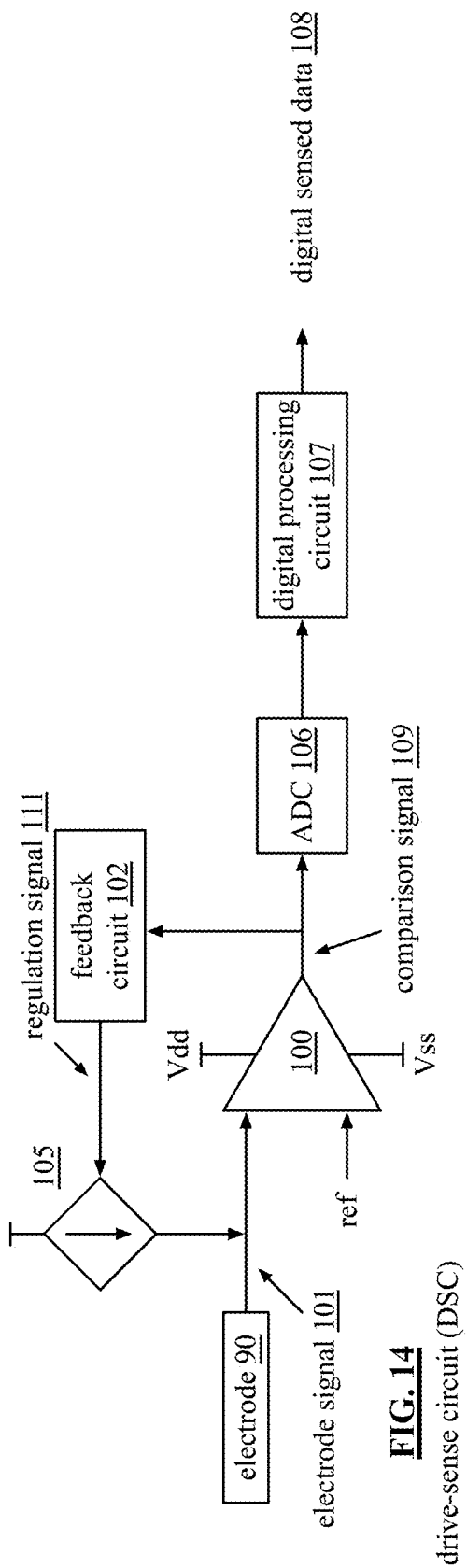
FIG. 14 is a schematic block diagram of an embodiment of a drive-sense circuit (DSC)

FIG. 14 is a schematic block diagram of an embodiment of a drive-sense circuit (DSC) that includes an operational amplifier (op-amp) 100, an analog to digital converter (ADC) 106, a feedback circuit 102, a power source circuit 105, and a digital processing circuit 107. The drive-sense circuit is coupled to an electrode 90.

The ADC 106 may be implemented in a variety of ways. For example, the ADC 106 is implemented as a flash ADC, a successive approximation ADC, a ramp-compare ADC, a Wilkinson ADC, an integrating ADC, and/or a delta encoded ADC. As yet another example, the ADC 106 is implemented as a sigma-delta ADC.

The power source circuit 105 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 105 generates a power signal to include a DC (direct current) component and an oscillating component.

The feedback circuit 102 may be a wire, a resistor, and/or a regulation circuit that creates a regulation signal to substantially remove any effects on the power signal, etc. The regulation of the power signal 102 may be done by regulating the magnitude of the DC and/or AC components, by adjusting the frequency of AC component, and/or by adjusting the phase of the AC component.

The digital processing circuit 107 may include one or more digital filtering circuits to produce raw data. The one or more digital filtering circuits includes one or more finite impulse response (FIR) filters, one or more cascaded integrated comb (CIC) filters, one or more infinite impulse response (FIR) filters, one or more decimation stages, one or more fast Fourier transform (FFT) filters, and/or one or more discrete Fourier transform (DFT) filters, and/or one or more polyphase filters. The digital processing circuit 107 may further include a processing module operable to interpret the raw data (e.g., identify a touch).

When receiving the power signal and when exposed to a condition, an electrical characteristic of the electrode 90 affects the power signal. The op-amp 100 compares the power signal, which is affected by the electrode (e.g., electrode signal 101), with a reference signal (ref) that includes DC and AC components to produce a comparison signal 109. The feedback circuit 102 feeds the comparison signal 109 to the power source circuit 105 (or regulates the comparison signal to produce a regulation signal 111 and feeds the regulation signal to the power source circuit 105).

The power source circuit 105 is operable to adjust the power signal based on the regulation signal 111 to remove the effect of the condition on the power signal. The ADC 106 converts the comparison signal to a digital signal and provides it to the digital processing circuit 107. The digital processing circuit 107 filters and processes the digital comparison signal to produce digital sensed data 108. The digital sensed data 108 may include raw data (e.g., impedance amounts) and/or processed data (e.g., touch, no touch, hover).

Figure 15:
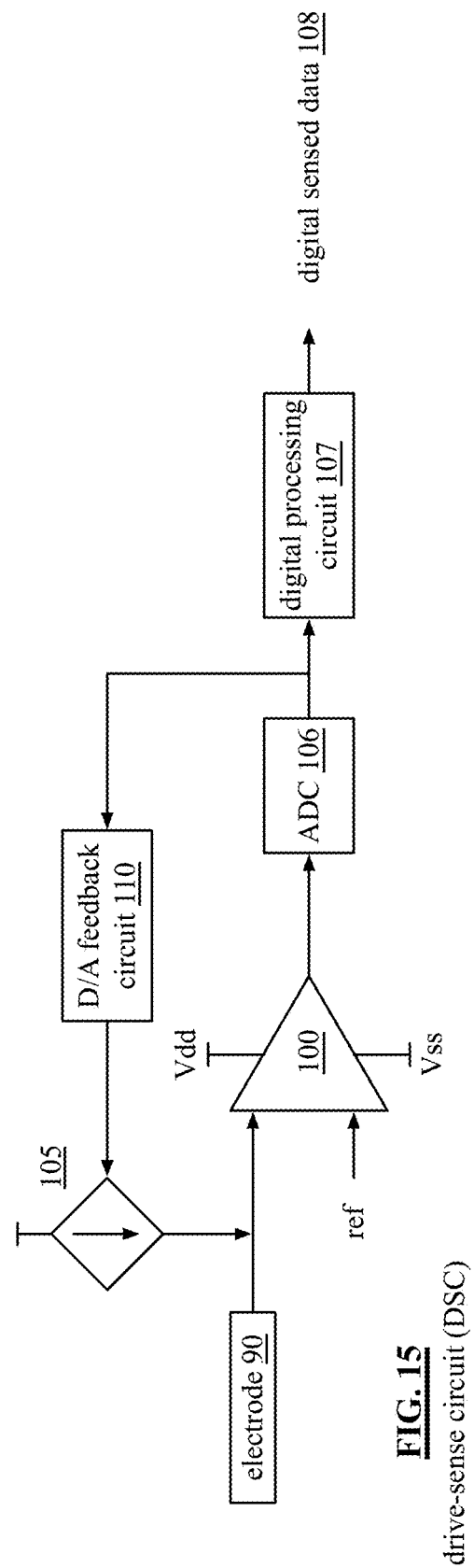
FIG. 15 is a schematic block diagram of another embodiment of a drive-sense circuit (DSC)

FIG. 15 is a schematic block diagram of another embodiment of a drive-sense circuit (DSC) that includes an operational amplifier (op-amp) 100, an analog to digital converter (ADC) 106, a digital to analog (D/A) feedback circuit 110, a power source circuit 105, and a digital processing circuit 107. The drive-sense circuit of FIG. 15 operates similarly to the drive-sense circuit of FIG. 14 except that the feedback circuit is included after the ADC 106 and includes a digital to analog converter component.

Figure 16:
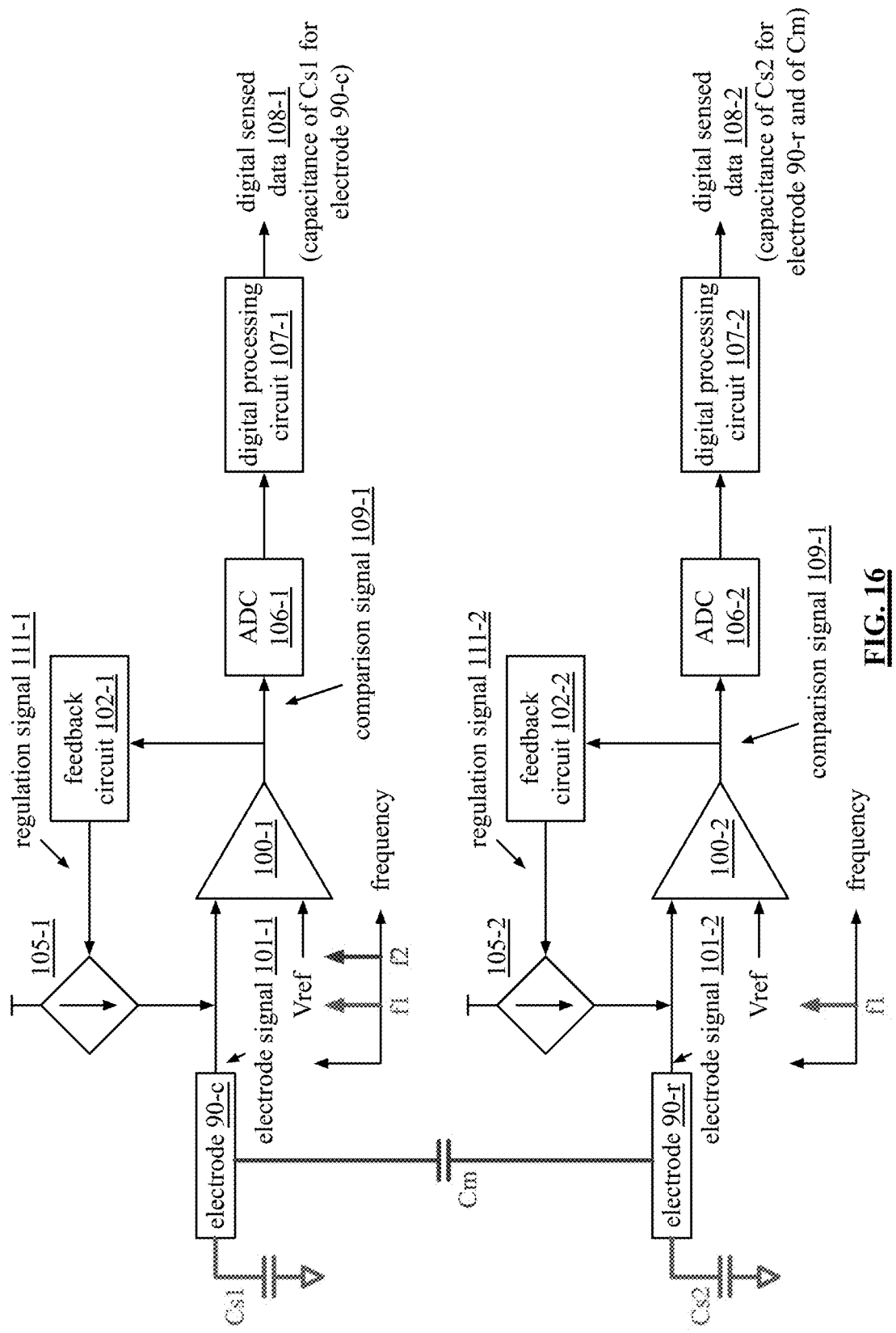
FIG. 16 is a schematic block diagram of an example of two drive-sense circuits (DSC) coupled to two electrodes.

FIG. 16 is a schematic block diagram of an example of two drive-sense circuits (DSC) coupled to two electrodes. A first drive-sense circuit includes an operational amplifier (op-amp) 100-1, an analog to digital converter (ADC) 106-1, a feedback circuit 102-1, a power source circuit 105-1, and a digital processing circuit 107-1. A second drive-sense circuit includes an operational amplifier (op-amp) 100-2, an analog to digital converter (ADC) 106-2, a feedback circuit 102-2, a power source circuit 105-2, and a digital processing circuit 107-2. The first drive-sense circuit is coupled to a column electrode 90-c and the second drive-sense circuit is coupled to a row electrode 90-r.

A reference signal provided to the op-amp 100-1 of the first drive-sense circuit includes an oscillating component at a first frequency f1 (shown in red) and an oscillating component at a second frequency f2 (shown in blue). The reference signal provided to the op-amp 100-2 of the second drive-sense circuit includes an oscillating component at the first frequency f1 (shown in red). The first frequency f1 is used to measure the self capacitance (shown in red) of each electrode and the second frequency f2 is used to measure the mutual capacitance (shown in blue) between the electrodes.

The power source circuits 105-1 and 105-2 generate a power signal to include a DC (direct current) component and an oscillating component. When receiving the power signals and when exposed to a condition, an electrical characteristic of the electrodes 90 affects the power signals. The op-amps 100-1 and 100-2 each compare their respective power signal, which are affected by the electrodes (electrode signals 101-1 and 101-2), with respective reference signals (Vref) to produce comparison signals 109-1 and 109-2. The feedback circuits 102-1 and 102-2 feed the comparison signals to the respective power source circuits 105-1 and 105-2 (or regulate the comparison signal to produce a regulation signal 111 and feed the regulation signal to the power source circuits 105-1 and 105-2).

The power source circuits 105-1 and 105-2 are operable to adjust the respective power signals based on the regulation signals to remove the effects of the condition on the power signals. The ADCs 106-1 and 106-2 convert the comparison signals 109-1 and 109-2 to digital signals and provide them to a respective digital processing circuit 107-1 and 107-2. The digital processing circuits 107-1 and 107-2 filter and process the digital comparison signals to produce digital sensed data 108-1 and 108-2. The digital sensed data 108-1 and 108-2 may include raw data (e.g., impedance amounts) and/or processed data (e.g., touch, no touch, hover).

In this example, the digital processing circuit 107-1 of the first drive-sense circuit filters the digital comparison signal to extract a pure tone value at the first frequency that is representative of a self capacitance measurement of the column electrode 90-c. The digital sensed data 108-1 produced by the first drive-sense circuit includes a self capacitance value of Cs1 for the column electrode 90-c.

The digital processing circuit 107-2 of the second drive-sense circuit filters the digital comparison signal to extract pure tone values at the first and second frequencies that are representative of a self capacitance measurement of the row electrode 90-r and a mutual capacitance between the row and column electrodes. The digital sensed data 108-2 produced by the second drive-sense circuit includes a self capacitance value of Cs2 for the row electrode 90-c and a mutual capacitance value of Cm between the row and column electrode. Because the first drive-sense circuit transmits a power signal with f1 and f2 frequency components, the second drive-sense circuit is operable to measure the mutual capacitance via the f2 component.

Figure 16A:
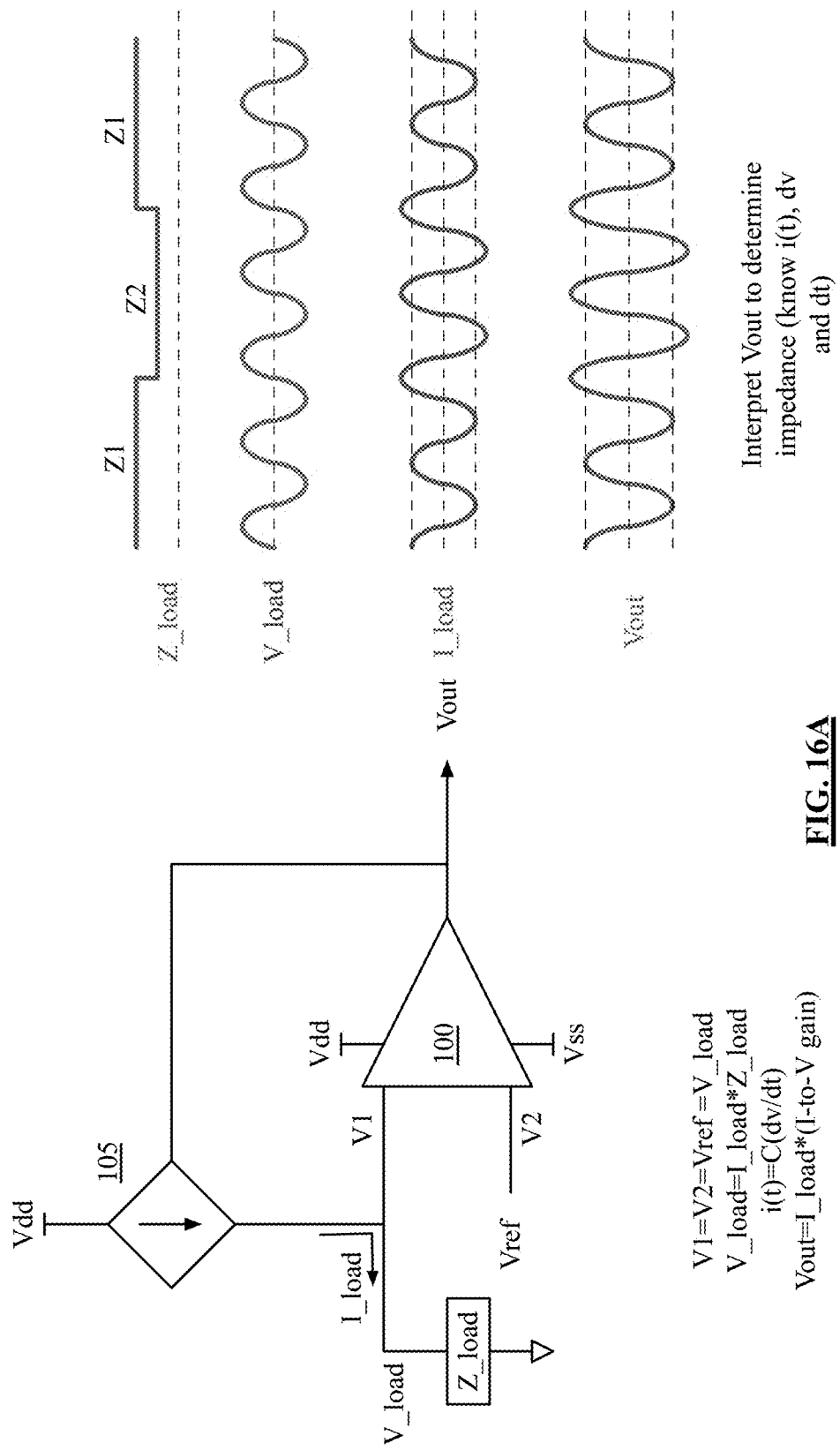
FIG. 16A is a schematic block diagram of an example of operation of a drive-sense circuit (DSC)

FIG. 16A is a schematic block diagram of an example of operation of a drive-sense circuit (DSC). The drive-sense circuit includes a power source circuit 105 and an operational amplifier (op-amp) 100 where the output of the op-amp 100 feeds back to the power source circuit 105. The drive-sense circuit is coupled to a load with an impedance of Z_load. Here, the power source circuit 105 is a current supply circuit (e.g., a current source circuit, a current mirror circuit, etc.) that produces a current-based power signal. The feedback loop operates to keep the inputs to the op-amp equal (V1 and V_load are equal to the reference signal V2 (Vref)). If V_load changes due to a condition such as a touch, I_load is adjusted by the power source circuit 105 such that V_load equals V1. Vout is a function of I_load and the I-to-V gain of the op-amp 100. Thus, a change in Z_load is determinable by interpreting Vout. The I-to-V gain of the op-amp 100 is high such that small changes Z_load are interpretable.

As shown on the right, in teal, Z_load is at level Z1 for a time period then drops to a level Z2 for a time period, and then is back to the level Z1 for a time period. V_load, shown in blue, remains constant as it is equal to Vref. However, I_load is adjusted due to the impedance change in order to keep the voltages at the op-amp inputs equal. As shown in red, I_load increases in magnitude when Z_load decreases to Z2. Vout, shown in purple, follows I_load and includes a representation of the change in impedance.

Figure 16B:
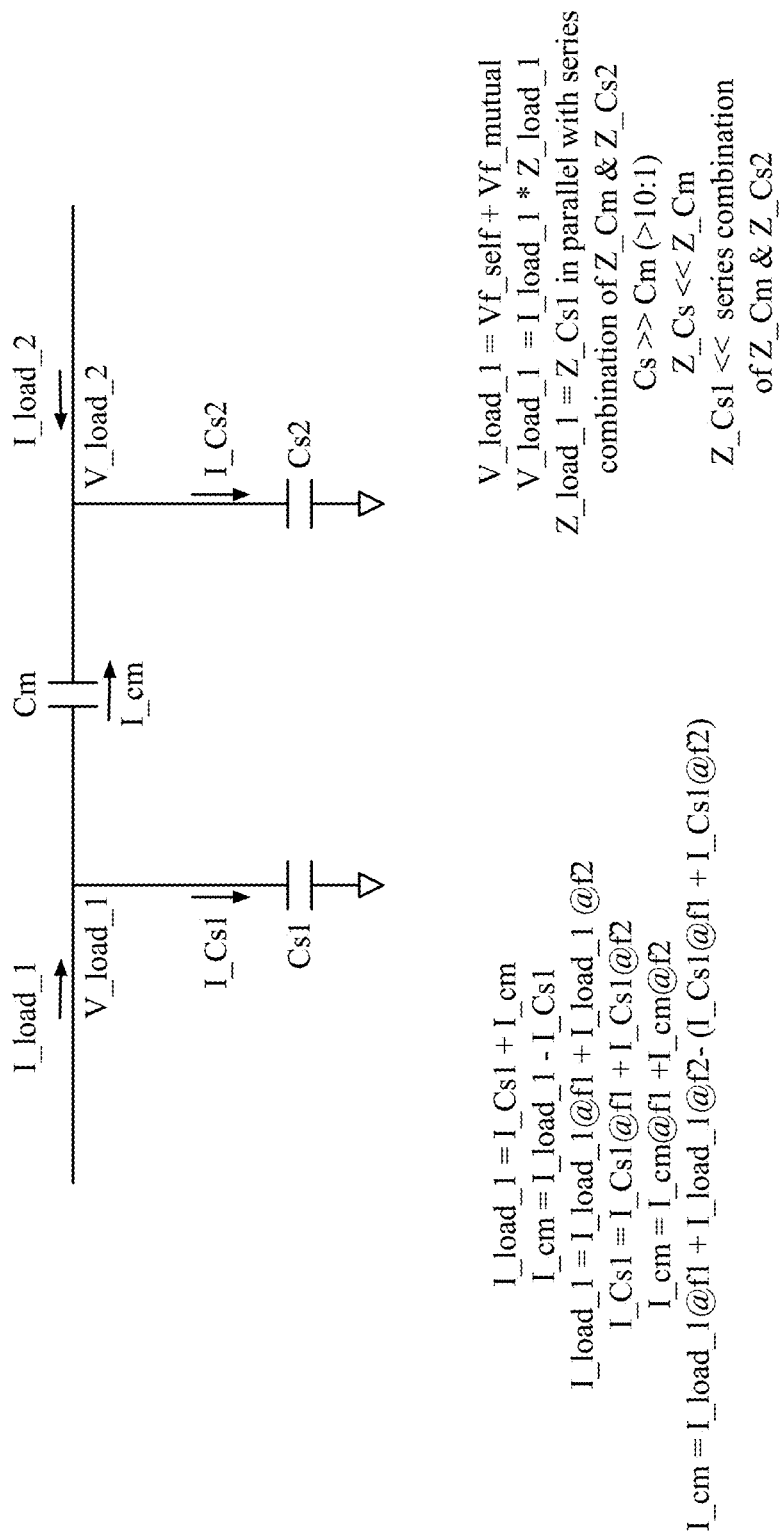
FIG. 16B is a schematic block diagram of an example of operation of two drive-sense circuits (DSC)

FIG. 16B is a schematic block diagram of an example of operation of two drive-sense circuits (DSC). Referring to the example of FIG. 16, a first drive-sense circuit is coupled to a column electrode (e.g., load_1) and the second drive-sense circuit is coupled to a row electrode (e.g., load_2). A reference signal provided to the op-amp of the first drive-sense circuit includes an oscillating component at a first frequency f1 and a second frequency f2. The reference signal provided to the op-amp of the second drive-sense circuit includes an oscillating component at the first frequency f1. The first frequency f1 is used to measure the self capacitance of each electrode and the second frequency f2 is used to measure the mutual capacitance between the electrodes.

The current of the column electrode (I_load_1) is equal to the current of self capacitance of the column electrode (I_Cs1) and the current of mutual capacitance between the electrodes (I_cm). Due to the reference signal including oscillating components at a first frequency f1 and a second frequency f2, each current can be represented as a combination of the current at each of these frequencies (e.g., I_load_1=I_load_1@f1+I_load_1@f2).

The impedance of the column electrode (Z_load_1) is equal to the impedance of the self capacitance of the column electrode (Z_Cs1) in parallel with a series combination of the impedance of mutual capacitance (Z_Cm) and the impedance of self capacitance of the row electrode (Z_Cs2). Because mutual capacitance is much lower than self capacitance (e.g., self capacitance is more than 10 times greater than mutual capacitance), the impedance Z_Cm is much higher than the impedances Z_Cs1 or Z_Cs2. Therefore, Z_Cs1 is much less than the series combination of the impedance of mutual capacitance (Z_Cm) and the impedance of self capacitance of the row electrode (Z_Cs2). Therefore, most of I_load_1 flows through Cs1. However, there is some bleed over of I_load_1 through Cm (e.g., I_cm).

Figure 16C:
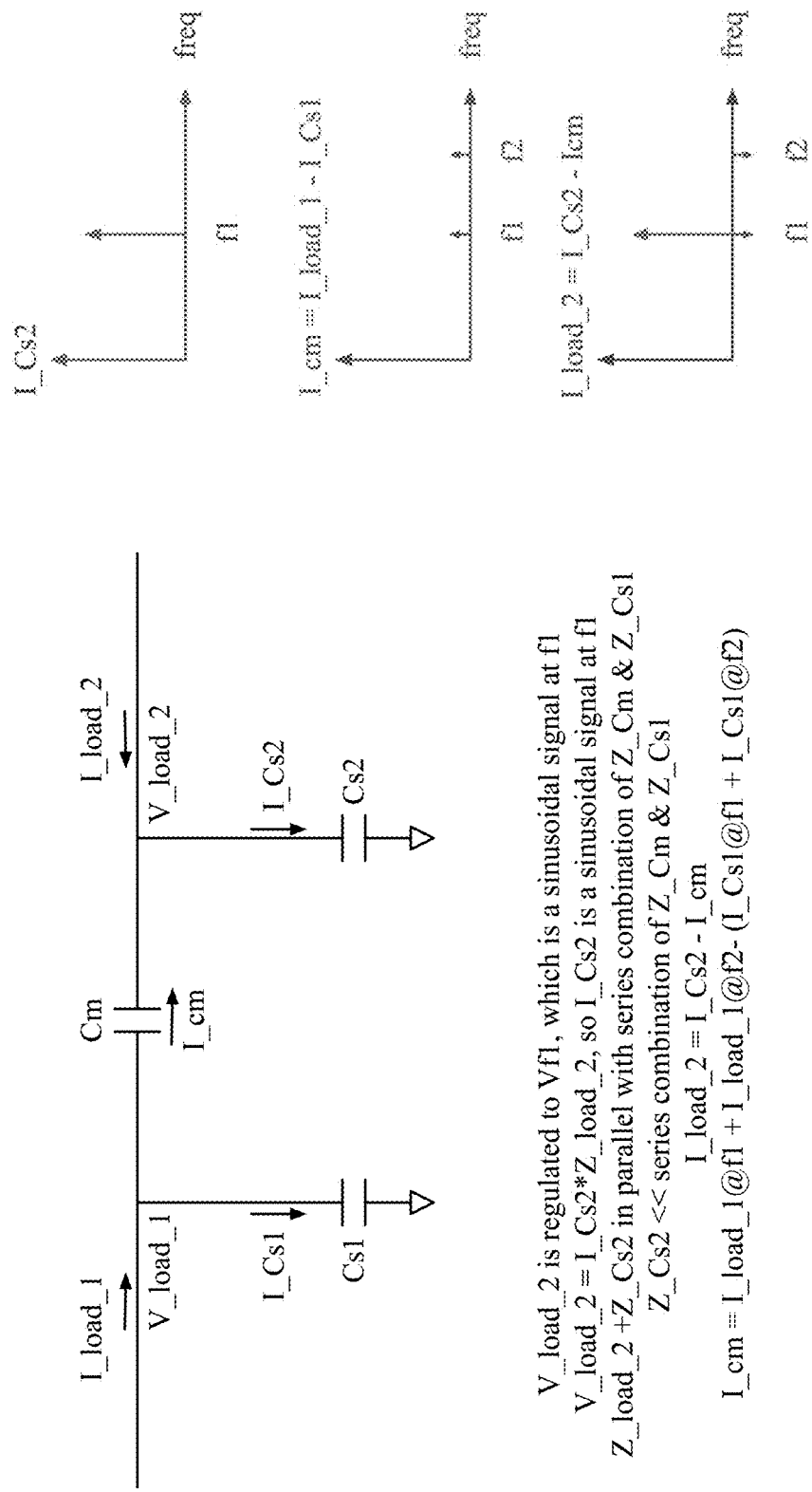
FIG. 16C is a schematic block diagram of an example of operation of two drive-sense circuits (DSC)

FIG. 16C is a schematic block diagram of an example of operation of two drive-sense circuits (DSC). Continuing the example of FIG. 16B and looking at the load_2 side, the voltage at load_2 (V_load_2) is regulated to a sinusoidal voltage signal at frequency f1. Because the voltage at load_2 is equal to the current at the self capacitance (I_Cs2) times the load at load_2 (Z_load_2), the current at the self capacitance (I_Cs2) is a sinusoidal current signal at frequency f1. As shown in blue, the current at the self capacitance (I_Cs2) in the frequency domain is a pulse at the frequency f1.

The load at load_2 (Z_load_2) is equal to the impedance of self capacitance of the row electrode (Z_Cs2) in parallel with a series combination of the impedance of mutual capacitance (Z_Cm) impedance of self capacitance of the column electrode (Z_Cs1). Z_Cs2 is much less than the series combination of the impedance of mutual capacitance (Z_Cm) and the impedance of self capacitance of the column electrode (Z_Cs1). Therefore, most of I_load_2 flows through Cs2. However, the bleed over of I_cm affects I_load_2. The current of the row electrode (I_load_2) is equal to the current of self capacitance at load_2 of the row electrode (I_Cs2) minus the current of mutual capacitance between the electrodes (I_cm).

Due to the reference signal including oscillating components at a first frequency f1 and a second frequency f2, mutual capacitance between the electrodes can be represented as I_cm=I_load_1@f1+I_load_1@f2−(I_Cs1@f1+I_Csl@f2). As shown in red, the current of mutual capacitance between the electrodes (I_cm) includes bleed over currents I_load_1 minus I_Csl in the frequency domain as pulses at frequencies f1 and f2. The current of load_2 (I_load_2) (shown in the purple graph) is affected by the bleed over current. Because the voltage reference signal at load 2 includes the frequency value f1 only, any value of I_load_2 at frequency f2 is due to the mutual capacitance between the electrodes.

Figure 16D:
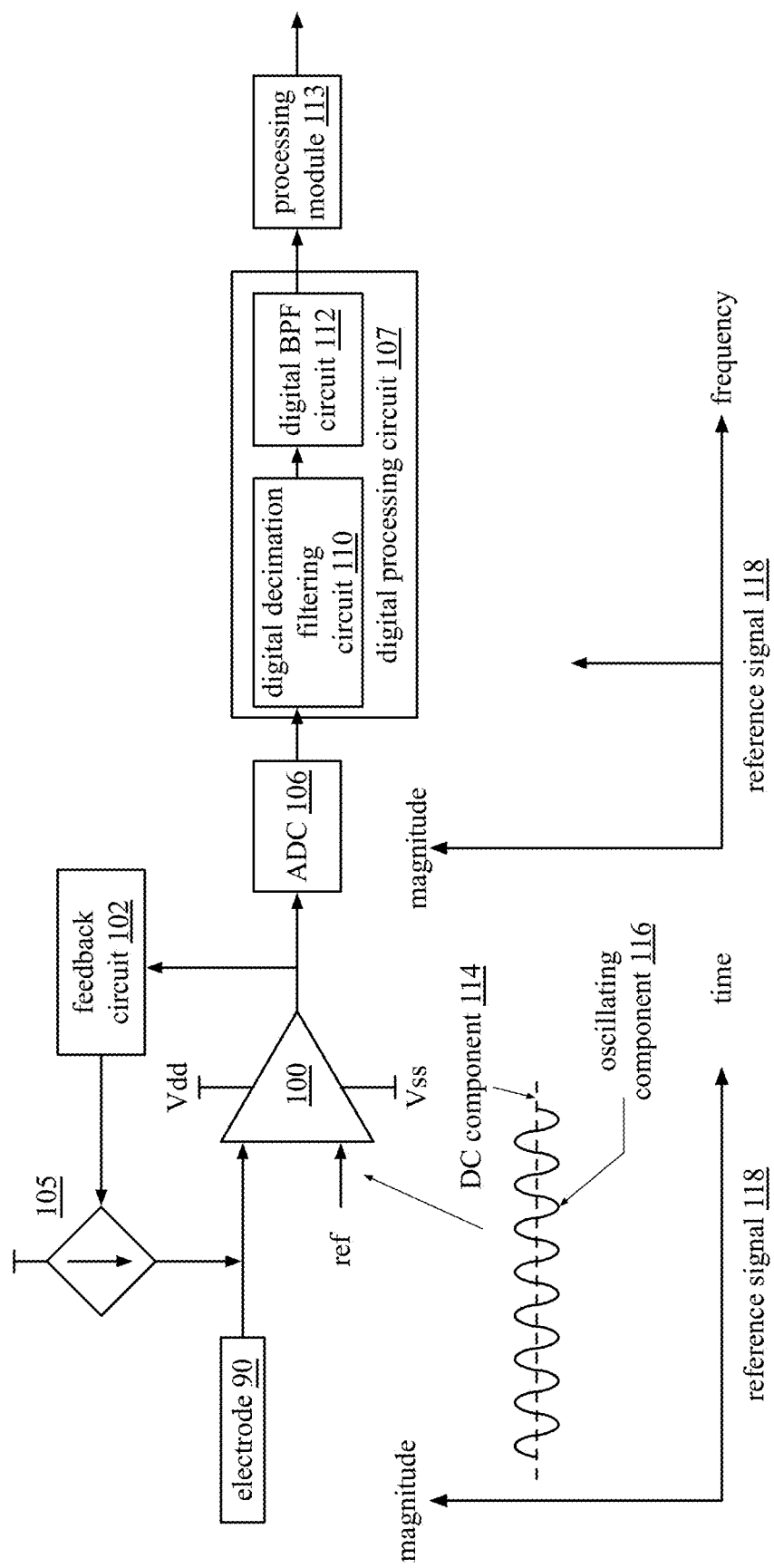
FIG. 16D is a schematic block diagram of another example of operation of a drive-sense circuit (DSC)

FIG. 16D is a schematic block diagram of another example of operation of a drive-sense circuit (DSC) that includes operational amplifier (op-amp) 100, an analog to digital converter (ADC) 106, a feedback circuit 102, a power source circuit 105, and a digital processing circuit 107, and a processing module 113. The processing module 113 may be a part of the digital processing circuit 107. The drive-sense circuit of FIG. 16C operates similarly to the drive-sense circuit of FIG. 16 except that the digital processing circuit 107 and a reference signal 118 are shown in more detail.

As shown, the reference signal 118 includes a DC component 114 and/or an oscillating component 116. The oscillating component 116 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). In the frequency domain, the sinusoidal reference signal 118 is a pure tone at the frequency of the oscillating component 116 with a magnitude corresponding to the DC component 114.

The digital processing circuit 107 includes a digital decimation filtering circuit 110, a digital bandpass filter (BPF) circuit 112. The ADC 106 may be implemented in a variety of ways. For example, the ADC 106 is implemented as a flash ADC, a successive approximation ADC, a ramp-compare ADC, a Wilkinson ADC, an integrating ADC, and/or a delta encoded ADC. As yet another example, the ADC 106 is implemented as a sigma-delta ADC.

The digital decimation filtering circuit 110 includes one or more finite impulse response (FIR) filters, one or more cascaded integrated comb (CIC) filters, one or more infinite impulse response (FIR) filters, one or more decimation stages, one or more fast Fourier transform (FFT) filters, and/or one or more discrete Fourier transform (DFT) filters, one or more polyphase filters, and one or more decimation stages.

The digital bandpass filter (BPF) circuit 112 includes one or more finite impulse response (FIR) filters, one or more cascaded integrated comb (CIC) filters, one or more infinite impulse response (FIR) filters, one or more decimation stages, one or more fast Fourier transform (FFT) filters, and/or one or more discrete Fourier transform (DFT) filters, and one or more polyphase filters. A BPF includes a plurality of taps having coefficients set to produce a bandpass region approximately centered at the oscillation frequency of the reference signal and having a bandwidth tuned for filtering a pure tone.

Sampling frequencies of the stages of ADC 106 are set as multiples of the data output rate. For example, the data output rate is 300 Hz thus sampling frequencies are multiples of 300 Hz. For example, the ADC 106 oversamples an analog comparison signal at a sampling frequency (fs) of $2^{17}*300$ Hz (approximately 39.32 MHz). The analog comparison signal is said to be oversampled when the sampling frequency is more than the Nyquist sampling frequency (e.g., 40 KHz-400 KHz when the oscillating frequency is 20 KHz-200 KHz). Setting the sampling frequency at a frequency much higher than the Nyquist sampling frequency results in a significantly oversampled analog signal. Oversampling of the analog signal allows for narrower bandpass filtering and improves signal to noise ratio (SNR).

In an example of operation, the ADC 106 converts an analog signal that includes a set of pure tone components (e.g., one or more pure tone components, each having an oscillation frequency) into a digital signal of the one or more pure tone components. For example, an input analog signal has a pure tone (e.g., a sinusoidal signal, a DC signal, a repetitive signal, and/or a combination thereof) having a DC component and/or an oscillation frequency at f1 (e.g., a frequency in the audio range, in the range 20 KHz-200 KHz, or more). As a specific example, the ADC is a sigma-delta ADC that oversamples the analog input signal at clock rate of approximately 39.32 MHz (e.g., $300*2^{17}$) and, as such, pushes low frequency noise up to higher frequencies outside the band of interest.

Continuing with the specific example, the ADC 106 produces a 1-bit digital output at approximately 39.32 MHz representative of the analog signal. In an embodiment, the analog signal includes an error correction signal s1 at frequency f1, which represents the frequency domain data embedded in the analog comparison signal and is substantially preserved in the digital domain.

The digital decimation filtering circuit 110 takes the output from ADC circuit 106 (e.g., 1-bit digital output at approximately 39.32 MHz) and converts it to another digital signal having another data rate frequency that is a multiple of the data output rate (e.g., 300 Hz). In a specific example, the digital decimation filtering circuit 110 has an output rate of $2^{12}*300$ HZ (approximately 1.23 MHz).

As a more specific example, the digital decimation filtering circuit 110 converts the 1-bit digital output at approximately 39.32 MHz into an 18-bit output at $2^{12}*300$ HZ (approximately 1.23 MHz) representing the comparison signal at frequency f1. The ratio between the sampling rate (fs) and the digital decimation filtering circuit 110's output rate is equal to the number of ADC 106 samples per output of digital decimation filtering circuit 110. For example, 39.32 MHz/1.23 MHz=32. Therefore, digital decimation filtering circuit 110 has a decimation rate of 32. In the time is takes ADC 106 to output 32 1-bit samples, 1 18-bit output is produced by digital decimation filtering circuit 110.

The digital BPF circuit 112 takes the output of the digital decimation filtering circuit 112 (e.g., the 18-bit output at approximately 1.23 MHz) and bandpass filters it. The digital BPF circuit 112 applies a narrow bandpass filter, centered at the oscillating component frequency, and outputs a value having real and imaginary components. Because the data is embedded in a sinusoid (e.g., a pure tone) the desired information is at the oscillating component frequency and is based on magnitude and/or phase. Therefore, the bandpass filter can be very narrow (e.g., 1% to 20% of channel spacing and, as a specific example about 5% the channel spacing (e.g., for a channel spacing of 300 Hz, a 10 Hz bandpass filter may be used)) to capture the desired signal. In an embodiment, the digital BPF circuit 112 has a tap-length of 4096 (e.g., in the time it takes digital decimation filtering circuit 248 to output 4096 18-bit outputs at approximately 1.23 MHz, digital BPF circuit outputs 1 48-bit affect value at the output rate of 300 Hz).

The processing module 113 interprets the imaginary and real components of the value to produce a digital data output. The value is a vector (i.e., a phasor complex number) having a real component and an imaginary component representing a sinusoidal function that has a peak magnitude (i.e., amplitude) and direction (i.e., phase). For example, the value is a one 48-bit value having a 24-bit real component and a 24-bit imaginary component. In the complex domain, voltages and currents are phasors and resistances, capacitances, and inductances are replaced with complex impedances (e.g., ZR=R, ZL=jfL, and ZC=1/(jfC)=−j/(fC)). Since voltage (V)=current (I)*impedance (Z), the processing module 113 determines a capacitance or other impedance value from voltage and current vectors of the value (e.g., a decrease in impedance increases the voltage for a constant current, increases the current for a constant voltage, or increases both voltage and current of the signal component). The increasing and decreasing of impedance at a particular rate is representative of the input data. The impedance value or change in impedance value determined is output as digital sensed data (e.g., at an output rate of 300 Hz).

FIG. 17 is a schematic block diagram of an example of a pen 35 with a variable capacitor 120 under no compression.

The pen 35 further includes a conductive tip 122, a pen housing 124, a conductive section 126, a $1^{st}$ (moveable) z-direction mounting structure 128, and a $2^{nd}$ (fixed) z-direction mounting structure 130. The conductive tip 122, conductive section 126, $1^{st}$ z-direction mounting structure 128, and $2^{nd}$ z-direction mounting structure 130 are constructed of a conductive material such as carbon, other conductive metals, and/or materials containing conductive materials (e.g., a conductive rubber). The pen housing 124 may or may not be a conductive material. For example, the pen housing 124 consists of a conductive material and the conductive section 126 is fixed to and a part of the pen housing 124. In another example, the pen housing 124 consists of a non-conductive material and the conductive section 126 is fixed to an exterior part of the pen housing 124 for contact with a user.

The variable capacitor 120 may be a "Z" elastomeric connector (ZEC). An elastomeric connector consists of alternating conductive and insulating regions in a rubber or elastomer matrix to produce overall anisotropic conductive properties. When rotated 90° to its standard use configuration, a multi-stacked series capacitance device is created. When used in its standard configuration, the isolated conductive layers would conduct signals through the cross sections of the ZEC material. By conductively connecting to lateral ends of the ZEC material, a compressible stack with varying capacitance will be formed. Alternatively, the variable capacitor may be any capacitor having a compressive property in one or more of its conductive layers and/or insulating regions such that application of pressure changes its capacitive properties.

The $2^{nd}$ z-direction mounting structure 130 is fixed to the conductive section 126. The $1^{st}$ z-direction mounting structure 128 is connected to the conductive tip 122 and the variable capacitor 120 and is not fixed to the pen housing 124 such that when pressure is applied to the conductive tip 122, the $1^{st}$ z-direction mounting structure 128 compresses the variable capacitor 120. In this example, the conductive tip 122 of the pen 35 is not in contact with the touch screen 25 and thus, the variable capacitor 120 is not compressed.

The variable capacitor 120 is attached at one end conductively to the conductive tip 122 and the other end of the variable capacitor 120 is connected to the conductive section 126 (e.g., here, directly via the $2^{nd}$ z-direction mounting structure but in other embodiments, through a wired conductor up the barrel of the pen to a conductive section). When a user of the pen makes contact with the conductive section 126, a direct capacitive connection from earth ground of the user to the variable capacitor 120 to the conductive tip 122 is created.

The conductive tip 122 and/or variable capacitor 120 are replaceable. Different size conductive tips could be used for various applications (e.g., a finer tip for regular use and a broader tip for a drawing application). Variable capacitors of different sizes, durometer values, properties, etc., could be used for different applications (e.g., a greater capacitance change with compression for greater sensitivity).

FIG. 18 is a schematic block diagram of an example of a pen 35 with a variable capacitor 120 under compression. The pen 35 of FIG. 18 operates similarly to the pen 35 of FIG. 17 except that it is shown with the conductive tip 122 in contact with the touch screen 25 such that the conductive tip 122 compresses the $1^{st}$ z-direction mounting structure 128 which compresses the variable capacitor 120 in the z-direction.

Typically, with passive pens that detect pressure, an XY location is determined but the localized Z-direction pressure applied on the pen tip will make an enlarged contact spot due to the deflection of the tip. The deflection of the tip will be interpreted as relative pressure and not as an absolute measurement. Here, however, the variable capacitor 120 is directly affected by pressure on the conductive pen tip and this pressure is present at the point of contact.

As pressure is applied to the conductive tip 122, the variable capacitor 120 compresses (e.g., the ZEC material compresses), decreasing the distance between the conductive layers, resulting in the capacitance at the conductive tip 122 relative to earth ground supplied by the user holding the pen touching the conductive section 126 increasing.

Figure 19:
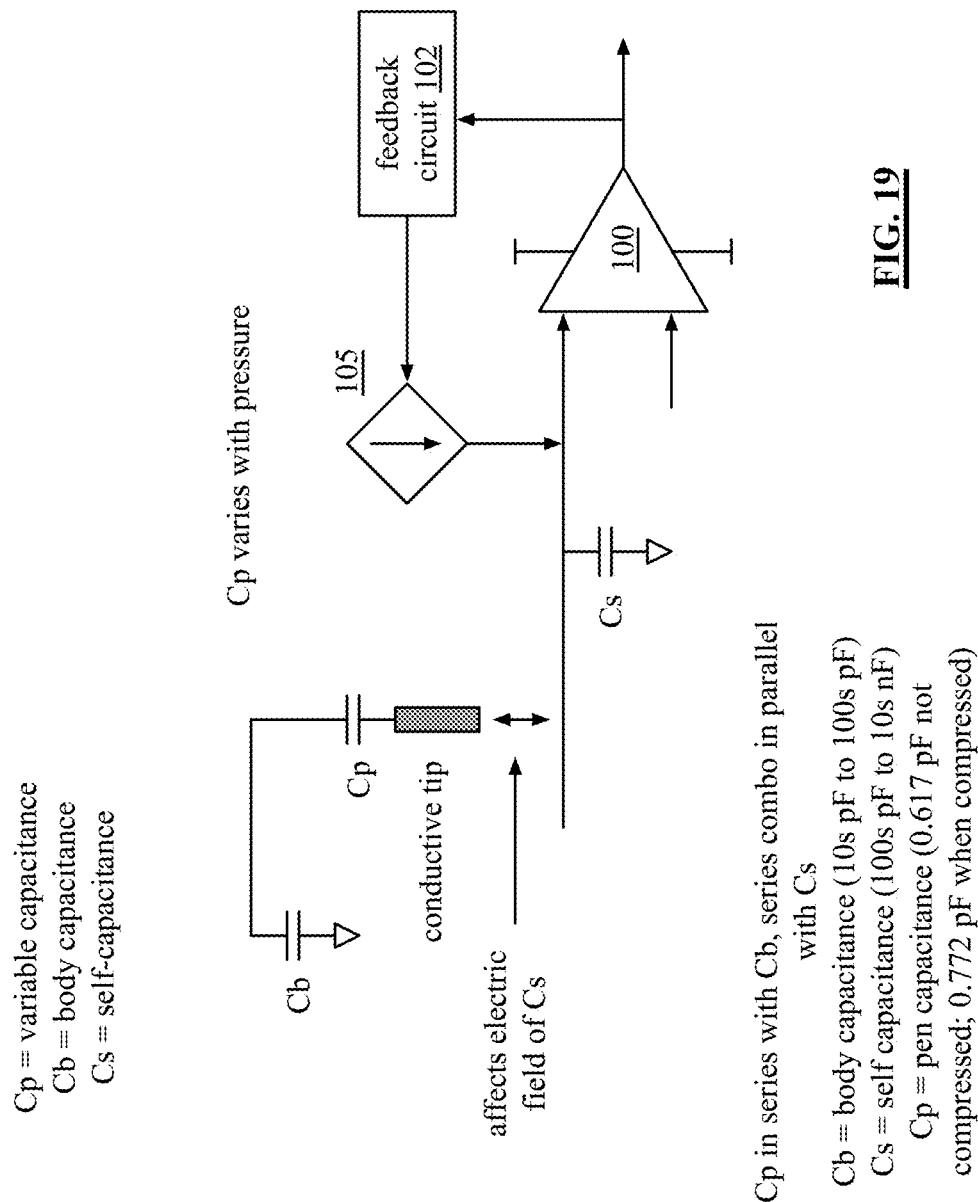
FIG. 19 is a schematic block diagram of an example of a pen with a variable capacitor affecting self capacitance of an electrode coupled to a drive-sense circuit.

FIG. 19 is a schematic block diagram of an example of a pen with a variable capacitor affecting self-capacitance of an electrode coupled to a drive-sense circuit. The drive-sense circuit includes a power source circuit 105, an operational amplifier (op-amp) 100, and a feedback circuit 102. The drive-sense circuit operates similarly to drive-sense circuits of previous Figures. The pen operates similarly to the pen of FIGS. 17 and 18. The electrode is shown here as a self capacitance (Cs) connected to the drive-sense circuit.

The capacitance of the pen is represented as a series combination of the body capacitance of a user touching a conductive section of the pen (Cb) and the pen capacitance (Cp) due to the variable capacitor. The body capacitance has a range of about 10s of pF to 100s of pF and the pen capacitance has a range of about 0.617 pF when not compressed to 0.772 pf when compressed. As the conductive tip of the pen comes into close proximity of the electrode, the electric field of the self capacitance of the electrode is affected.

An equivalent circuit of the pen and electrode is the capacitance of the pen (e.g., the series combination of Cb and Cp) in parallel with the self capacitance of the electrode. The self capacitance has a range of about 100s of pF to 10s of nF. As the pen capacitance comes in contact with the electrode, the self capacitance increases. As the pen capacitance changes due to pressure on the conductive pen tip, the self capacitance further increases. The drive-sense circuit is operable to determine the change in impedance of the electrode due to the self capacitance increase and attribute the change to a touch and/or a touch with a certain amount of pressure.

Figure 20:
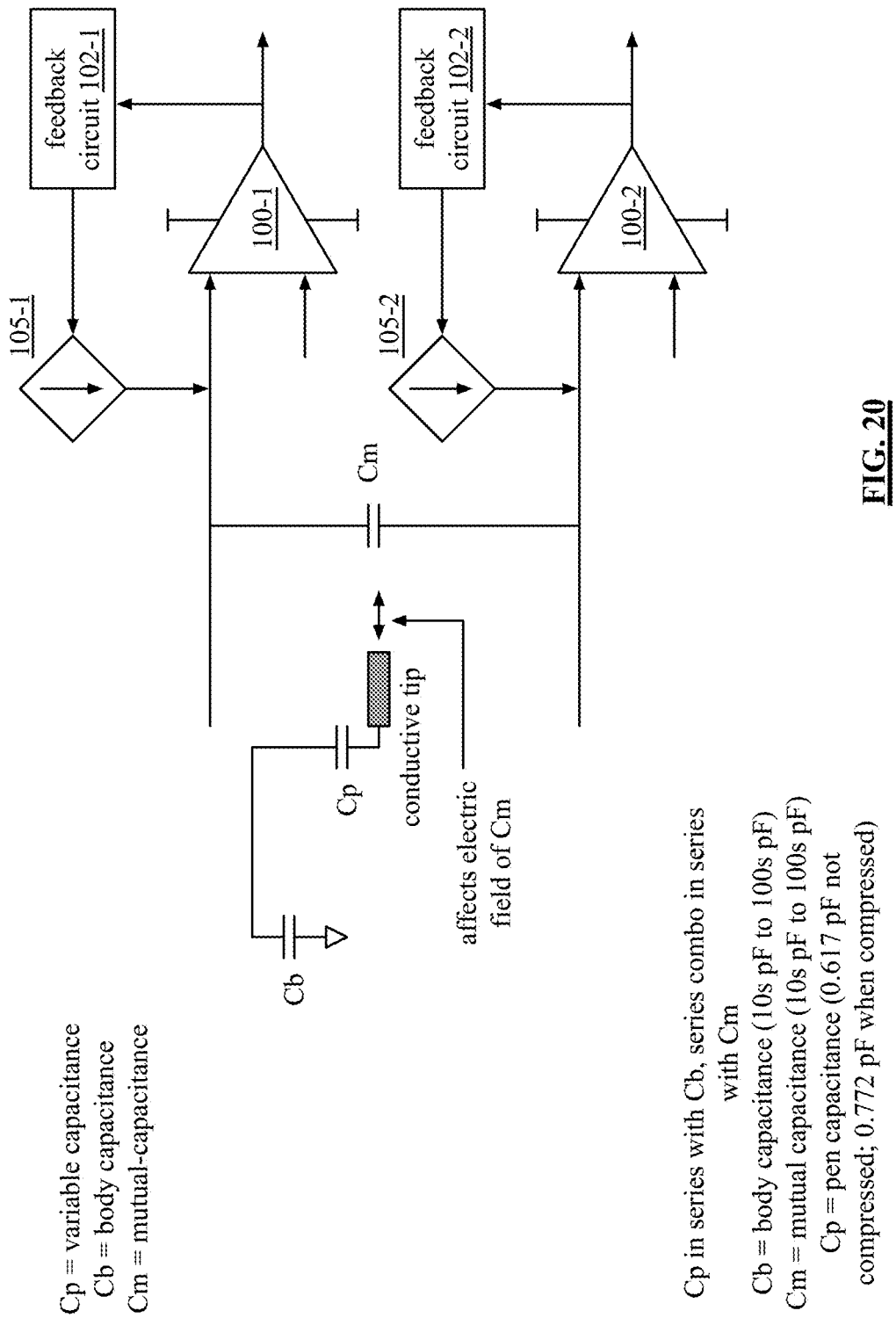
FIG. 20 is a schematic block diagram of an example of a pen with a variable capacitor affecting mutual capacitance of electrodes coupled to drive-sense circuits.

FIG. 20 is a schematic block diagram of an example of a pen with a variable capacitor affecting mutual capacitance of electrodes coupled to drive-sense circuits. The drive-sense circuits include power source circuits 105-1 and 105-2, operational amplifiers (op-amps) 100-1 and 100-2, and feedback circuits 102-1 and 102-2. The drive-sense circuits operate similarly to drive-sense circuits of previous Figures. The pen operates similarly to the pen of FIGS. 17 and 18. The electrodes are shown here as a mutual capacitance (Cm) between the electrodes (e.g., a column and a row electrode).

The capacitance of the pen is represented as a series combination of the body capacitance of a user touching a conductive section of the pen (Cb) and the pen capacitance (Cp) due to the variable capacitor. As the conductive tip of the pen comes into close proximity of the electrodes, the electric field of the mutual capacitance of the electrodes is affected.

An equivalent circuit of the pen and electrode is the capacitance of the pen (e.g., the series combination of Cb and Cp) in series with the mutual capacitance of the electrodes. The mutual capacitance has a range of about 10s of pF to 100s of pF. As the pen capacitance comes in contact with the electrode, the mutual capacitance decreases. As the pen capacitance increases due to pressure on the conductive pen tip, the mutual capacitance increases. The drive-sense circuit is operable to determine the change in impedance of the electrode due to the mutual capacitance change and attribute the change to a touch and/or a touch with a certain amount of pressure.

Figures 21, 22:
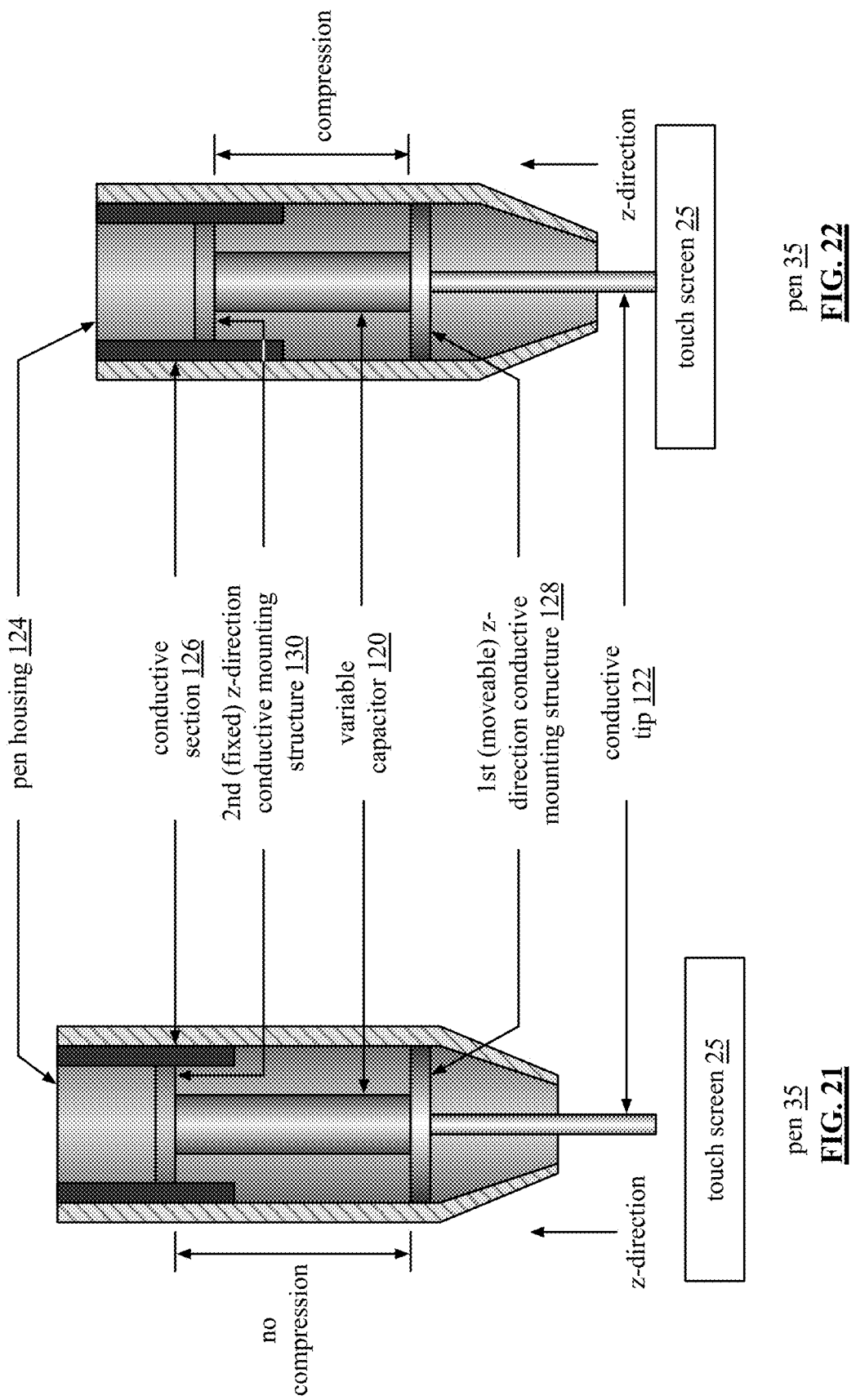
FIG. 21 is a schematic block diagram of another example of a pen with a variable capacitor under no compression.
FIG. 22 is a schematic block diagram of another example of a pen with a variable capacitor under compression.

FIG. 21 is a schematic block diagram of an example of a pen 35 with a variable capacitor 120 under no compression. The pen 35 further includes a conductive tip 122, a pen housing 124, a conductive section 126, a $1^{st}$ z-direction mounting structure 128, and a $2^{nd}$ z-direction mounting structure 130. The pen 35 of FIG. 21 operates similarly to the pen 35 of FIG. 17 except that the pen housing 124 is non-conductive and the conductive section 126 is coupled to the interior of the pen housing 124 in an area where human touch is anticipated (e.g., where a person would likely hold the pen 35) or along the length of the pen.

The $2^{nd}$ z-direction mounting structure 130 is fixed to the conductive section 126. The $1^{st}$ z-direction mounting structure 128 is connected to the conductive tip 122 and the variable capacitor 120 and is not fixed to the pen housing 124 such that when pressure is applied to the conductive tip 122, the $1^{st}$ z-direction mounting structure 128 compresses the variable capacitor 120. In this example, the conductive tip 122 of the pen 35 is not in contact with the touch screen 25 and thus, the variable capacitor 120 is not compressed.

The variable capacitor 120 is attached at one end conductively to the conductive tip 122 and the other end of the variable capacitor 120 is connected to the conductive section 126 (e.g., here, directly via the $2^{nd}$ z-direction mounting structure but in other embodiments, through a wired conductor up the barrel of the pen to a conductive section). When a user of the pen makes contact with the pen housing 124 near the conductive section 126, capacitive coupling occurs between the user and the pen 35 (e.g., from earth ground of the user to the variable capacitor 120 to the conductive tip 122).

FIG. 22 is a schematic block diagram of an example of a pen 35 with a variable capacitor 120 under compression. The pen 35 of FIG. 22 operates similarly to the pen 35 of FIG. 21 except that it is shown with the conductive tip 122 in contact with the touch screen 25 such that the conductive tip 122 compresses the $1^{st}$ z-direction mounting structure 128 which compresses the variable capacitor 120 in the z-direction.

As pressure is applied to the conductive tip 122, the variable capacitor 120 compresses (e.g., the ZEC material compresses), decreasing the distance between the conductive layers, resulting in the capacitance at the conductive tip 122 relative to earth ground supplied by the user holding the pen capacitively coupled to the conductive section 126 increasing.

Figure 23:
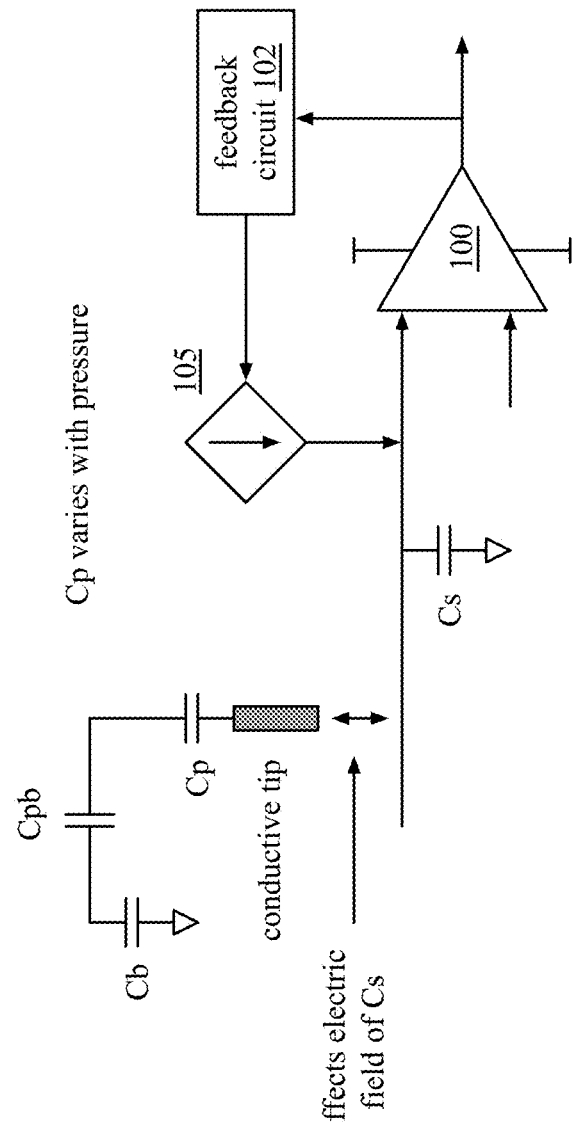
FIG. 23 is a schematic block diagram of another example of a pen with a variable capacitor effecting self-capacitance of an electrode coupled to a drive sense circuit.

FIG. 23 is a schematic block diagram of an example of a pen with a variable capacitor affecting self-capacitance of an electrode coupled to a drive-sense circuit. The drive-sense circuit includes a power source circuit 105, an operational amplifier (op-amp) 100, and a feedback circuit 102. The drive-sense circuit operates similarly to drive-sense circuits of previous Figures. The pen operates similarly to the pen of FIGS. 21 and 22. The electrode is shown here as a self capacitance (Cs) connected to the drive-sense circuit.

The capacitance of the pen is represented as a series combination of the body capacitance of a user capacitively coupling to the conductive section of the pen (Cb), the capacitance of the pen case (pen housing) to the body capacitance (Cpb), and the pen capacitance (Cp) due to the variable capacitor. The body capacitance has a range of about 10s of pF to 100s of pF and the pen capacitance has a range of about 0.617 pF when not compressed and 0.772 pf when compressed. As the conductive tip of the pen comes into close proximity of the electrode, the electric field of the self capacitance of the electrode is affected.

An equivalent circuit of the pen and electrode is the capacitance of the pen (e.g., the series combination of Cb, Cpb, and Cp) in parallel with the self capacitance of the electrode. The self capacitance has a range of about 100s of pF to 10s of nF. As the pen capacitance comes in contact with the electrode, the self capacitance increases. As the pen capacitance changes due to pressure on the conductive pen tip, the self capacitance further increases. The drive-sense circuit is operable to determine the change in impedance of the electrode due to the self capacitance increase and attribute the change to a touch and/or a touch with a certain amount of pressure.

In comparison to the example of FIG. 19 where there is a direct capacitive connection between the user and the pen, in this example, the pen case (e.g., pen housing) to body capacitance (Cpb) due to the non-conductive pen case results in a decrease of overall pen capacitance. Therefore, the self capacitance measurements will be lower in this example than the example of FIG. 19.

Figure 24:
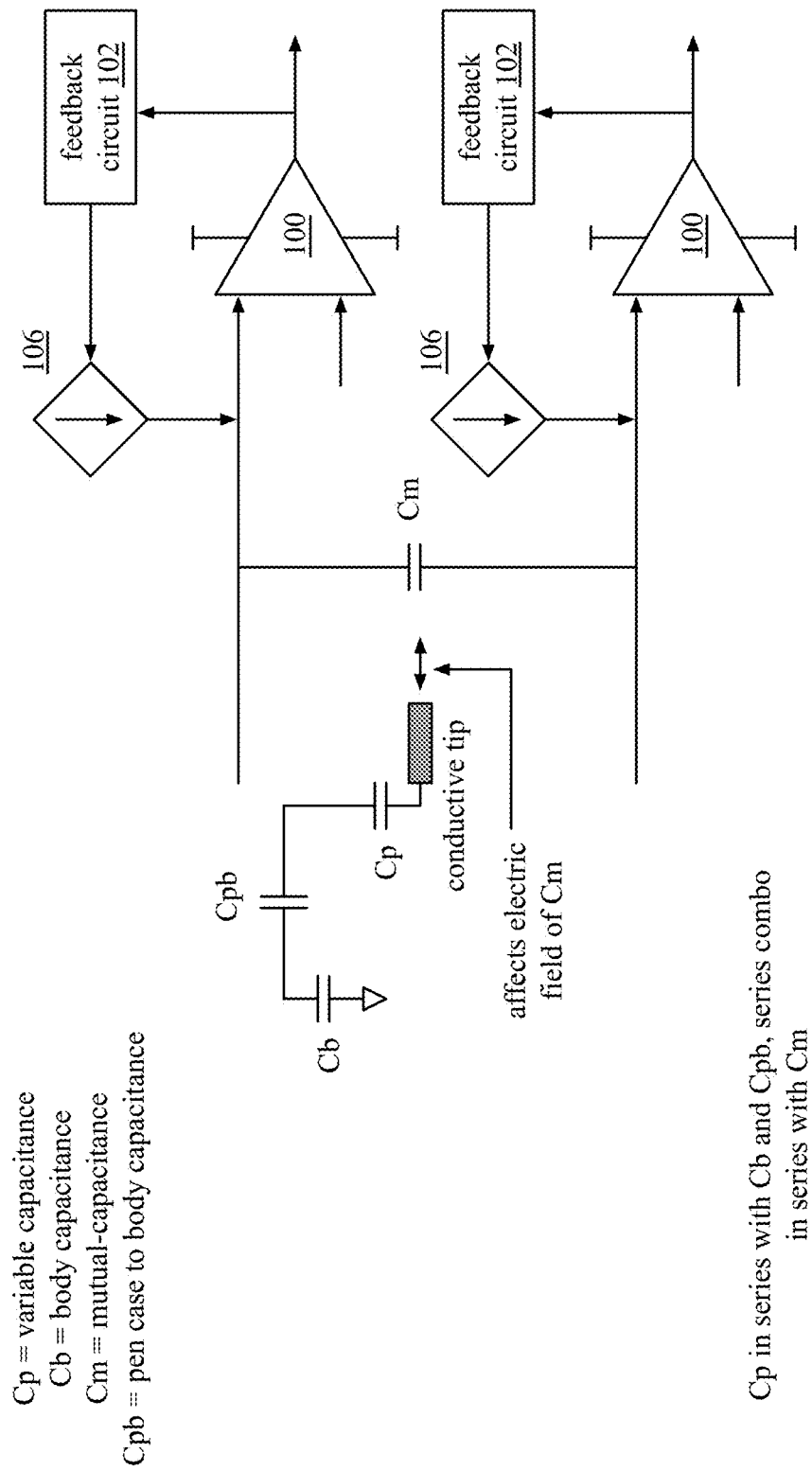
FIG. 24 is a schematic block diagram of another example of a pen with a variable capacitor effecting mutual capacitance of electrodes coupled to drive sense circuits.

FIG. 24 is a schematic block diagram of an example of a pen with a variable capacitor effecting mutual capacitance of electrodes coupled to drive-sense circuits. The drive-sense circuits include power source circuits 105-1 and 105-2, operational amplifiers (op-amps) 100-1 and 100-2, and feedback circuits 102-1 and 102-2. The drive-sense circuits operate similarly to drive-sense circuits of previous Figures. The pen operates similarly to the pen of FIGS. 21 and 22. The electrodes are shown here as a mutual capacitance (Cm) between the electrodes (e.g., a column and a row electrode).

The capacitance of the pen is represented as a series combination of the body capacitance of a user capacitively coupling to the conductive section of the pen (Cb), the capacitance of the pen case (pen housing) to the body capacitance (Cpb), and the pen capacitance (Cp) due to the variable capacitor. As the conductive tip of the pen comes into close proximity of the electrode, the electric field of the mutual capacitance of the electrodes is affected.

An equivalent circuit of the pen and electrode is the capacitance of the pen (e.g., the series combination of Cb, Cpb, and Cp) in series with the mutual capacitance of the electrodes. The mutual capacitance has a range of about 10s of pF to 100s of pF. As the pen capacitance comes in contact with the electrodes, the mutual capacitance decreases. As the pen capacitance increases due to pressure on the conductive pen tip, the mutual capacitance increases. The drive-sense circuit is operable to determine the change in impedance of the electrode due to the mutual capacitance change and attribute the change to a touch and/or a touch with a certain amount of pressure.

In comparison to the example of FIG. 20 where there is a direct capacitive connection between the user and the pen, in this example, the pen case (e.g., pen housing) to body capacitance (Cpb) due to the non-conductive pen case results in a decrease of overall pen capacitance. Therefore, the mutual capacitance measurements will be lower in this example than the example of FIG. 20.

Figure 25:
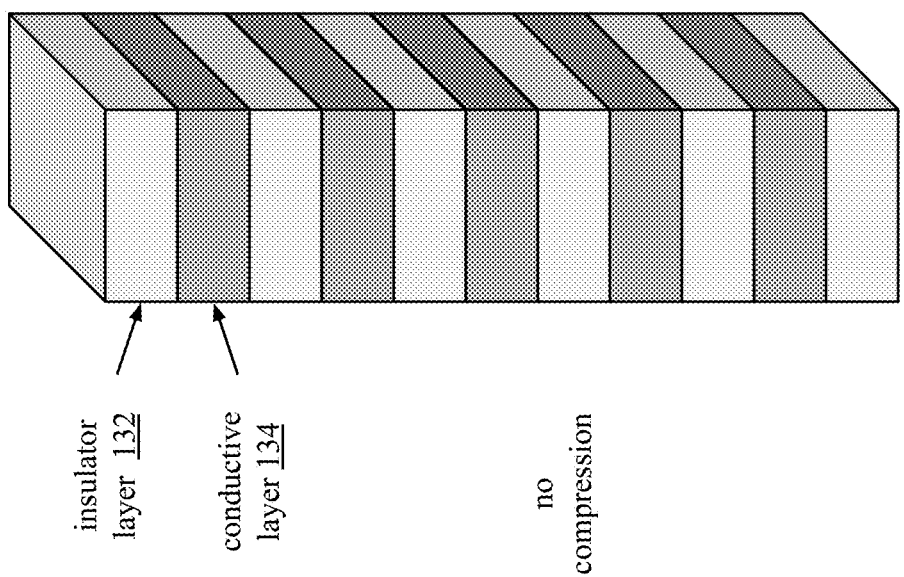
FIG. 25 is a schematic block diagram of an example of a variable capacitor under no compression.

FIG. 25 is a schematic block diagram of an example of a variable capacitor under no compression. In this example, the variable capacitor 120 is a "Z" elastomeric connector (ZEC or ZEC material) consisting of alternating insulator layers 132 and conductive layers 134. The insulator layers 132 consist of a rubber, elastomer matrix, or similar material to produce overall anisotropic conductive properties. The conductive layers may be constructed of carbon or similar conductive material. When rotated 90° to its standard use configuration, a multi-stacked series capacitance device is created. When used in its standard configuration, the isolated conductive layers 134 would conduct signals through the cross sections of the ZEC material. By conductively connecting to lateral ends of the ZEC material, a compressible stack with varying capacitance will be formed. In this example, the variable capacitor 120 is not under compression.

A standard ZEC material consists of 100 to 250 conductive layers per inch at 0.064 mm thickness, with a dielectric constant of 2.8 and a layer durometer value of 50-60 Shore A. Alternatively, the variable capacitor may be any capacitor having a compressive property in one or more of its conductive layers and/or insulator layers such that application of pressure changes its capacitive properties.

Figure 26:
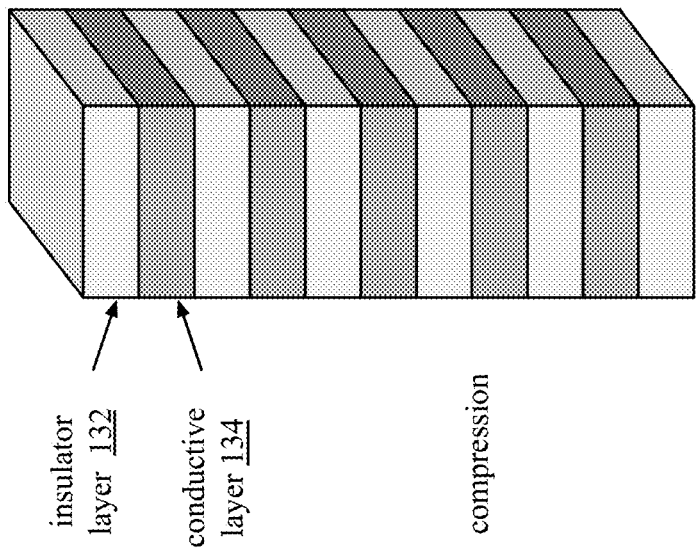
FIG. 26 is a schematic block diagram of an example of a variable capacitor under compression.

FIG. 26 is a schematic block diagram of an example of a variable capacitor under compression. The variable capacitor 120 of FIG. 26 is similar to the variable capacitor 120 of FIG. 25 except that, in this example, the variable capacitor 120 is under compression. Due to the nature of the ZEC material, equal compression occurs throughout the length of the stack.

In an example where the insulator and conductive layers 134 have a thickness of 0.127 mm, the conductive plate surface area is 10.16^2 mm, and the dielectric constant is 2.8, the capacitance of a ZEC material variable capacitor 120 is around 1.98 pf per layer (using the parallel plate capacitor equation of $C=K*E0*area/separation$). For 6 layers in series, the capacitance would be 0.617 pf. With a 65 Shore A insulator, the insulator layers are similar to a pencil eraser.

When the variable capacitor 120 is compressed by 20%, changing the insulator layer thickness from 0.127 mm to 0.1016 mm, the capacitance of the ZEC material variable capacitor 120 is 2.48 pf per layer. For 6 layers in series, the capacitance would be 0.772 pf. Therefore, under compression, the capacitance of the variable capacitor 120 increases.

Figure 27:
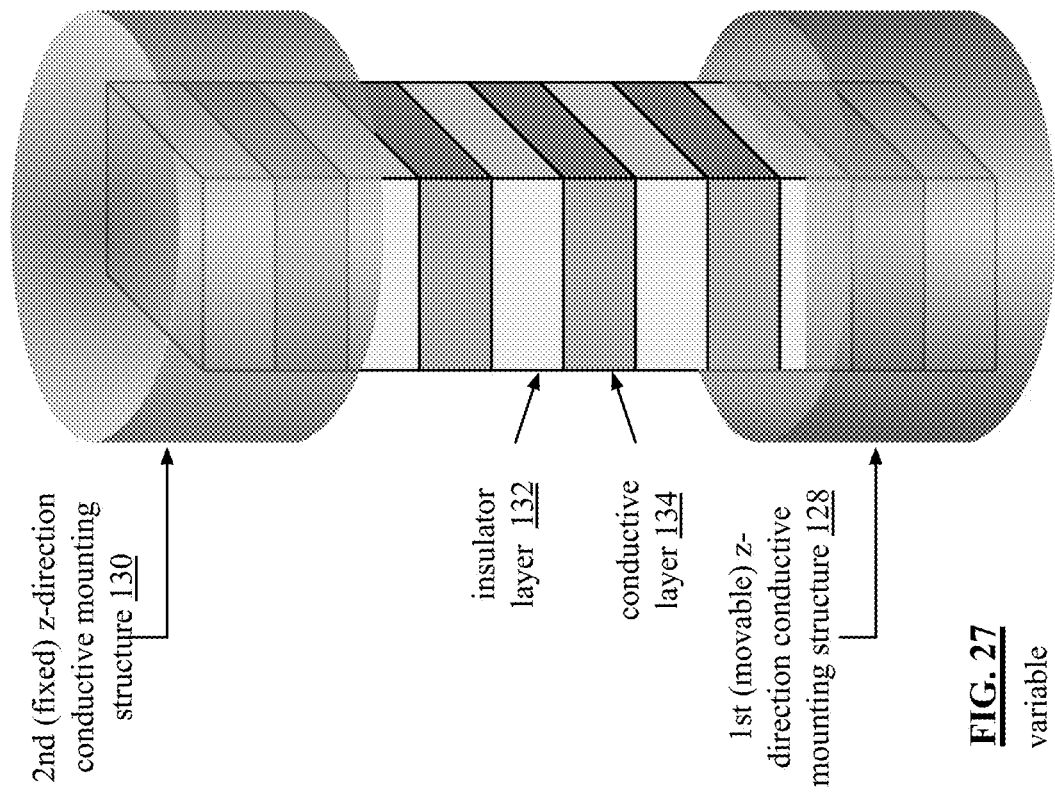
FIG. 27 is a schematic block diagram of an example of a variable capacitor with end caps for mounting structures.

FIG. 27 is a schematic block diagram of an example of a variable capacitor 120 with end caps for mounting structures. The variable capacitor 120 of FIG. 27 is similar to the variable capacitor 120 of FIG. 25 except that, in this example, the variable capacitor 120 includes a $1^{st}$ z-direction mounting structure 128 and a $2^{nd}$ z-direction mounting structure 130 at the ends of the variable capacitor. The $1^{st}$ and $2^{nd}$ z-direction mounting structures 128 and 130 are constructed of a conductive material.

The $2^{nd}$ z-direction mounting structure 130 is fixable to a portion of the pen (e.g., to the pen housing, to a conductive section coupled to the pen housing, etc.). The $1^{st}$ z-direction mounting structure 128 is fixable to the conductive tip 122 and the variable capacitor 120 and is not fixed to the pen housing 124 such that when pressure is applied to the conductive tip 122, the $1^{st}$ z-direction mounting structure 128 compresses the variable capacitor 120.

Figure 28:
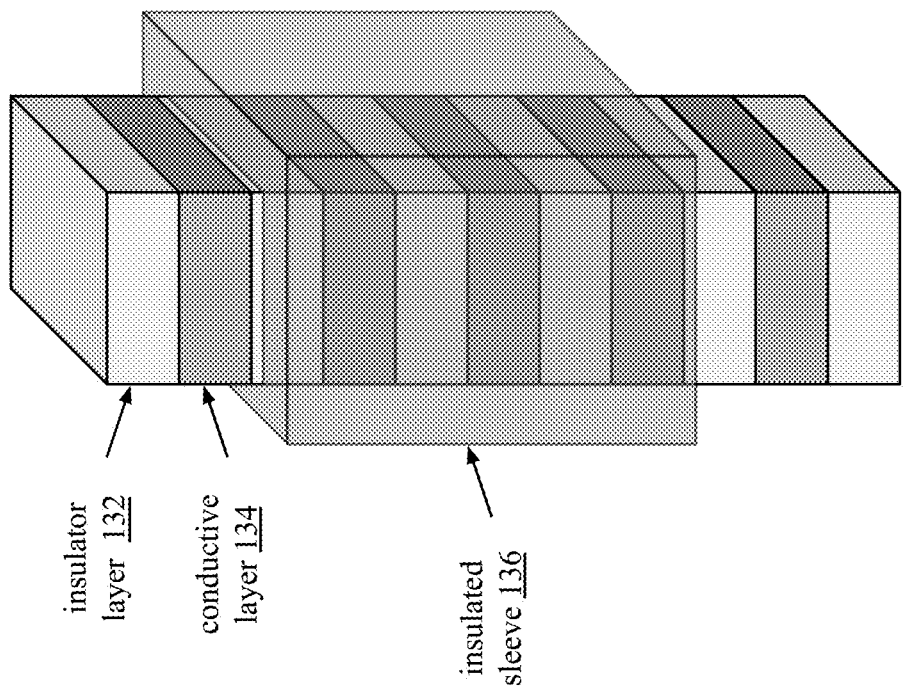
FIG. 28 is a schematic block diagram of an example of a variable capacitor with an insulated sleeve.

FIG. 28 is a schematic block diagram of an example of a variable capacitor 120 with an insulated sleeve 136. The variable capacitor 120 of FIG. 27 is similar to the variable capacitor 120 of FIG. 25 except that, in this example, the variable capacitor 120 includes an insulated sleeve 136 surrounding a middle portion of the variable capacitor 120. The insulated sleeve 136 forms a shape constraint around the variable capacitor 120 and blocks the effects of any external capacitances on the variable capacitor 120.

FIG. 28A is a schematic block diagram of an example of a variable capacitor 120 with end caps for mounting structures and an insulated sleeve 136. The variable capacitor 120 of FIG. 28A is similar to the variable capacitors 120 of FIGS. 27-28 except that both the insulated sleeve 136 (shown in grey) and the $1^{st}$ and $2^{nd}$ z-direction mounting structures 128 and 130 (shown in blue) are shown.

The $2^{nd}$ z-direction mounting structure 130 is fixable to a portion of the pen (e.g., to the pen housing, to a conductive section coupled to the pen housing, etc.). The $1^{st}$ z-direction mounting structure 128 is fixable to the conductive tip 122 and the variable capacitor 120 and is not fixed to the pen housing 124 such that when pressure is applied to the conductive tip 122, the $1^{st}$ z-direction mounting structure 128 compresses the variable capacitor 120.

The insulated sleeve 136 includes a cutout section 137 such that the $1^{st}$ z-direction mounting structure 128 is operable to move through the insulated sleeve 136 and compress the variable capacitor 120.

Figure 28B:
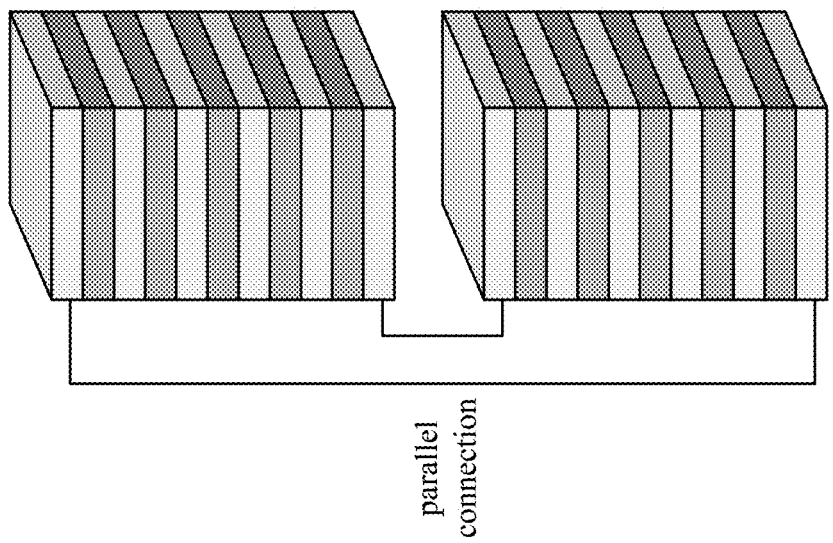
FIG. 28B is a schematic block diagram of an example of a variable capacitor having two variable capacitors connected in parallel.

FIG. 28B is a schematic block diagram of an example of a variable capacitor 120 having two variable capacitors connected in parallel. The variable capacitor 120 of FIG. 28A is similar to the variable capacitors 120 of FIGS. 25-28. As shown, two variable capacitors are connected in parallel to increase overall capacitance of the variable capacitor 120. More variable capacitors could be connected in parallel to further increase the capacitance of the variable capacitor 120.

Figure 29:
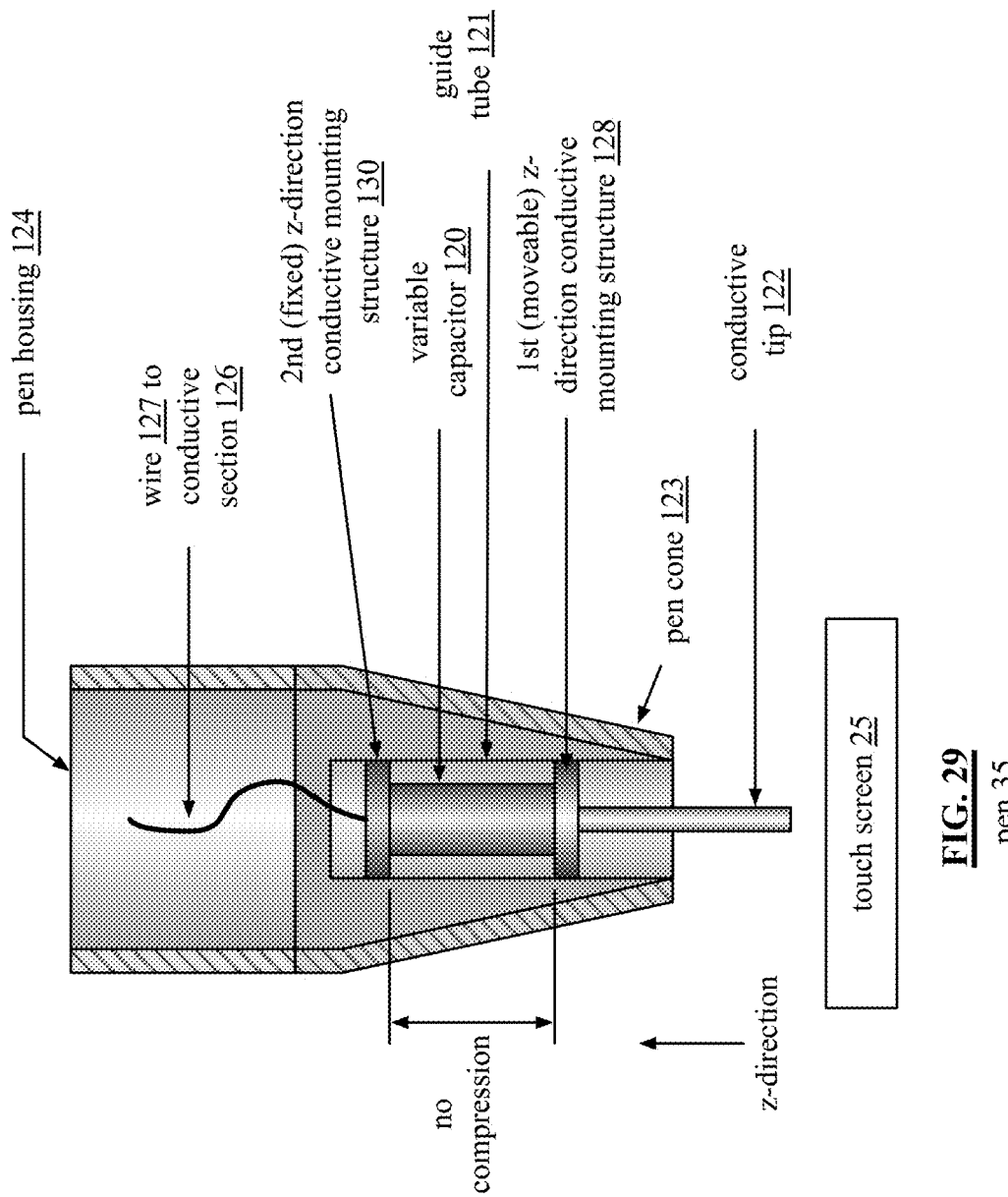
FIG. 29 is a schematic block diagram of an example of a pen with a variable capacitor within the cone of the pen.

FIG. 29 is a schematic block diagram of an example of a pen 35 with a variable capacitor 120 within a cone 123 of the pen 35. The pen 35 further includes a conductive tip 122, a pen housing 124, a conductive section 126, a $1^{st}$ z-direction mounting structure 128, and a $2^{nd}$ z-direction mounting structure 130. The pen 35 of FIG. 29 operates similarly to the pen of FIGS. 17 and 18 except that the variable capacitor 120 is located in the pen cone 123 and the $2^{nd}$ z-direction mounting structure is coupled to a conductive section 126 of the pen 35 via a wire 127. The pen housing 124 may or may not be a conductive material.

The pen cone 123 (shown in yellow) includes a guide tube 121 that houses the variable capacitor 120. The $2^{nd}$ z-direction mounting structure 130 is fixed to the guide tube 121 (e.g., a circular, square, rectangular, etc., shaped guide tube) and is connected to a wire 127. The $1^{st}$ z-direction mounting structure 128 is connected to the conductive tip 122 and the variable capacitor 120 and is not fixed to the pen housing 124 such that when pressure is applied to the conductive tip 122, the $1^{st}$ z-direction mounting structure 128 compresses the variable capacitor 120. In this example, the conductive tip 122 of the pen 35 is not in contact with the touch screen 25 and thus, the variable capacitor 120 is not compressed.

The variable capacitor 120 is attached at one end conductively to the conductive tip 122 and the other end of the variable capacitor 120 is connected to the conductive section 126 via the wire 127. When a user of the pen makes contact with the conductive section 126, a direct capacitive connection from earth ground of the user to the variable capacitor 120 to the conductive tip 122 is created.

FIG. 30 is a schematic block diagram of an example of a pen 35 with a variable capacitor 120 having a wired connection to a conductive section 126. The pen 35 further includes a conductive tip 122, a pen housing 124, a $1^{st}$ z-direction mounting structure 128, and a $2^{nd}$ z-direction mounting structure 130. The pen 35 of FIG. 30 operates similarly to the pen of FIGS. 17 and 18 except that the variable capacitor 120 the $2^{nd}$ z-direction mounting structure is coupled to a conductive section 126-1 of the pen 35 via a wire 127.

The $2^{nd}$ z-direction mounting structure 130 is fixed to the pen housing 124 and is connected to a wire 127. The $1^{st}$ z-direction mounting structure 128 is connected to the conductive tip 122 and the variable capacitor 120 and is not fixed to the pen housing 124 such that when pressure is applied to the conductive tip 122, the $1^{st}$ z-direction mounting structure 128 compresses the variable capacitor 120. In this example, the conductive tip 122 of the pen 35 is not in contact with the touch screen 25 and thus, the variable capacitor 120 is not compressed.

FIG. 31 is a schematic block diagram of another example of a variable capacitor 165 within a pen, where the variable capacitor 165 is under no compression. A portion of the pen is shown to include a fixed z-direction conductive mounting section 158, a moveable z-direction conductive mounting section 166, a conductive tip 168, and a pen cone (shown in yellow). The variable capacitor 165 includes an upper domed-shaped body 160 and a lower domed-shaped body 164 positioned between the fixed z-direction mounting section 158 and the moveable z-direction mounting section 166 (e.g., the upper domed-shaped body 160 is coupled to the fixed z-direction mounting section 158 and the lower domed-shaped body 164 is coupled to the moveable z-direction mounting section 166).

The upper domed-shaped body 160 and the lower domed-shaped body 164 are made of conductive materials embedded in a compressible carrier (i.e., a compressive material), such as silicone rubber. For example, the upper domed-shaped body 160 and the lower domed-shaped body 164 are made of a Standard Elastomeric Conductor Material (ECM). ECM is a form elastomer, often natural rubber, silicone or other flexible substitutes, with embedded conductive particles within, with a dielectric constant of 2.8, but the dielectric constant can increase up dependent on material composition. An ECM with a durometer of 20-90 Shore A and a 50-60 Shore A, similar to a pencil erasure, would be appropriate for this example.

The shape of the variable capacitor 165 at the contact area 162 of the compressible material of at least one of the contact areas is a domed structure. The domed structure can be a domed, spherical, half-sphere or any roundish feature that translates a 3D shape at the contact point, into a 2D shape, increasing contact area with displacement, with smooth, rounded edges.

In this example, the upper domed-shaped body 160 and the lower domed-shaped body 164 are shown as hollow but could be solid or partially filled in other embodiments. Hollow would increase low displacement sensitivity, whereas a solid feature would have a better high end displacement range. The upper domed-shaped body 160 includes a vented section 172 from the hollow center to the atmosphere. The lower domed-shaped body 164 includes a vented section 173 from the hollow center to the atmosphere. The domed-shaped bodies with interiors open to atmosphere has a calculated delta capacitance change of 26.75 pf The moveable z-direction conductive mounting section 158 is fixed to the conductive tip 168 such that when pressure is applied to the conductive tip 168, the moveable z-direction conductive mounting section 158 compresses the upper domed-shaped body 160 and the lower domed-shaped body 164 of the variable capacitor 165 together. In this example, the conductive tip 168 of the pen is not in contact with the touch screen 25 and thus, the variable capacitor 165 is not compressed.

The conductive tip 168 and/or variable capacitor 165 are replaceable. Different size conductive tips could be used for various applications (e.g., a finer tip for regular use and a broader tip for a drawing application). Variable capacitors of different sizes, durometer values, properties, etc., could be used for different applications (e.g., a greater capacitance change with compression for greater sensitivity).

FIG. 32 is a schematic block diagram of another example of a variable capacitor 165 within a pen. The variable capacitor 165 of FIG. 32 operates similarly to the variable capacitor 165 of FIG. 31 except that the conductive tip 168 is in contact with the touch screen 25 such that the conductive tip 168 compresses the moveable z-direction mounting structure 166 which compresses the variable capacitor 165 in the z-direction.

Typically, with passive pens that detect pressure, an XY location is determined but the localized Z-direction pressure applied on the pen tip will make an enlarged contact spot due to the deflection of the tip. The deflection of the tip will be interpreted as relative pressure and not as an absolute measurement. Here, however, the variable capacitor 165 is directly affected by pressure on the conductive pen tip and this pressure is present at the point of contact.

Applying pressure at the conductive tip 168 compresses the upper domed-shaped body 160 into the lower domed-shaped body 164, which compresses both domed-shaped bodies together, increasing the surface area between the two domed-shaped bodies and compressing the conductive materials within the conductive carrier, resulting in an increase in the capacitance at the conductive tip 168. At first contact of the domed-shaped bodies, a point is formed, which grows into a circle, ellipse with more displacement. Change in the contact area surface area of the domed-shaped bodies results in a near linear change in the capacitance from the user's hand to the spot of the tip on the touch screen in contact with the conductive tip 168.

To confine the alignment and structure of the upper domed-shaped body 160 into the lower domed-shaped body 164, a Mechanical Container Assembly (MCA), may be necessary. The MCA would determine the constraints of the upper domed-shaped body 160 into the lower domed-shaped body 164, by placing them within a cylinder, so the physical alignment of the upper domed-shaped body 160 into the lower domed-shaped body 164 would be confined, so the lateral compression between the upper domed-shaped body 160 into the lower domed-shaped body 164 would ensure contact compression, with increased surface area and not side-slippage, without compression.

With drive sense circuits and taking advantage of the 300 fps data capture, with high SNR and low drive signals to drive a touch sensor; a non-powered dynamically changing capacitance device that is directly affected by the pressure on the stylus tip, is interpreted as a direct measurement at the point of contact on the screen. Pressure on the tip of the device, increases the capacitance by compressing one or more dome shaped materials together and not by increasing the contact point size on the touch screen.

FIG. 33 is a schematic block diagram of another example of a variable capacitor 165 within a pen. The variable capacitor 165 of FIG. 33 operates similarly to the variable capacitor 165 of FIG. 32 and is repeated here for comparison with the variable capacitor of FIG. 34. As shown, applying pressure at the conductive tip 168 compresses the upper domed-shaped body 160 into the lower domed-shaped body 164, which compresses both domed-shaped bodies together, increasing the surface area between the two domed-shaped bodies and compressing the conductive materials within the conductive carrier, resulting in an increase in the capacitance at the conductive tip 168.

The upper domed-shaped body 160 includes a vented section 172 from the hollow center to the atmosphere. The lower domed-shaped body 164 includes a vented section 173 from the hollow center to the atmosphere. The domed-shaped bodies with interiors open to atmosphere has a calculated delta capacitance change of 26.75 pf.

FIG. 34 is a schematic block diagram of another example of a variable capacitor 165 within a pen. The variable capacitor 165 of FIG. 34 operates similarly to the variable capacitor 165 of FIGS. 32 and 33 except that the upper domed-shaped body 160 and the lower domed-shaped body 164 do not include vented sections to the atmosphere. In this example, the upper domed-shaped body 160 and the lower domed-shaped body 164 are sealed, fixed volume spheres.

Due to the fixed volumes of the spheres, the spheres flatten out more when compressed as compared to the vented domed-shaped bodies. The increased flattening (i.e., lateral expansion) creates approximately 3.77 mm² more surface area than the vented domed-shaped bodies the thus increasing capacitance. For the same displacement change as the vented domed-shaped bodies, the sealed volume spheres have a delta capacitance change of 34.11 pf (as compared to the delta capacitance change of 26.75 pf for the vented domed-shaped bodies). The sealed volume spheres also create a very linear ratio of displacement to capacitance.

FIG. 35 is a schematic block diagram of another example of a variable capacitor 167 within a pen under compression. A portion of the pen is shown to include a fixed z-direction conductive mounting section 158, a moveable z-direction conductive mounting section 166, a conductive tip 168, and a pen cone (shown in yellow). The variable capacitor 167 includes a single domed-shaped body 170 where one end of the single domed-shaped body 170 is coupled to the fixed z-direction mounting section 158 and the other end of the single domed-shaped body 170 is coupled to the moveable z-direction mounting section 166. The variable capacitor 167 of FIG. 35 operates similarly to the variable capacitor 165 of FIGS. 31-33 except that a single domed-shaped body 170 is compressed between the fixed z-direction mounting section 158 and the moveable z-direction mounting section 166 (as opposed to another domed-shaped body).

In this example, the single domed-shaped body 170 includes a vented section 172 from the hollow center to the atmosphere. The single domed-shaped body with its interior open to atmosphere, has a calculated delta capacitance change of 39.60 pf (as compared to the delta capacitance change of 26.75 pf for the double vented domed-shaped bodies) due to increased lateral expansion caused by compression against one or more flat surfaces. For example, with the double, vented domed-shaped bodies, the surface area of the contact area under compression is 13.71 mm² whereas the surface area of the contact area under compression for the single, vented domed shaped body is 20.29 mm². While the single domed-shaped body provides greater capacitance change and sensitivity with a near linear output, the double domed-shaped bodies provide a greater displacement range and capacitance averaging (output smoothing).

FIG. 36 is a schematic block diagram of another example of a variable capacitor 167 within a pen. The variable capacitor 167 of FIG. 36 operates similarly to the variable capacitor 167 of FIG. 35 except that the single domed-shaped body 170 is not vented (i.e., it is a sealed fixed volume sphere). As compared to the single domed-shaped body 170 of FIG. 35, the single domed-shaped body 170 of FIG. 36 has a greater surface area at the contact area 162 when compressed. The sealed, single domed-shaped body has a calculated delta capacitance change of 71.06 pf (as compared to the delta capacitance change of 39.60 pf for the vented single domed-shaped body) due to increased lateral expansion. For example, with the single, vented domed-shaped body, the surface area of the contact area under compression is 20.29 mm² whereas the surface area of the contact area under compression for the single, sealed domed shaped body is 36.40 mm².

FIG. 37 is a schematic block diagram of another example of a variable capacitor 167 within a pen. The variable capacitor 167 of FIG. 37 operates similarly to the variable capacitor 167 of FIG. 35 except that the domed-shaped body 170 is coupled to the moveable z-direction conductive mounting section 166 but not to the coupled z-direction mounting section 158. When only one side is fixed, the compression occurs on the non-fixed side (e.g., the fixed z-direction mounting section 158) resulting in a decreased capacitance as compared to when it is fixed on both sides (i.e., when the dome-shaped body is compressed by both mounting sections equally). The variable capacitor 167 in this example includes a vented section 172 open to the atmosphere. In another embodiment, the dome-shaped body is not fixed to either mounting section, and when compression is encountered, compresses in place.

FIG. 38 is a schematic block diagram of another example of a variable capacitor 167 within a pen. The variable capacitor 167 of FIG. 38 operates similarly to the variable capacitor 167 of FIG. 37 except that the domed-shaped body 170 is sealed and thus has greater lateral expansion and capacitance than the vented, domed-shaped body 170 of FIG. 37.

FIG. 39 is a schematic block diagram of another example of a variable capacitor within a pen. The variable capacitor 167 of FIG. 39 operates similarly to the variable capacitor 167 of FIG. 37 except that the domed-shaped body 170 is coupled to the fixed z-direction mounting section 158 and not to the moveable z-direction conductive mounting section 166. When only one side is fixed, the compression occurs on the non-fixed side (e.g., the moveable z-direction conductive mounting section 166) resulting in a decreased capacitance as compared to when it is fixed on both sides (i.e., when the dome-shaped body is compressed by both mounting sections). The variable capacitor 167 in this example includes a vented section 172 open to the atmosphere.

FIG. 40 is a schematic block diagram of another example of a variable capacitor within a pen. The variable capacitor 167 of FIG. 40 operates similarly to the variable capacitor 167 of FIG. 39 except that the domed-shaped body 170 is sealed and thus has greater lateral expansion and capacitance than the vented, domed-shaped body 170 of FIG. 39.

FIG. 41 is a schematic block diagram of an example of operation of a pen 180 with a variable capacitor 165. The pen 180 further includes a pen cone 182, a conductive tip 168, a non-conductive pen housing 178, a wire 176, and an internal conductive ground plane 184 (e.g., conductive section) isolated from user touch. The variable capacitor 165 includes an upper domed-shaped body 160 and a lower domed-shaped body 164 positioned between the fixed z-direction mounting section 158 and the moveable z-direction mounting section 166 (e.g., the upper domed-shaped body 160 is coupled to the fixed z-direction mounting section 158 and the lower domed-shaped body 164 is coupled to the moveable z-direction mounting section 166). The variable capacitor 165 further includes vented sections 172 and 173. While the variable capacitor 165 shown operates similarly to the variable capacitor 165 of FIG. 31, any of the previous variable capacitor examples may be used.

The fixed z-direction mounting section 158 is coupled to the internal conductive ground plane 184 via the wire 176 or directly coupled. When a user touches the non-conductive pen housing 178, capacitive coupling occurs between the user's body and the internal conductive ground plane 184 through to the conductive tip 168. The touch screen 25 is operable to detect changes in electrical characteristics of electrodes of the touch screen due to the presence of a capacitance such as the pen 180 capacitance. As pressure is applied to the conductive tip 168 (e.g., as a user is pressing the conductive tip 168 on the touch screen), the variable capacitor 165 compresses, which causes a change in capacitance of the pen 180 that is interpretable as a pressure measurement.

Figure 42:
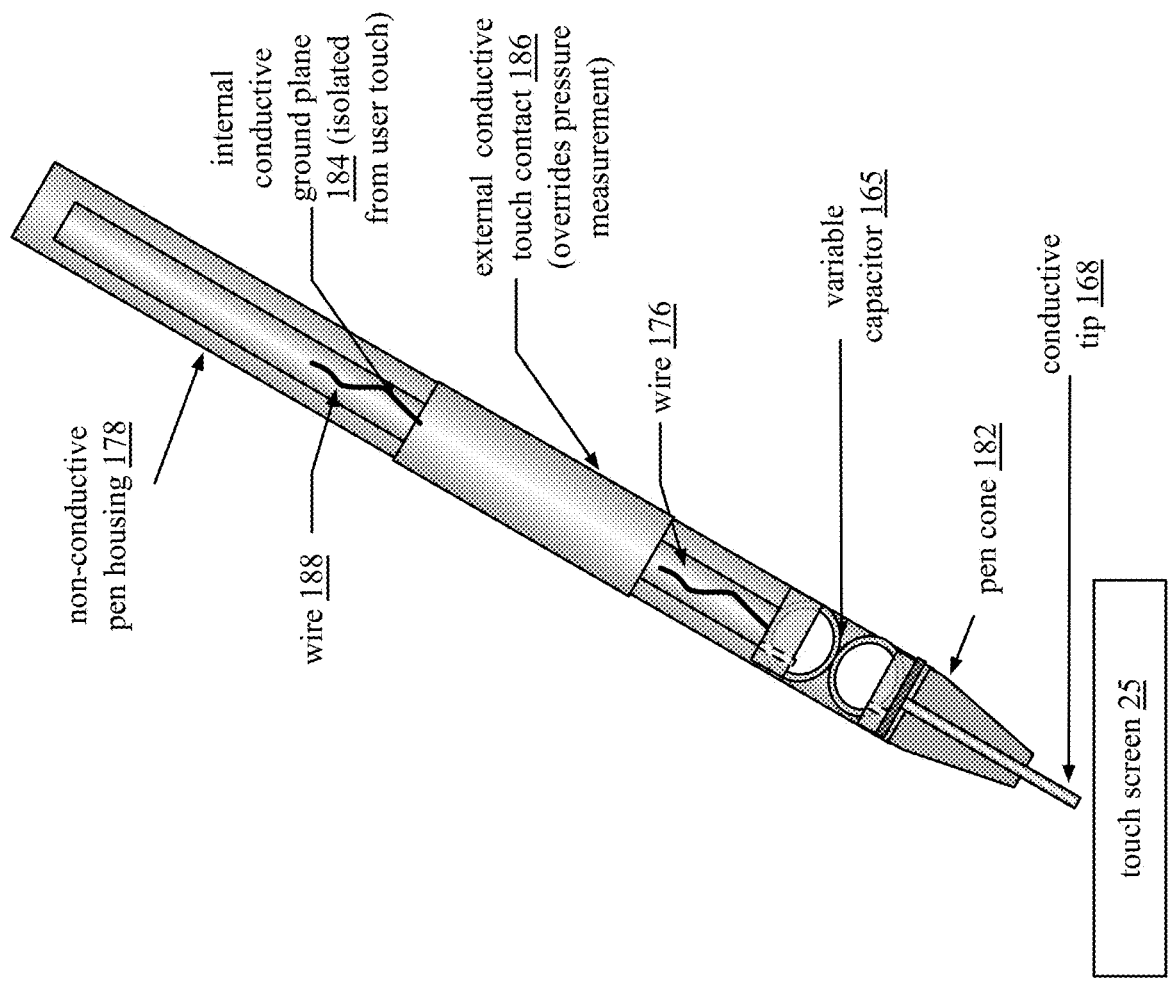
FIG. 42 is a schematic block diagram of another example of operation of a pen with a variable capacitor.

FIG. 42 is a schematic block diagram of another example of operation of a pen 180 with a variable capacitor 165. The pen 180 further includes a pen cone 182, a conductive tip 168, a non-conductive pen housing 178, a wire 176, a wire 188, an internal conductive ground plane 184 (e.g., conductive section) isolated from user touch, and an external conductive touch contact 186. While the variable capacitor 165 shown operates similarly to the variable capacitor 165 of FIG. 31, any of the previous variable capacitor examples may be used.

The pen 180 of FIG. 42 operates similarly to the pen 180 of FIG. 41 except that the pen 180 of FIG. 42 includes the external conductive touch contact 186 connected to the internal conductive ground plane 184 via a wire 188. When a user touches the external conductive touch contact 186, a direct capacitive connection is established from the user to the internal conductive ground plane 184 to the conductive tip 168 which overrides the pressure measurement function. Therefore, the user is able to switch the functionality of the pen 180 by touching the external conductive touch contact 186. For example, the user touches the external conductive touch contact 186 for traditional stylus pen operations (e.g., icon selection on a screen) and touches elsewhere on the pen 180 when a pressure measurement is desired (e.g., a drawing function where strokes are at different weights based on the pressure measurement).

FIG. 43 is a schematic block diagram of another example of operation of a pen 180 with a variable capacitor 165. The pen 180 further includes a pen cone 182, a conductive tip 168, a non-conductive pen housing 178, a wire 176, a wire 188, an internal conductive ground plane 184 (e.g., conductive section) isolated from user touch, an external conductive touch contact 186, and a switching device 192. While the variable capacitor 165 shown operates similarly to the variable capacitor 165 of FIG. 31, any of the previous variable capacitor examples may be used.

The pen 180 of FIG. 43 operates similarly to the pen 180 of FIG. 42 except that the pen 180 of FIG. 42 includes the switching device 192 coupled to the variable capacitor 165 and the internal conductive ground plane 184. While the switching device 192 shown is a Junction Field Effect Transistor (JFET), other switching device embodiments are possible. Other types of transistors are current controlled devices, which need current for biasing whereas JFETs are voltage-controlled devices. As such, a JFET may work as a switching device 190 for this purpose. With the internal conductive ground plane 184 isolated from the pen housing 178 and the user hand, digital or analog data can be switched onto this circuit node and the internal conductive ground plane 184 becomes the signal backplane to transmit out to the data to the touch screen 25 through the conductive tip in close proximity the touch screen 25.

The switching device 192 is connected to a multi-frequency source 190 that is continuous or patterned, and/or has pulse width modulation (PWM), amplitude modulation (AM), frequency modulation (FM), etc., at its Drain (D) and a voltage source (data packet 194) at its Gate (G). JFETs are used to control analog switching with precision current control, which is equivalent to a voltage-controlled resistor, or it can be used as an analog two state switch. For a P-channel JFET switching device 192, when no voltage is applied to the Gate (G), current flows freely from the Drain (D) to the Source (S). This is a "normally on" device which would not need power to function it while "on." As a voltage VGS is applied to the Gate (G), the flow of current is pinched off. The magnitude for the of the current flowing through the channel between the Drain (D) and the Source (S) terminals is controlled by the voltage VGS applied to the Gate (G) terminal, which is a reverse biased. When the Gate (G) terminal is reverse biased, the Gate (G) current is practically zero. As such, the switching device 192 allows for time or amplitude sliced data 196 to be transmitted from the switching device 25 through the conductive tip 168 onto the touch screen 25 to convey data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A passive pen for interaction with a touch screen of a communication device, wherein the passive pen comprises:
   a housing;
   a conductive section, wherein when a user of the passive pen is in contact with the conductive section, a capacitive connection is established between the conductive section and the user;
   a fixed conductive z-direction mounting section coupled to the conductive section;
   a moveable conductive z-direction mounting section;
   a variable capacitor positioned between the fixed conductive z-direction mounting section and the moveable conductive z-direction mounting section, wherein the variable capacitor includes at least one compressible conductive material, wherein the variable capacitor includes a dome-shaped body; and wherein the dome-shaped body includes an upper dome-shaped body coupled to the fixed conductive z-direction mounting section and a lower dome-shaped body coupled to the moveable conductive z-direction mounting section; and
   a conductive tip coupled to the moveable conductive z-direction mounting section, wherein pressure on the conductive tip by the touch screen creates a z-direction force operable to move the moveable conductive z-direction mounting section in the z-direction, wherein when movement of the moveable conductive z-direction mounting section compresses the variable capacitor against the fixed conductive z-direction mounting section, the upper dome-shaped body compresses against the lower dome-shaped body and alters the domed shape of the upper dome-shaped body and the lower dome-shaped body, wherein when the domed shape of the upper dome-shaped body and the lower dome-shaped body are altered, the capacitance of the variable capacitor changes, and wherein the capacitance is interpretable as a pressure measurement by the touch screen.

2. The passive pen of claim 1, wherein the housing consists of a conductive material, and wherein the capacitive connection is a direct capacitive connection.

3. The passive pen of claim 1, wherein the housing consists of a non-conductive material, and wherein the capacitive connection is a capacitive coupling connection.

4. The passive pen of claim 1 further comprises:
   a pen cone coupled to the housing, wherein the conductive tip is at least partially physically contained within the pen cone and is electrically isolated from the pen cone.

5. The passive pen of claim 4, wherein the variable capacitor, the fixed conductive z-direction mounting section, and the moveable conductive z-direction mounting section are at least partially physically contained within the pen cone.

6. The passive pen of claim 1 further comprises:
   a conductive wire operable to couple the fixed conductive z-direction mounting section to the conductive section.

7. The passive pen of claim 1, wherein at least a portion of the dome-shaped body is sealed.

8. The passive pen of claim 1, wherein the dome-shaped body includes a vented section open to the atmosphere.

9. The passive pen of claim 1, wherein an end of the variable capacitor is coupled to the fixed conductive z-direction mounting section and wherein another end of the variable capacitor is coupled to the moveable conductive z-direction mounting section.

10. The passive pen of claim 1, wherein an end of the variable capacitor is coupled to the fixed conductive z-direction mounting section and wherein another end of the variable capacitor is not coupled to the moveable conductive z-direction mounting section.

11. The passive pen of claim 1, wherein an end of the variable capacitor is coupled to the moveable conductive z-direction mounting section and another end of the variable capacitor in not coupled to the fixed conductive z-direction mounting section.

12. The passive pen of claim 1 further comprises:
   a second conductive section coupled externally to the housing, wherein the housing consists of a non-conductive material, wherein the conductive section is electrically isolated from the housing, and wherein, when the user is in contact with the second conductive section, a direct capacitive connection is established between the conductive section and the user.

13. The passive pen of claim 1 further comprises:
   a switching device coupled to the conductive section, wherein the switching device is operable to transmit a data signal from the conductive section through the conductive tip.

* * * * *